United States Patent
Wray et al.

(10) Patent No.: US 9,605,789 B2
(45) Date of Patent: Mar. 28, 2017

(54) MAGNETO-CRYOGENIC VALVES, SYSTEMS AND METHODS FOR MODULATING FLOW IN A CONDUIT

(71) Applicant: BioFilm IP, LLC, Minden, NV (US)

(72) Inventors: Daniel X. Wray, Genoa, NV (US);
Reed Nicholas Liu, Reno, NV (US);
Ericson C. Ceniceros, Carson City, NV (US)

(73) Assignee: BIOFILM IP, LLC, Minden, NV (US)

( * ) Notice: Subject to any disclaimer, the term of this patent is extended or adjusted under 35 U.S.C. 154(b) by 392 days.

(21) Appl. No.: 14/485,227

(22) Filed: Sep. 12, 2014

(65) Prior Publication Data
US 2015/0075632 A1    Mar. 19, 2015

Related U.S. Application Data

(60) Provisional application No. 61/877,888, filed on Sep. 13, 2013.

(51) Int. Cl.
*F16L 55/103* (2006.01)
*F16L 55/10* (2006.01)
*E21B 34/08* (2006.01)

(52) U.S. Cl.
CPC ........... *F16L 55/103* (2013.01); *E21B 34/08* (2013.01); *F16L 55/1003* (2013.01); *Y10T 137/0391* (2015.04); *Y10T 137/2191* (2015.04)

(58) Field of Classification Search
CPC ..... F16L 55/1003; F16L 55/103; E21B 34/08; Y10T 137/2191; Y10T 137/0391; Y10T 137/2224; Y10T 137/218; F17C 13/04

USPC .......... 62/3.1, 50.7; 137/13, 89, 827; 251/65
See application file for complete search history.

(56) References Cited

U.S. PATENT DOCUMENTS

| | | | |
|---|---|---|---|
| 2,257,727 A | 10/1941 | Bennett et al. | 138/99 |
| 2,701,452 A | 2/1955 | Hopkins | 62/347 |
| 3,041,850 A | 7/1962 | Nunn et al. | 62/293 |
| 3,293,877 A | 12/1966 | Barnes | 62/223 |
| 3,498,071 A | 3/1970 | Tremont | 137/15.08 |

(Continued)

FOREIGN PATENT DOCUMENTS

| | | |
|---|---|---|
| DE | 39 03 009 | 8/1990 |
| GB | 1 584 189 | 2/1981 |

(Continued)

OTHER PUBLICATIONS

Letter/Written Disclosure of the Supplemental Information Disclosure Statement for the above-referenced application, submitted Dec. 12, 2014, 2 pages.

(Continued)

*Primary Examiner* — Mohammad M Ali
(74) *Attorney, Agent, or Firm* — Dentons US LLP; Frank J. Miskiel; Stephanie Seidman

(57) ABSTRACT

Provided are magneto-cryogenic valves, methods and systems that extract thermal energy from a fluid within a conduit such that the temperature of at least a portion of the fluid is reduced to a temperature below which at least a portion of the fluid becomes a solid thereby forming a frozen plug of fluid and magnetically susceptible particles that reversibly plugs the conduit, preventing flow of fluid past the plug. Also provided are methods and systems for temporarily preventing the flow of fluid in a conduit.

58 Claims, 24 Drawing Sheets

(56) References Cited

U.S. PATENT DOCUMENTS

| | | | |
|---|---|---|---|
| 3,530,680 A | 9/1970 | Marvin | 405/169 |
| 3,532,113 A | 10/1970 | McKean | 137/318 |
| 3,623,337 A | 11/1971 | Tremont | 62/233 |
| 3,631,870 A | 1/1972 | Livingston | 137/13 |
| 3,660,784 A | 5/1972 | Scharfman | 333/2 F |
| 3,693,665 A | 9/1972 | Veerling | 138/149 |
| 3,695,301 A | 10/1972 | Pittman | 138/97 |
| 3,699,996 A | 10/1972 | Nichols | 137/318 |
| 3,738,424 A | 6/1973 | Osmun et al. | 166/298 |
| 3,742,723 A | 7/1973 | Grise | 137/315.01 |
| 3,760,598 A | 9/1973 | Jakob et al. | 62/74 |
| 3,793,716 A | 2/1974 | Smith-Johannsen | 29/611 |
| 3,814,574 A | 6/1974 | Darley | 431/338 |
| 3,857,255 A | 12/1974 | Elwood et al. | 62/193 |
| 3,865,145 A | 2/1975 | McKay et al. | 138/113 |
| 3,905,424 A | 9/1975 | Elwood et al. | 169/46 |
| 3,926,006 A | 12/1975 | Brooks et al. | 62/66 |
| 3,971,416 A | 7/1976 | Johnson | 138/33 |
| 3,993,137 A | 11/1976 | Hefetz | 169/46 |
| 4,013,097 A | 3/1977 | Calandra | 138/93 |
| 4,026,329 A | 5/1977 | Thompson | 138/97 |
| 4,095,747 A | 6/1978 | Anderson | 239/288.5 |
| 4,112,706 A | 9/1978 | Brister | 62/50.1 |
| 4,165,571 A | 8/1979 | Chang et al. | 37/322 |
| 4,219,224 A | 8/1980 | Hanley | 285/47 |
| 4,220,012 A | 9/1980 | Brister | 62/130 |
| 4,238,640 A | 12/1980 | Tweed et al. | 174/87 |
| 4,267,699 A | 5/1981 | Bahrenburg | 62/66 |
| 4,283,935 A | 8/1981 | Eguchi et al. | 374/44 |
| 4,350,027 A | 9/1982 | Tyree, Jr. | 62/374 |
| 4,356,098 A | 10/1982 | Chagnon | 252/62.51 R |
| 4,370,862 A | 2/1983 | Brister | 62/66 |
| RE31,450 E | 11/1983 | Smith et al. | 73/999.999 |
| 4,416,118 A | 11/1983 | Brister | 62/66 |
| 4,421,656 A | 12/1983 | Donatelli | 507/127 |
| 4,422,338 A | 12/1983 | Smith | 73/861.356 |
| 4,428,204 A | 1/1984 | Brister | 62/62 |
| 4,441,328 A | 4/1984 | Brister | 62/53 |
| 4,492,095 A | 1/1985 | Brister | 62/293 |
| 4,509,343 A | 4/1985 | Brister | 62/51.1 |
| 4,533,123 A | 8/1985 | O'leary | 261/61 |
| 4,552,170 A | 11/1985 | Margrave | 137/318 |
| 4,565,571 A | 1/1986 | Abbaschian | 419/2 |
| 4,593,529 A | 6/1986 | Birochik | 62/3 |
| 4,597,699 A | 7/1986 | Ramunas | 409/232 |
| 4,634,050 A | 1/1987 | Shippee | 239/14.2 |
| 4,642,994 A | 2/1987 | Barclay | 62/3 |
| 4,729,664 A | 3/1988 | Kamiwano | 366/230 |
| 4,775,598 A | 10/1988 | Jaeckel | 428/550 |
| 4,789,104 A | 12/1988 | Anderson | 239/455 |
| 4,829,770 A | 5/1989 | Hashimoto | 62/3.1 |
| 4,849,611 A | 7/1989 | Whitney et al. | 219/538 |
| 4,934,196 A | 6/1990 | Romano | 73/861.356 |
| 4,951,474 A | 8/1990 | DiNovo et al. | 62/114 |
| 4,956,976 A | 9/1990 | Kral et al. | 62/610 |
| 4,975,415 A | 12/1990 | Gusman et al. | 505/425 |
| 5,060,481 A * | 10/1991 | Bartlett | F17C 13/026 137/341 |
| 5,076,930 A | 12/1991 | Rubin | 210/634 |
| 5,099,650 A | 3/1992 | Crunkleton | 62/6 |
| 5,124,466 A | 6/1992 | Azechi | 556/425 |
| 5,125,427 A | 6/1992 | Cantu et al. | 137/13 |
| 5,205,135 A | 4/1993 | Lang | 62/381 |
| 5,322,652 A | 6/1994 | Brotz | 264/291 |
| 5,352,304 A | 10/1994 | DeArdo et al. | 148/336 |
| 5,357,756 A | 10/1994 | Lubell | 62/3.1 |
| 5,385,025 A | 1/1995 | Kellett | 62/50.1 |
| 5,507,465 A | 4/1996 | Borle | 251/1.2 |
| 5,522,419 A | 6/1996 | Sand | 137/216 |
| 5,527,330 A | 6/1996 | Tovey | 606/167 |
| 5,548,965 A | 8/1996 | Chen et al. | 62/66 |
| 5,582,239 A | 12/1996 | Tsunoda et al. | 165/76 |
| 5,608,159 A | 3/1997 | Carcone et al. | 73/49.8 |
| 5,680,770 A | 10/1997 | Hall et al. | 62/293 |
| 5,693,269 A | 12/1997 | Brotz | 264/4 |
| 5,738,772 A | 4/1998 | Bartasis et al. | 204/406 |
| 5,743,095 A | 4/1998 | Gschneidner et al. | 62/3.1 |
| 5,743,637 A | 4/1998 | Ogier | 366/163.2 |
| 5,746,249 A | 5/1998 | Wright et al. | 137/614.19 |
| 5,778,681 A * | 7/1998 | Li | G01N 30/12 62/50.2 |
| 5,778,919 A | 7/1998 | Petrone | 62/3.1 |
| 5,787,722 A | 8/1998 | Jenkins | 62/305 |
| 5,836,167 A | 11/1998 | Clouston et al. | 62/66 |
| 5,875,841 A | 3/1999 | Wright et al. | 166/854 |
| RE36,244 E | 7/1999 | Matthews | 166/250.01 |
| 5,944,686 A | 8/1999 | Patterson et al. | 604/22 |
| 5,993,167 A | 11/1999 | Mochizuki | 417/174 |
| 6,024,172 A | 2/2000 | Lee | 166/363 |
| 6,070,416 A | 6/2000 | Germain et al. | 62/63 |
| 6,141,972 A | 11/2000 | Evans | 62/50.2 |
| 6,164,078 A | 12/2000 | Lak et al. | 62/47.1 |
| 6,183,573 B1 | 2/2001 | Fujiwara et al. | 148/336 |
| 6,185,953 B1 | 2/2001 | Sada et al. | 62/324.4 |
| 6,212,891 B1 | 4/2001 | Minta et al. | 62/50.7 |
| 6,363,729 B1 | 4/2002 | Brahmbhatt et al. | 62/51.1 |
| 6,399,146 B1 | 6/2002 | Harris | 427/127 |
| 6,446,441 B1 | 9/2002 | Dean | 62/3.1 |
| 6,450,775 B1 | 9/2002 | Hutchinson et al. | 417/198 |
| 6,464,148 B1 | 10/2002 | Costa et al. | 239/2.2 |
| 6,467,274 B2 | 10/2002 | Barclay et al. | 62/3.1 |
| 6,485,577 B1 | 11/2002 | Kiholm | 134/22.11 |
| 6,526,759 B2 | 3/2003 | Zimm et al. | 62/3.1 |
| 6,568,429 B2 | 5/2003 | Lundman | 138/91 |
| 6,589,366 B1 | 7/2003 | Gschneidner et al. | 148/301 |
| 6,598,412 B1 | 7/2003 | Chen | 62/293 |
| 6,598,803 B1 | 7/2003 | Haas et al. | 239/67 |
| 6,658,864 B2 | 12/2003 | Thomas et al. | 62/63 |
| 6,676,772 B2 | 1/2004 | Saito et al. | 148/301 |
| 6,684,112 B1 | 1/2004 | Cheng | 700/28 |
| 6,707,362 B1 * | 3/2004 | Adam | C02F 1/481 210/222 |
| 6,710,020 B2 | 3/2004 | Tenne et al. | 508/103 |
| 6,722,145 B2 | 4/2004 | Podtchereniaev et al. | 62/217 |
| 6,739,137 B2 | 5/2004 | Minovitch | 62/3.1 |
| 6,826,915 B2 | 12/2004 | Wada et al. | 62/3.1 |
| 6,843,065 B2 | 1/2005 | Flynn | 62/156 |
| 6,870,047 B2 | 3/2005 | Kleiber et al. | 536/25.4 |
| 6,962,164 B2 | 11/2005 | Lull et al. | 137/2 |
| 7,013,668 B2 | 3/2006 | Kyees | 62/390 |
| 7,028,768 B2 | 4/2006 | Aler et al. | 165/219 |
| 7,036,598 B2 | 5/2006 | Skjaerseth et al. | 166/339 |
| 7,063,754 B2 | 6/2006 | Fukamichi et al. | 148/301 |
| 7,063,802 B2 | 6/2006 | Tsuda et al. | 252/625.2 |
| 7,066,730 B2 | 6/2006 | Macaluso | 432/225 |
| 7,069,729 B2 | 7/2006 | Bruck et al. | 62/3.1 |
| 7,069,981 B2 | 7/2006 | Valensa et al. | 165/164 |
| 7,076,959 B2 | 7/2006 | Lewis | 62/3.1 |
| 7,083,800 B1 | 8/2006 | Terren et al. | 424/401 |
| 7,114,340 B2 | 10/2006 | Pecharsky et al. | 62/3.1 |
| 7,121,344 B2 | 10/2006 | Fenton et al. | 166/339 |
| 7,185,501 B2 | 3/2007 | Steinbach | 62/79 |
| 7,218,523 B2 | 5/2007 | Hamman | 361/718 |
| 7,234,310 B2 | 6/2007 | Flynn et al. | 62/114 |
| 7,235,212 B2 | 6/2007 | Kuehmann et al. | 420/38 |
| 7,263,852 B2 | 9/2007 | Bacchus | 62/305 |
| 7,272,951 B2 | 9/2007 | Kyees | 62/390 |
| 7,273,479 B2 | 9/2007 | Littrup et al. | 606/21 |
| 7,302,970 B2 * | 12/2007 | Sugioka | B01J 19/0093 137/625.48 |
| 7,306,083 B2 | 12/2007 | Ulicny et al. | 192/215 |
| 7,378,065 B2 | 5/2008 | Filippi et al. | 422/198 |
| 7,407,600 B2 | 8/2008 | Eaton et al. | 252/73 |
| 7,415,830 B2 | 8/2008 | Wyatt et al. | 62/6 |
| 7,441,412 B2 | 10/2008 | Jensen | 62/121 |
| 7,461,691 B2 | 12/2008 | Vinegar et al. | 166/60 |
| 7,481,064 B2 | 1/2009 | Kitanovski et al. | 62/3.1 |
| 7,497,086 B2 | 3/2009 | Atkins et al. | 62/50.1 |
| 7,498,005 B2 | 3/2009 | Yadav | 423/21.1 |
| 7,562,831 B2 | 7/2009 | Costa et al. | 239/2.2 |
| 7,596,955 B2 | 10/2009 | Muller et al. | 62/3.1 |
| 7,603,865 B2 | 10/2009 | Shin et al. | 62/3.1 |
| 7,648,597 B2 | 1/2010 | Nagao et al. | 148/547 |
| 7,683,098 B2 | 3/2010 | Yadav | 516/34 |

(56) References Cited

U.S. PATENT DOCUMENTS

| | | | |
|---|---|---|---|
| 7,707,898 B2 | 5/2010 | Oddie | 73/861.92 |
| 7,727,463 B2 | 6/2010 | Arai et al. | 420/104 |
| 7,730,777 B2 | 6/2010 | Anzai et al. | 73/204.11 |
| 7,740,287 B2 | 6/2010 | Eide | 285/261 |
| 7,785,998 B2 | 8/2010 | Millward | 438/591 |
| 7,807,112 B2 | 10/2010 | Denes et al. | 422/186.04 |
| 7,921,657 B2 | 4/2011 | Littrup et al. | 62/64 |
| 8,099,964 B2 | 1/2012 | Saito et al. | 62/3.1 |
| 8,104,293 B2 | 1/2012 | Barve et al. | 62/3.1 |
| 8,430,129 B2* | 4/2013 | Hyde | G05D 7/0635 137/601.14 |
| 8,631,917 B2 | 1/2014 | Piech et al. | 188/267.2 |
| 8,763,411 B2 | 7/2014 | Wray et al. | 62/67 |
| 9,010,132 B2 | 4/2015 | Wray et al. | 62/77 |
| 2002/0139125 A1 | 10/2002 | Kunkel et al. | 62/64 |
| 2004/0020642 A1 | 2/2004 | Vinegar et al. | 166/245 |
| 2004/0104022 A1 | 6/2004 | Kenny et al. | 165/133 |
| 2004/0244498 A1 | 12/2004 | Chen et al. | 73/861.19 |
| 2005/0092483 A1 | 5/2005 | Vinegar et al. | 166/60 |
| 2005/0288873 A1 | 12/2005 | Urdaneta et al. | 137/487.5 |
| 2007/0144181 A1 | 6/2007 | Kitanovsk et al. | 62/3.1 |
| 2007/0228309 A1* | 10/2007 | Friedman | F16K 11/044 251/65 |
| 2008/0048047 A1 | 2/2008 | Zurecki et al. | 239/8 |
| 2008/0093582 A1 | 4/2008 | Nagai et al. | 252/364 |
| 2008/0149391 A1* | 6/2008 | Burkhard | E21B 34/066 175/25 |
| 2008/0170936 A1* | 7/2008 | Den Toonder | B01F 13/0059 415/140 |
| 2009/0019860 A1 | 1/2009 | Sakurada et al. | 62/3.1 |
| 2009/0158749 A1 | 6/2009 | Sandeman et al. | 62/3.1 |
| 2009/0165877 A1* | 7/2009 | Den Toonder | B01F 13/0059 137/831 |
| 2009/0215255 A1 | 8/2009 | Millward | 438/591 |
| 2009/0217675 A1 | 9/2009 | Kobayashi et al. | 62/3.1 |
| 2009/0281671 A1 | 11/2009 | Duan et al. | 700/282 |
| 2010/0071383 A1 | 3/2010 | Zhang et al. | 62/3.1 |
| 2010/0252250 A1* | 10/2010 | Fripp | E21B 34/08 166/66 |
| 2010/0311859 A1 | 12/2010 | Van De Belt et al. | 522/81 |
| 2011/0085229 A1 | 4/2011 | Lavrentovich et al. | 359/315 |
| 2011/0192185 A1 | 8/2011 | Ingram | 138/97 |
| 2011/0297394 A1 | 12/2011 | VanDelden | 166/373 |
| 2011/0308259 A1* | 12/2011 | Wray | F16L 55/103 62/3.3 |
| 2012/0064022 A1 | 3/2012 | Wray | 424/70.12 |
| 2012/0312540 A1* | 12/2012 | Lefebvre | E21B 34/08 166/319 |
| 2013/0152608 A1 | 6/2013 | Wray | 62/50.7 |
| 2014/0190663 A1 | 7/2014 | Wray et al. | 156/96 |
| 2015/0176929 A1 | 6/2015 | Wray et al. | F26F 13/06 |

FOREIGN PATENT DOCUMENTS

| | | |
|---|---|---|
| TW | I289192 | 11/2007 |
| WO | WO 82/01408 | 4/1982 |
| WO | WO 97/11326 | 3/1997 |
| WO | WO 2011/145943 | 11/2011 |
| WO | WO 2011/153245 | 12/2011 |
| WO | WO 2015/038961 | 3/2015 |

OTHER PUBLICATIONS

Barden, A. and R. Standen, "Developments in subsea pipe freezing for deepwater applications," BJ Process and Pipeline Services Publication, 5 pages.

Certified English Language translation of German Patent Publication No. DE 39 03 009, 19 pages.

Gedik et al., 5th International Advanced Technologies Symposium (IATS'09), May 13-15, 2009, Karabuk, Turkey, 7 pages.

Gschneidner et al., "Recent developments in magnetic refrigeration," Materials Science Forum vols. 315-317, pp. 69-76 (1996).

Southwestern Petroleum Short Course, "Cryogenic valve offers oil and gas industry options for surface flow line and well pressure control," [retrieved on Oct. 21, 2011] Retrieved from:<URL:swpshortcourse.org/program/abstracts/28-cryogenic-valve-offers-oil-and-gas-industry-options-surface-flow-line-and-well-, 1 page.

Sybil B. Parker's *McGraw-Hill Dictionary of Scientific and Technical Terms* (4th ed., McGraw-Hill Book Company, New York, N.Y., 1989), p. 706.

Partial International Search Report, issued Feb. 13, 2012, in connection with International Patent Application No. PCT/US2011/001083, 2 pages.

International Search Report and Written Opinion, issued Jun. 4, 2012, in connection with International Patent Application No. PCT/US2011/001083, 23 pages.

Response to Written Opinion submitted Sep. 3, 2012, in connection with International Patent Application No. PCT/US2011/001083, 47 pages.

Rule 161(1) and 162 Communication, issued Jan. 25, 2013, in connection with European Patent Application No. 11740742.9, 2 pages.

Written Opinion, issued Feb. 5, 2013, in connection with International Patent Application No. PCT/US2011/001083, 5 pages.

Response to Written Opinion, submitted Mar. 5, 2013, in connection with International Patent Application No. PCT/US2011/001083, 36 pages.

International Preliminary Report on Patentability, issued Apr. 9, 2013, in connection with International Patent Application No. PCT/US2011/001083, 18 pages.

Partial International Search Report, issued May 3, 2013, in connection with International Patent Application No. PCT/US2012/069925, 5 pages.

Response to Communication persuant to Rules 161(1) and 162, submitted Jun. 27, 2013, in connection with European Patent Application No. 11740742.9, 21 pages.

International Search Report and Written Opinion, issued Sep. 2, 2013, in connection with International Patent Application No. PCT/US2012/069925, 16 pages.

Restriction Requirement, issued Sep. 23, 2013, in connectin with U.S. Appl. No. 13/161,411, 8 pages.

Translated Summary of Office Action, received Oct. 8, 2013, in connection with Eurasian Patent Application Serial No. 201300018, 2 pages.

Response to Restriction Requirement, submitted Oct. 15, 2013, in connection with U.S. Appl. No. 13/161,411, 13 pages.

Response to International Search Report and Written Opinion, submitted Nov. 28, 2013, in connection with International Patent Application No. PCT/US2012/069925, 39 pages.

Response to Office Action, submitted Dec. 3, 2013, and instructions for response, in connection with Eurasian Patent Application Serial No. 201300018, 57 pages.

Office Action, issued Dec. 16, 2013, in connection with U.S. Appl. No. 13/161,411, 13 pages.

Examiner's Report, issued Jan. 13, 2014, in connection with Canadian Patent Application No. 2,802,346, 3 pages.

Written Opinion, issued Jan. 17, 2014, in connection with in connection with International Patent Application No. PCT/US2012/069925, 8 pages.

Response to Office Action, submitted Jan. 31, 2014, in connection with U.S. Appl. No. 13/161,411, 13 pages.

Response to Written Opinion, submitted Feb. 25, 2014, in connection with International Patent Application No. PCT/US2012/069925, 33 pages.

Applicant Initiated Interview Summary, issued Apr. 15, 2014, in connection with U.S. Appl. No. 13/161,411, 3 pages.

Notice of Allowance, issued Apr. 21, 2014, in connection with U.S. Appl. No. 13/161,411, 8 pages.

Office Action, issued May 26, 2014, and summary of Office Action, in connection with Mexican Patent Application No. MX/a/2012/014339, 5 pages.

Response to Examiner's Report, submitted Jul. 11, 2014, in connection with Canadian Patent Application No. 2,802,346, 67 pages.

(56) References Cited

OTHER PUBLICATIONS

Office Action, issued Jul. 18, 2014, in connection with U.S. Appl. No. 14/208,325, 14 pages.
Office Action, issued Jul. 18, 2014, and translation, in connection with Chinese Patent Application No. 201180039493.4, 15 pages.
Response to Office Action, submitted Oct. 3, 2014, and Instructions for Response, in connection with corresponding Mexican Patent Application No. MX/a/2012/014339, 33 pages.
Examiner's Report, issued Oct. 21, 2014, in connection with Canadian Patent Application No. 2,802,346, 2 pages.
Letter/Written Disclosure of the Supplemental Information Disclosure Statement for the above-referenced application, submitted Sep. 22, 2015, 2 pages.
Examination Report, issued Nov. 25, 2014, in connection with Gulf Cooperation Council Patent Application No. 2011-18602, 4 pages.
Response to Office Action, submitted Dec. 4, 2014, and instructions for response, in connection with Chinese Patent Application No. 201180039493.4, 49 pages.
Notice of Allowance, issued Dec. 18, 2014, in connection with U.S. Appl. No. 14/208,325, 7 pages.
Response to Examiner's Report, submitted Jan. 28, 2015, in connection with Canadian Patent Application No. 2,802,346, 35 pages.
International Search Report and Written Opinion, issued Feb. 10, 2015, in connection with International Patent Application No. PCT/US2014/055495, 15 pages.
Instructions for Response to Examination Report and Request for Re-examination, sent Jan. 16, 2015 and submitted Mar. 1, 2015, in connection with Gulf Cooperation Council Patent Application No. 2011-18602, 15 pages.
Office Action, issued Mar. 16, 2015, and translation, in connection with Chinese Patent Application No. 201180039493.4, 6 pages.
Examination report, issued Mar. 18, 2015, in connection with Canadian Patent Application No. 2,802,346, 3 pages.
Voluntary Amendment, submitted Mar. 20, 2015, in connection with Canadian Patent Application No. 2,802,346, 12 pages.
Examination Report, issued May 28, 2015, and translation, in connection with Taiwanese Patent Application No. 100120333, 6 pages.
Response to Office Action, submitted May 29, 2015, and instructions for response, in connection with Chinese Patent Application No. 201180039493.4, 27 pages.
Office Action, issued Jul. 7, 2015, and translation, in connection with Chinese Patent Application No. 201180039493.4, 6 pages.
Response to International Search Report and Written Opinion, submitted Jul. 10, 2015, in connection with International Patent Application No. PCT/US2014/055495, 41 pages.
Response, filed Aug. 31, 2015, to Examination Report, issued May 28, 2015, and instructions for response, in connection with Taiwanese Patent Application No. 100120333, 76 pages.
Written Opinion, mailed Aug. 20, 2015, in connection with International Patent Application No. PCT/US2014/055495, 8 pages.
Office Action, and English language summary of Office Action, dated Sep. 10, 2015, in connection with Eurasian Patent Application No. 201300018, 8 pages.
Response to Examiner's Report, filed Sep. 17, 2015, in connection with Canadian Patent Apilication No. 2802346, 21 pages.
Letter/Written Disclosure of the Supplemental Information Disclosure Statement for the above-referenced application, filed herewith on Feb. 25, 2016, 2 pages.
Response, filed Oct. 16, 2015, to Written Opinion, mailed Aug. 20, 2015, in connection with International Patent Application No. PCT/US2014/055495, 44 pages.
Notice of Allowance, dated Nov. 24, 2015, in connection with corresponding Canadian Patent Application No. 2,802,346, 1 page.
International Preliminary Report on Patentability (Chapter II), mailed Nov. 30, 2015, in connection with corresponding International Patent Application No. PCT/US2014/055495, 38 pages.
Voluntary Amendment, filed Dec. 16, 2015, in connection with corresponding [English instructions and amendment as filed in Arabic], 84 pages.

* cited by examiner

MAGNETO-CRYOGENIC VALVES, SYSTEMS AND METHODS FOR MODULATING FLOW IN A CONDUIT

RELATED APPLICATIONS

Benefit of priority is claimed to U.S. Provisional Application No. 61/877,888 to Daniel X. Wray, titled "MAGNETO-CRYOGENIC VALVES, SYSTEMS AND METHODS FOR MODULATING FLOW IN A CONDUIT," filed Sep. 13, 2013, the subject matter of which is incorporated by reference herein in its entirety.

This application is related to International PCT Application No. PCT/US2014/055495, filed the same day herewith, entitled "MAGNETO-CRYOGENIC VALVES, SYSTEMS AND METHODS FOR MODULATING FLOW IN A CONDUIT," which also claims priority to U.S. Provisional Application Ser. No. 61/877,888. The subject matter of the above-noted International application is incorporated by reference in its entirety.

FIELD

The present invention relates generally to controlling the flow of a fluid, e.g., petroleum and/or natural gas, through or from a conduit, e.g., a pipeline or oil well. Provided are magneto-cryogenic valves, systems incorporating the magneto-cryogenic valves and methods for reversibly modulating flow of a fluid through a conduit.

BACKGROUND

Metal conduits, such as gas, water and oil pipelines, can fail due to age, fatigue, corrosion, abuse, neglect and when used in the environment, natural forces that can fracture or rupture the pipe, such as seismic activity. Failure can result in uncontrolled fluid flow. A common device used to control such uncontrolled flow of fluid out of a conduit is a blow-out preventer. One or more blow-out preventers can be attached directly to the wellhead and operate to rapidly close an open well hole or the space between the casing and the drill pipe to prevent the escape of pressurized oil or gas. These devices work essentially as plugs. Ram type blow-out preventers are insertable laterally into the casing. Annular type blow-out preventers expand radially to fill the casing. Blow-out preventers are known in the art (see, e.g., U.S. Pat. Nos. 5,507,465, 5,746,249, 5,875,841 and 6,024,172). U.S. Pat. Application Pub. No. 2011/0297394 describes a magneto-rheological blow-out preventer that uses magnets and a magnetic fluid. Although blow-out preventers are effective in preventing blow-outs and any ensuing fires, if the wellhead is damaged or if conduit failure occurs before the blow-out preventers, blow-out preventers may become ineffective for stopping fluid flow.

Valves and other devices have been used in attempts to stop the flow of fluid through breached conduits. Many of the apparatus described in the art install a plug in a flowing high pressure pipeline, where the plug can, in some cases, serve as a fully operative valve. Most of these methods include a means to cut a hole through the conduit or to cut a section out of the flowing conduit, withstanding the pressure from the fluid within the conduit, and then permanently placing a plug in position. For example, U.S. Pat. No. 3,699,996 describes a device that includes a drilling and reaming tool that cuts a cylindrical hole through the flowing pipeline using a powered rotational drive and an axial hydraulic ram. A valve seat and a valve plug are positioned behind the drill and the seat automatically snaps into position upon completion of the drilling and removal of the drill bit. This apparatus requires complex sealing and locking components and requires that the drill bit be removed from the seat/plug assembly before the valve is operable. Similar devices are described in U.S. Pat. Nos. 3,532,113, 3,993,137 and 4,552,170. Some of these devices require a complex variety of seals and packings to maintain a fluid tight valve. Therefore, devices and methods that operate simply and effectively to reversibly seal a flowing high pressure conduit, such as pipeline, with a minimum of complex components, are needed.

Accordingly, a need exists for compositions, methods and devices that allow for reversibly plugging or stopping the flow of a fluid through a conduit.

SUMMARY

Among the objects herein, provided are devices, systems and methods for reversibly plugging or stopping the flow of a fluid through a conduit.

Provided are devices, systems and methods to introduce an injection slurry composition containing magnetically susceptible particles into a fluid within a conduit such that the temperature of at least a portion of fluid is reduced to a temperature below which the fluid becomes a solid, forming a frozen plug of solid adhered to the conduit or device inner walls, thereby reversibly plugging the conduit. Also provided are methods of reversibly preventing flow in a conduit. The devices, methods and systems result in the in situ formation of a reversible plug that can stop the flow of fluid through a conduit. The devices, systems and methods described herein include an efficient heat sink for effective heat transfer from a flowing fluid in a conduit, resulting in rapid formation of a frozen plug of fluid without requiring that the flow of fluid within the conduit be stopped in order to form a frozen plug.

Provided are magneto-cryogenic valves that include a heat transfer system, a first injector device, optionally a second injector device, a valve chamber and a magnetic field generating device. The magneto-cryogenic valves can be integrated into a conduit containing a fluid, or attached to such a conduit. The first injector and second injector are in fluid communication with the fluid within the conduit. The first injector can be used to inject an adhesion promoter composition into the fluid before the fluid reaches the heat transfer system of the magneto-cryogenic valve. The second injector can be used to inject an injector slurry composition containing magnetically susceptible particles into the fluid before the fluid reaches the heat transfer system and magnetic field generating device(s) of the magneto-cryogenic valve.

The heat transfer system of the magneto-cryogenic valve can adapted to fit to a surface of at least a portion of a conduit with sufficient thermal intimacy that the two are in thermal communication and thermal energy can by transferred between the conduit and the heat transfer system. The heat transfer system can be integrated into the magneto-cryogenic valve to remove thermal energy from fluid of the conduit. Any heat transfer system known in the art that can be used for transfer of thermal energy can be used. In some applications, the heat transfer system includes a refrigeration system. Exemplary refrigeration systems include a vapor compression system, a heat exchange unit, a cryogenic cooling system, or an electric thermal transfer device or a combination thereof. In some applications, the heat transfer system of the magneto-cryogenic valve includes a cooling chamber suitable to contain a cryogen, and heat transfer is accomplished via cryogenic cooling. In these applications, the cooling can include evaporative cooling.

The heat transfer system of the magneto-cryogenic valve can include a detachable housing that includes at least two side portions for enclosing a section of a conduit and two end portions for engaging in sealing relation with opposite ends of the side portions, the side and end portions defining a cooling chamber when assembled around the conduit, the cooling chamber able to confine a volume of a cryogen, where at least a portion of the cryogen is in its liquid phase and in thermal communication with the exterior surface of at least a portion of the section of conduit enclosed by the housing. In some application, the cooling chamber within the heat transfer device includes particles, filings, turnings, shavings, pellets, threads or beads or a combination thereof of a thermally conductive material. The heat transfer system can include an inlet port for admitting a cryogen into the cooling chamber and an outlet port for discharging the spent cryogen out of the cooling chamber.

The heat transfer system of the magneto-cryogenic valve further can include a conductor surface, generally containing a thermally conductive material. The conductor surface can include aluminum, beryllium, brass, cadmium, carbon steel, chrome, chrome nickel steel, cobalt, copper, gold, iridium, iron, lead, magnesium, molybdenum, nickel, platinum, silver, stainless steel, tin or zinc, or any combination or alloy thereof. The heat exchange unit also can include baffles or fins in thermal communication with the conductor surface or the surface of the heat transfer system in thermal communication with the conduit. The baffles can be positioned to direct cryogen flow through the heat transfer system. The fins can extend the thermal energy transfer surface of the heat transfer device to expedite thermal energy transfer to the cryogen and/or particles of thermally conductive material within the heat transfer system.

The magneto-cryogenic valve further can include a heating device adjacent to the heat exchange unit. Any heating device known in the art can be used. Exemplary heating devices include Curie temperature heaters, conductor-in-conduit heaters, heater strips, ceramic heaters, resistance wire heaters and resistance ribbon heaters. The heaters can be activated to donate thermal energy to the vicinity of the conduit attached to the heat transfer system, thereby accelerating melting of the frozen plug in order to restore flow through the conduit. One or more heating devices can be used, and the positioning of the heating devices can be selected to achieve a desired result. In some applications, it is desirable to promote non-uniform melting of the frozen plug so that a channel is created in the vicinity of the heating units, restoring at least partial flow of fluid within the channel while the frozen plug is still at least partially adhered to the inner wall of the conduit. This prevents launching of the frozen plug through the conduit.

The magneto-cryogenic valves include one or more magnetic field generating devices. In some applications, the magnetic field generating device includes one or more electromagnets. In some applications, the magnetic field generating device includes one or more permanent magnets. In some applications, the magnetic field generating device includes one or more electromagnets and one or more permanent magnets. When the magnetic field generating device includes a permanent magnet, it may be made of any material known in the art for producing a permanent magnet. The permanent magnet can include a ferrite material or a rare earth element. The permanent magnet can include a rare earth material. For example, the magnetic field generating device can include a permanent magnet that is a Nd—Fe—B type, Sm—Co type or Sm—N—Fe type rare earth permanent magnet, or any combination of these magnets. The magnets can be mounted on movable tracks. The tracks can allow the positioning of the magnets in the magnetic field generating device and with respect to the conduit to which the magneto-cryogenic valve is attached of the chamber of the magneto-cryogenic valve through which the fluid of the conduit flows. Variable positioning of the magnets allows for modulating of the resulting effective magnetic fields produced by the magnet(s). The magnetic field generating device can include a plurality of electromagnets in which oscillation of the B-field can be induced.

The first and second injectors of the magneto-cryogenic valves provided herein can include an isolation mechanism for controlling the flow of material through the injectors. For example, activatable flow modulating valves can be included to adjust the flow of material through the injector(s). The injectors also can include other components, such as one or more or a combination of a flow rate meter, an emergency shut-off valve, an over-pressure valve, a diverter valve, a heating unit or a thermal monitoring device. The magneto-cryogenic valve can be a unit that is integrated into a conduit so that the fluid flowing through the conduit flows through a valve chamber of the magneto-cryogenic valve. Until activated, the magneto-cryogenic valve functions as any other tubular or portion of the conduit and serves as a prophylactic safety device. The magneto-cryogenic valve also can be attached to a ruptured conduit to act as an emergency shut-off valve.

Also provided are systems for extracting thermal energy from a conduit containing a fluid. The systems include a magneto-cryogenic valve as described herein and an injector slurry supply module. The system can include a pressure regulator system connected to the injector slurry supply module for modulating flow of an injector slurry composition to an injector. The injector slurry supply module is in fluid communication with an injector of the magneto-cryogenic valve and provides an injector slurry composition to the injector. In some applications, the system also includes an adhesion promoter composition supply module, which provides an adhesion promoter composition to an injector. The system can include a pump in fluid communication with the adhesion promoter composition supply module to modulate flow of the adhesion promoter composition to the injector. When the magneto-cryogenic valve includes a heat transfer system that utilizes a cryogen, the systems provided herein also can include a cryogen supply module. The system also can include one or more or a combination of flow control valves, diverter valves, pressure relief valves, pressure monitoring devices, temperature monitoring devices, or flow rate measuring devices. A computer control module also can be included in the system.

In the systems and methods provided herein, the injector slurry contains magnetically susceptible particles. The magnetically susceptible particles can include particles that are paramagnetic or diamagnetic or ferromagnetic or any combination thereof. The particles can be made of any material that interacts with a magnetic field. The magnetically susceptible particles can include cobalt, Co—Zr alloys, Co—Nb alloys, dysprosium, Fe—Si alloys, gadolinium, iron, mu metal (nickel iron alloy), nickel, permalloys (iron-nickel alloys), rare earth-transition metal alloys, spinel ferrites or supermalloy or any combination or alloy thereof. The magnetically susceptible particles can include a Gd—Co or Fe—Tb alloy. The magnetically susceptible particles can include cobalt, iron, nickel, magnetite ($Fe_3O_4$) or maghemite ($Fe_2O_3$) or combinations thereof.

In the systems and methods herein, the magnetically susceptible particles are selected to have a thermal conductivity greater than the fluid within the conduit. The magnetically susceptible particles can be selected to have a thermal conductivity greater than 0.2 W/(m·K), or greater than 0.5 W/(m·K), or greater than 0.75 W/(m·K), or greater than 1 W/(m·K), or greater than 5 W/(m·K), or greater than 10 W/(m·K), or greater than 20 W/(m·K), or greater than 30 W/(m·K), or greater than 40 W/(m·K), or greater than 50 W/(m·K) or greater than 100 W/(m·K). The magnetically susceptible particles can be of a shape. Exemplary shapes include cubes, flakes, granules, cylinders, rings, rods, needles, prisms, disks, fibers, pyramids, spheres, spheroids, prolate spheroids, oblate spheroids, ellipsoids, ovoids, hexahedrons, hexagonal prisms, tetrahexahedrons, octahedrons, truncated octahedrons, dodecahedrons, triangular prisms or random non-geometric shapes or any combinations of these shapes.

When used in the systems or methods provided herein, the magnetically susceptible particles can be solid, or they can be hollow, or a combination of solid and hollow particles can be used. The magnetically susceptible particles can include a partial or complete coating. The coating can include a thermally conductive material or an oxide or a combination thereof. Examples of a thermally conductive material that can be included in the coating are beryllium, brass, cadmium, carbon steel, chrome nickel steel, cobalt, copper, gold, iridium, iron, lead, magnesium, molybdenum, nickel, platinum, silver, stainless steel, tin or zinc, or any combination or alloy thereof. Exemplary oxides that can be included in the coating include an oxide of alumina, aluminum, barium, beryllium, bismuth, chromium, cobalt, copper, gadolinium iridium, iron, magnesium, manganese, molybdenum, nickel, niobium, silica, silicon, silver, tantalum, thorium, tin, titanium, tungsten, vanadium, yttrium, zinc, zirconia or zirconium or combinations thereof. The magnetically susceptible particles can include a partial or complete coating that contains a corrosion-resistant material. Exemplary corrosion-resistant materials are zinc, magnesium and cadmium or an alloy of any two or more of these. The magnetically susceptible particles can include a partial or complete coating that contains a ferromagnetic material. For example, the magnetically susceptible particles can include a partial or complete coating that contains iron, nickel, cobalt or a rare earth metal or any combination or alloy thereof.

When used in the systems or methods provided herein, the magnetically susceptible particles can have any geometry. The particles can have a uniform surface geometry or a non-uniform surface geometry. The magnetically susceptible particles can have a very broad particle size distribution (e.g., from nanometer sized particles to particles 20 cm in diameter). The magnetically susceptible particles can have a particle size greater than 100 μm and less than 5 cm. In some applications, the magnetically susceptible particles have a particle size between about 1000 μm and about 1 cm. The magnetically susceptible particles can have an average particle size between about 1000 μm and about 10 cm. The magnetically susceptible particles can have an average particle size between about 1 nm and 100 μm. The particle size distribution can be unimodal, bimodal or polymodal. In the systems and methods provided herein, the amount of magnetically susceptible particles in the injection slurry composition is from about 0.01% to about 95% based on the weight of the injection slurry composition.

In the systems and methods provided herein, the injector slurry composition can include a carrier. Any material compatible with the magnetically susceptible particles can be used. The carrier can be a cryogen or a solvent or a combination thereof. For example, the carrier can contain a cryogen, e.g., liquid nitrogen, liquid oxygen, liquid helium, liquid neon, liquid methane, liquid natural gas, liquid argon, liquid nitrous oxide, or liquid carbon dioxide or combinations thereof. The amount of carrier, such as a cryogen or solvent, in the injector slurry composition can vary, and can be from 1% to 99% based on the weight of the injector slurry composition. The carrier also can contain a solvent, such as benzene, ethyl acetate, propyl acetate, butyl acetate, cyclohexanol, ether, methylethyl ketone, petroleum ether, n-hexane, heptane, cyclohexane, naphtha, isopropyl biphenyl, terpene, toluene, xylene, hexamethyl disiloxane, octamethyl cyclotetrasiloxane, diphenyl tetramethyl disiloxane or trimethylsiloxy end-blocked polydimethylsiloxane fluids or a combination thereof. In some applications, the solvent can include acetaldehyde, acetone, acetonitrile, acrolein, benzene, benzonitrile, bromo-benzene, butanol, butyl acetate, n-butyl amine, t-butyl amine, butyl bromide, carbitol acetate, carbon disulfide, carbon tetrachloride, chlorobenzene, chloroform, cyclohexane, cyclohexanone, cyclopentane, m-dichlorobenzene, o-dichloro-benzene, diethyl carbitol, diethyl ether, dioxane, ethanol, ethyl acetate, ethyl bromide, ethylene glycol, ethyl methyl ketone, glycerin, heptane, heptanone, hexane, hexanol, 1,5-hexadiene, isoamyl acetate, isooctane, isopentane, isopropanol, methanol, methyl cyclohexane, nitroethane, nitromethane, n-octane, octanol, i-pentane, m-pentane, propanol, propylene glycol, pyridine, toluene, thiophene, trichloroethylene, m-xylene or p-xylene or any combination thereof. The amount of solvent in the injector slurry composition, when present as a carrier, is from about 0.05% to 75% based on the weight of the injector slurry composition.

In the systems and methods provided herein, the adhesion promoter supply module can be in fluid communication with the first injector of the magneto-cryogenic valve and provides an adhesion promoter composition to the second injector. The adhesion promoter composition can include any material that promotes adhesion of the fluid to the conduit or valve chamber wall, particularly a material that promotes adhesion of frozen fluid to a conduit wall. The adhesion promoter composition can include a surface tension reducer. Any surface tension reducer known in the art can be included in the composition. For example, the surface tension reducer can include a surfactant, a sulfonic acid, an alkali metal salt of a sulfonic acid, an alcohol, an amine, an ester, a siloxane, or a mono and dialkylated oxazoline where the alkyl chain length is between about 2 to about 30 carbons or any combination thereof. In some applications, the surface tension reduced contains a surfactant. The surfactant can include an anionic surfactant, a cationic surfactant, a nonionic surfactant, a zwitterionic surfactant, a fluorosurfactant, a silicone surfactant or an amphoteric agent or any combination thereof.

When the surface tension reducer is an anionic surfactant, is can be selected from among alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates and mixtures thereof. When the surface tension reducer is a cationic surfactant, it can be selected from among arginine methyl esters, alkanolamines and alkylenediamides and mixtures thereof. When the surface tension reducer is an amphoteric agent, it can be selected from among betaines, sulphobetaines, imidazoline betaines and alkyl amido propyl betaines. When the surface tension reducer is a nonionic surfactant, it can be selected from among condensation products of ethylene oxide with aliphatic alcohols having from 8 to 22 carbon atoms in either straight or branched chain configuration, condensation products of ethylene oxide with nonyl phenol, phenol, butyl phenol, di-nonyl phenol, octyl phenol or other phenols, sorbitan esters and amine oxides, ethoxylated $C_{10}$-$C_{20}$ alcohols, fatty acids, fatty amines or glyceryl esters, alkyl polyglycosides, methyl glucoside esters, and blends of such nonionic surfactants. The surface tension reducer can include a polyol or a derivative of a polyol.

In the systems and methods provided herein, the adhesion promoter composition can include an amount of surface tension reducer from about 0.01% to about 50% based on the weight of the adhesion promoter composition. The adhesion promoter composition can include a solvent. Any solvent compatible with the surface tension reducer can be included in the adhesion promoter composition. Exemplary solvents include acetaldehyde, acetone, acetonitrile, acrolein, benzene, benzonitrile, bromo-benzene, butanol, butyl acetate, n-butyl amine, t-butyl amine, butyl bromide, carbitol acetate, carbon disulfide, carbon tetrachloride, chlorobenzene, chloroform, cyclohexane, cyclohexanone, cyclopentane, m-dichlorobenzene, o-dichloro-benzene, diethyl carbitol, diethyl ether, dioxane, ethanol, ethyl acetate, ethyl bromide, ethylene glycol, ethyl methyl ketone, glycerin, heptane, heptanone, hexane, hexanol, 1,5-hexadiene, isoamyl acetate, isooctane, isopentane, isopropanol, methanol, methyl cyclohexane, nitroethane, nitromethane, n-octane, octanol, i-pentane, m-pentane, propanol, propylene glycol, pyridine, toluene, thiophene, trichloroethylene, water, m-xylene or p-xylene or any combination thereof. If present in the adhesion promoter composition, the solvent can be present in an amount from about 0.05% to about 85% based on the weight of the adhesion promoter composition.

In the systems provided herein that include a cryogen supply module, the cryogen supply module is in fluid communication with the heat transfer system of the magneto-cryogenic valve and provides a cryogen to the heat transfer system. Any cryogen known in the art can be included in the system. For example, the cryogen can include liquid carbon dioxide, liquid ammonia, liquified chlorofluorohydrocarbons, liquid nitrogen, liquid oxygen, liquid neon, liquid argon, liquid nitrous oxide, hydrofluoroethane, pentafluoropropane, trichloromonofluoromethane or dichlorodifluoromethane, or a mixture or any combination thereof. The cryogen supply module can include a non-thermally conducting surface in contact with the environment to thermally isolate the cryogen supply module from the environment. The cryogen supply module can include a thermal monitoring device for monitoring the temperature of the cryogen or the pipes carrying the cryogen or a combination thereof. The cryogen supply module can include a flow rate meter for determining the flow rate of cryogen from the module. The system can include a pump in fluid communication with the cryogen supply module and the heat transfer system for pumping the cryogen to the heat transfer system. The cryogen supply module also can include one or more of a flow rate meter, a flow-control metering valve, an isolation valve, an emergency shut-off valve, an over-pressure valve, a diverter valve, a heating unit, or a thermal monitoring device or any combination thereof.

The systems provided herein can include a computer module for partial or complete automation of the system. The computer module can include a computer in communication with and/or in control of any part of the magneto-cryogenic valve or element of the system containing the magneto-cryogenic valve. The computer module can control or allow automation of the magnetic field generating device, or the cryogen supply module, or the injector slurry module, or the adhesion promoter composition supply module or any combination thereof. In the systems provided herein, the computer module can include a non-transitory computer-readable storage medium having a computer-readable program embodied therein for directing operation of the magneto-cryogenic valve and/or any component of the system.

Also provided herein are methods for temporarily preventing the flow of fluid in a conduit. The methods include activating a magneto-cryogenic valve as provided herein attached to the conduit, or activating a system provided herein that includes a magneto-cryogenic valve attached to the conduit. The heat transfer system of the magneto-cryogenic valve is in thermal contact with at least one portion of the conduit and each of the first injector and second injector of the magneto-cryogenic valve when activated introduces a material into the fluid in the conduit, where the activated magneto-cryogenic valve or system removes sufficient thermal energy from the fluid to cause the fluid to freeze to form a reversible plug that prevents the fluid from flowing past the plug through the conduit. Activating the magneto-cryogenic valve can include charging the heat transfer system so that it is able to extract thermal energy. When a cryogen cooled heat transfer system is part of the magneto-cryogenic valve, charging the heat transfer system includes activating a cryogen supply module to provide cryogen to the heat transfer system.

Activating the magneto-cryogenic valve can include activating a pump attached to the adhesion promoter composition supply module to cause adhesion promoter to be injected into the fluid within the conduit via the first injector of the magneto-cryogenic valve. Activating the magneto-cryogenic valve can include activating the pressure regulator system attached to the injector slurry supply module to cause injector slurry composition to be injected into the fluid of the conduit via the second injector of the magneto-cryogenic valve. Activating the magneto-cryogenic valve can include activating the magnetic field generating device to produce magnetic fields. The strength, size, shape and position of the magnetic field generating device(s) can be selected so that the magnetic field generated produces field lines at least a portion of which penetrate through to the fluid flowing through the valve chamber and interact with the magnetically susceptible particles injected into the fluid flowing through the valve.

The magnetic fields of the magnetic field generating device interact with the magnetically susceptible particles of the injection slurry so that the magnetically susceptible particles are directed to a desired location or region within the conduit or valve chamber, e.g., at least a portion of the particles can be directed to the inner wall of the conduit in the vicinity of attachment of the heat transfer system. For example, positioning of the magnetically susceptible particles near the inner wall of the conduit results in the freezing of at least some portion of the fluid of the conduit onto the wall of the conduit or valve chamber or onto previously frozen fluid or magnetically susceptible particles attached to the inner wall of the conduit or valve chamber.

The release of the cold magnetically susceptible particles into the fluid of the conduit can result in the precipitation of at least some portion of the fluid within the conduit onto the wall of the conduit or valve chamber or onto previously frozen fluid attached to a wall of the conduit or valve chamber or onto the magnetically susceptible particles to form frozen fluid coated particles. The frozen fluid coated particles can interact with particles attached to the wall of the conduit or valve chamber or onto previously frozen fluid attached to a wall of the conduit or valve chamber. Frozen fluid concentrically can accumulate along the inside of the conduit or valve chamber, accelerated by the magnetically susceptible particles.

In the methods provided herein, the first injector of the magneto-cryogenic valve can be positioned so that the injection of the adhesion promoter composition into the fluid of the conduit occurs before the second injector introduces the injection slurry composition into the fluid of the conduit. The heat transfer system or the second injector injecting the injection slurry composition or both is/are activated for a sufficient amount of time to form a frozen plug of fluid attached to an inner wall of the conduit or valve chamber that prevents flow of the fluid through the conduit.

When fluid flow is to be resumed in the conduit, e.g., after repairs have been made, the methods provided herein can include as a step increasing the temperature in the vicinity of the attachment of the heat transfer system to donate thermal energy to the conduit or plug or both, thereby at least partially melting the frozen plug and restoring at least partial flow of the fluid through the conduit. The temperature can be increased by activating a heating device. Any heating device known in the art can be used. For example, the heating device can include Curie temperature heaters, conductor-in-conduit heaters, heater strips, ceramic heaters, resistance wire heaters and resistance ribbon heaters.

The temperature in the vicinity of the attachment of the heat transfer system or plug also can be increased by inducing an alternating magnetic field using the magnetic field generating device to produce inductive heating of the magnetically susceptible particles in the frozen plug, thereby at least partially melting the frozen plug and restoring flow of the fluid through the conduit. In methods that include magnetic induction heating to at least partially melt the frozen plug, the injection slurry composition can include at least some portion of magnetically susceptible particles that have a ferromagnetic coating. The coating can completely envelope the particle, but it is not necessary that the coating does so. In the methods provided herein, the injection slurry composition can include magnetically susceptible particles that include a ferromagnetic coating, and these particles can be injected into the fluid within the conduit after at least a portion of the fluid has begun to form on the walls of the conduit, thereby positioning the ferromagnetic coated magnetically susceptible particles in the interior of the frozen plug of fluid. In some methods, the injection slurry composition can include magnetically susceptible particles that include a ferromagnetic coating, and these particles can be initially injected into the fluid within the conduit, thereby positioning the ferromagnetic coated magnetically susceptible particles in the exterior portion of the frozen plug of fluid. In some methods, the magnetic fields of the magnetic field generating device are adjusted during deposition of the ferromagnetic coated magnetically susceptible particles so that the particles accumulate along one side of the forming frozen plug. Introduction of alternating magnetic fields to produce magnetic induction heating in the particles, at least partially by virtue of the ferromagnetic coatings on the beads, can result in targeted melting of the frozen plug, producing a channel or path through which the fluid can flow while at least a portion of the plug remains attached to the inner conduit wall.

In the methods provided herein, the fluid within the conduit can include a hydrocarbon gas or a hydrocarbon fluid or a combination thereof. In some instances, the fluid includes petroleum and the conduit is part of a pipeline or an oil well.

In the methods provided herein, the magnetically susceptible particles when injected into the fluid within the conduit can cause localized modulation in temperature and viscosity of the fluid within the conduit. The magnetically susceptible particles can be hollow or can be solid, or a combination of hollow and solid particles can be used. The magnetically susceptible particles can have a very broad particle size distribution (e.g., from nanometer sized particles to particles 20 cm in diameter). The magnetically susceptible particles of the methods can have a particle size from about 1 nm to about 100 μm. The magnetically susceptible particles of the methods can have a particle size greater than 100 μm and less than 5 cm. For example, the magnetically susceptible particles used in the methods can have a particle size between about 1000 μm and about 1 cm. The average particle size can have a unimodal, bimodal or polymodal distribution.

The particles used in the methods can have any shape, such as cubes, flakes, granules, cylinders, rings, rods, needles, prisms, disks, fibers, pyramids, spheres, spheroids, prolate spheroids, oblate spheroids, ellipsoids, ovoids, hexahedrons, hexagonal prisms, tetrahexahedrons, octahedrons, truncated octahedrons, dodecahedrons, triangular prisms or random non-geometric shapes or any combinations of these shapes.

In the methods provided herein, the heat transfer system can include a refrigeration system that contains a compressor, a condenser and a heat exchange unit. The compressor can include a reciprocating compressor, a rotary compressor, a screw compressor, a scroll compressor or a combination of any one of these compressors. The heat transfer system can include a refrigeration system that contains a vapor compression refrigeration system, a heat exchange unit, a magnetic refrigeration unit or a cryogenic cooling system or a combination thereof.

The methods provided herein can be used for temporarily isolating an oil well. Also provided are methods for temporarily preventing the flow of a fluid in a pipeline. Also provided are methods for temporarily preventing flow of a fluid in a production tubing. All of the methods include activating a magneto-cryogenic valve as provided herein attached to the conduit, or activating a system provided herein that includes a magneto-cryogenic valve attached to the conduit.

Other objects, features and advantages of the compositions, systems and methods described herein will become apparent to those skilled in the art from the following detailed description. It is to be understood, however, that the detailed description, while indicating certain embodiments of the devices, systems and methods described herein, are given by way of illustration and not limitation. Many changes and modifications within the scope of the present invention may be made without departing from the spirit thereof.

DETAILED DESCRIPTION

Brief Description of the Figures

The drawings described herein are for illustrative purposes only of selected embodiments and not all possible implementations, and are not intended to limit the scope of the present disclosure.

Corresponding reference numerals indicate corresponding parts throughout the several views of the drawings. For parts which are similar but not the same as parts originally specified with a given number, a prime (') of the original number(s) is used.

Figure 1:
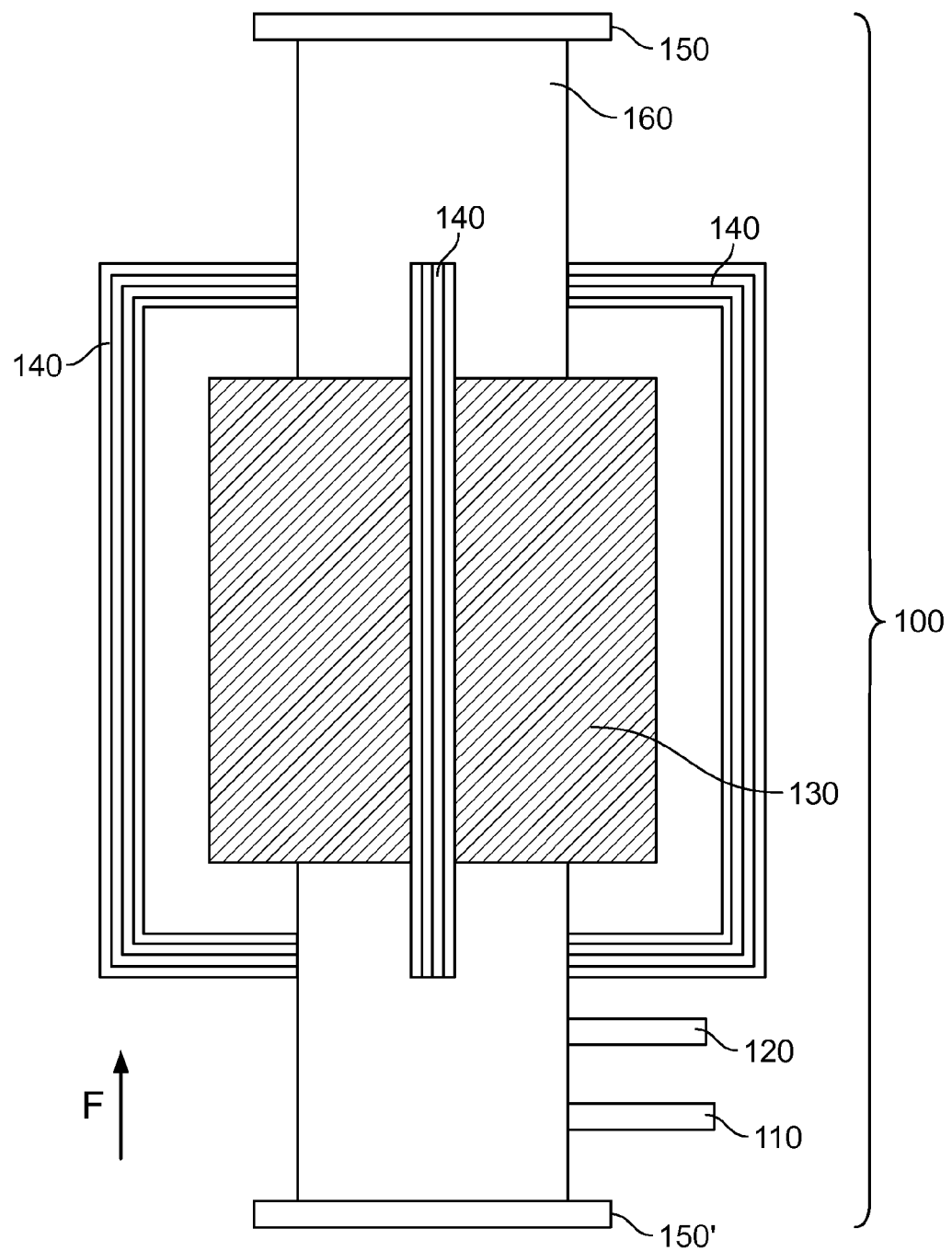
FIG. 1 is a top view of magneto-cryogenic valve 100 that includes a first injector device 110, a second injector device 120, a heat transfer system 130 and a plurality of magnetic field generating devices 140 integrated into a support channel 160 that can be connected to a conduit via connectors 150 and 150'. The direction of flow is indicated by F with an arrow indicating the flow direction.

The drawings in the present application and their accompanying detailed description are directed to merely exemplary implementations. The drawings are generally not to scale, some of the dimensions are for the clarity of presentation and are shown exaggerated in the drawings, and are not intended to correspond to actual relative dimensions.

Certain elements in some of the figures may be omitted, or illustrated not to scale, for illustrative clarity. The cross-sectional views may be in the form of "slices", or "near-sighted" cross-sectional views, omitting certain background lines which would otherwise be visible in a "true" cross-sectional view, for illustrative clarity. Further, only those elements which are useful to the understanding of the present invention have been shown and described. Although the views in the drawings for ease of description generally show similar orientations, this depiction in the drawings is arbitrary for the most part and the device could be illustrated and operated in any orientation.

A. DEFINITIONS

Unless defined otherwise, all technical and scientific terms used herein have the same meaning as is commonly understood by one of skill in the art to which the inventions belong.

All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used here, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described element, event or circumstance does or does not occur, and that the description includes instances where the element, event or circumstance occurs and instances where it does not. For example, an optional component in a system means that the component may be present or may not be present in the system.

In the examples, and throughout this disclosure, all parts and percentages are by weight (wt %) and all temperatures are in ° C., unless otherwise indicated.

As used herein, the phrase "based on the weight of the composition" with reference to % refers to wt % (mass % or (w/w) %).

As used herein, "particle" refers to a small mass that can be composed of any material, such as a metal, e.g., thermally conductive metals, and can be of any shape, including cubes, flakes, granules, cylinders, rings, rods, needles, prisms, disks, fibers, pyramids, spheres, spheroids, prolate spheroids, oblate spheroids, ellipsoids, ovoids, hexahedrons, hexagonal prisms, tetrahexahedrons, octahedrons, truncated octahedrons, dodecahedrons, triangular prisms or random non-geometric shapes or any combinations of these shapes. The particles can be isotropic or anisotropic.

As used herein, "diameter" refers to the length of a straight line through the center of an object, and such as the measurement of width or length of an anisotropic particle. As used throughout the specification, diameter refers to D90 diameter, which means that 90% of the particles have a diameter of this value or less.

As used herein, "specific surface area" is defined as the ratio of the total particle surface area versus the total particle volume.

As used herein, a "conduit" is a channel, tube, duct or pipe for conveying fluids.

As used herein, "fluid" refers to gases, liquids, supercritical fluids and materials that flow, optionally containing dissolved species, solvated species and/or particulate matter. Fluids also refer to multiple fluids of different types present together. In this context, fluid refers to any form of liquid or pumpable material such as gas, petroleum, drill fluid, cement, concrete or resin coated sand.

As used herein, "thermal energy" refers to power that produces heat.

As used herein, "thermal communication" refers to heat transfer between bodies that are in contact or that are integrally connected by a medium that transmits thermal energy. Such communication generally involves radiation, conduction, convection or a combination thereof. Thermal communication may involve fluid communication (e.g., convection or conduction) or may not involve fluid communication (e.g., radiation).

As used herein, "thermal contact" refers to an arrangement that provides good thermal communication from one surface to another and does not necessarily denote the absence of an intermediate layer between the two surfaces. The terms "thermal contact" includes any coupling between one component and another component that enables relatively efficient transfer of heat between the components. The components can be directly thermally contacted with each other, or they may be indirectly contacted (such as through a thermally conductive layer, block or conduit).

As used herein, "thermal transfer" refers to conveying thermal energy by one object to another.

As used herein, "fluid communication" refers to communication that involves the transfer of a fluid.

As used herein, "cooling rate" refers to how fast thermal energy is removed from an object. A value for cooling rate can be obtained by dividing the difference between the temperature at which cooling is started and the final cooling temperature by the time for reaching the final cooling temperature from the start of cooling. Generally, cooling rate refers to the decrease in temperature of an object over time. The cooling rate can be adjusted by control of the rate at which thermal energy is removed from the object. The details of heat exchange are well known to those in the art.

As used herein, "cryogen" refers to any substance having a boiling point below −40° C. Exemplary cryogens include liquid nitrogen, liquid nitrous oxide, liquid methane, liquid natural gas, or liquid or solid carbon dioxide, chlorodifluoromethane, or Freon®, or any number of other refrigerants or fluids with a high thermal energy transfer capacity and low boiling point, as are commonly known to those skilled in the art. Cryogens can readily induce a temperature differential when applied to an object.

As used herein, "cryogen liquid" refers to a cryogenic fluid in liquid phase. In some instances, cryogenic liquids are liquefied gases that have a normal boiling point below −238° F. (−150° C.). For example, liquid argon has a boiling point of −302.6° F. (−185.9° C.) and liquid nitrogen has a boiling point of −321° F. (−196° C.).

As used herein, the term "cryogenic" refers to cooling media that are used at a temperature of −40° C. or colder.

As used herein, "thermally conductive" refers to the property of a material to transfer or pass thermal energy or heat to another material or through itself. Thus, a thermally conductive material readily transfers thermal energy, either by conduction, convection or radiation, to another material or through itself.

As used herein, "thermally non-conductive" refers to the inability of a material to transfer or pass thermal energy or heat to another material or through itself and thus is a thermally insulating material.

As used herein, "thermal conductivity," $\lambda_1$, is defined as the quantity of heat transmitted, due to a temperature gradient, in unit time under steady conditions in a direction normal to a surface of unit area. Devices for measuring thermal conductivity are well known in the art (e.g., U.S. Pat. No. 4,283,935).

As used herein, "refrigeration" refers to the removal of heat from an object or fluid.

As used herein, "refrigerant" refers to any heat transfer medium, particularly a fluid medium, that is suitable for cooling applications. A refrigerant can be a cryogenic fluid in liquid phase, such as liquid argon or liquid nitrogen.

As used herein, "crude oil" or "petroleum" refers to oil recovered from below the earth's surface and that remains untreated or unrefined. Crude oil generally contains a mixture mainly of pentanes and heavier hydrocarbons that may be contaminated with sulphur compounds, is recovered or recoverable at a well from an underground reservoir, and generally is liquid at the conditions under which its volume is measured or estimated. Crude oil is referred to as "heavy" if its density is 900 kg/m$^3$ or greater, and is referred to as "light" or "conventional" if it has a density of less than 900 kg/m$^3$.

As used herein, "surface active agent" refers to a chemical, particularly an organic chemical, that when added to a liquid changes the properties of that liquid at a surface. The liquid can be any fluid.

As used herein, "surfactant" refers to surface active agent molecules that absorb at the air/water, oil/water and/or oil/water interfaces, substantially reducing their surface energy. The term "detergent" is often used interchangeably with the term "surfactant." Surfactants generally are classified depending on the charge of the surface active moiety, and can be categorized as cationic, anionic, nonionic and amphoteric surfactants.

As used herein, "silicone surfactant" refers to a surface active agent that includes at least one Si atom.

As used herein, "magnet" refers to a material or an article that may spontaneously or actively generate magnetic fields, where the strength of the magnetic fields can be measured by a conventional gaussmeter. A magnet can be a permanent magnet or an electromagnet.

As used herein, "magnetic" refers to a property of a material that may be able to spontaneously or actively generate magnetic fields.

As used herein, "permanent magnet" refers to any object that is magnetized and creates its own persistent magnetic field. Suitable ferromagnetic materials for a permanent magnet include iron, nickel, cobalt, rare earth metals and their alloys. The term "permanent" does not mean such a magnet could not lose its magnetism, for example, through exposure to heat, physical shock, or an opposing magnetic field.

As used herein, "electromagnet" refers to any device that is capable of creating a magnetic field through the application of electrical energy. Electromagnets can include a core and a coil or other element for carrying current to generate magnetic fields.

As used herein, "diamagnetic" refers to a material with a magnetic susceptibility less than 0 and particles of the material cause a weakening of magnetic induction relative to an applied magnetic field.

As used herein, "paramagnetic" refers to a material with a magnetic susceptibility greater than 0 and particles of the material cause a strengthening of magnetic induction relative to an applied magnetic field.

Neither a "paramagnetic" nor "diamagnetic" material may spontaneously or actively generate a magnetic field and thus are referred to as "non-magnetic" material.

As used herein, "ferromagnetic" refers to a material with a magnetic permeability very much greater than 1 and that exhibits non-linear, hysteretic behavior between magnetic induction and an applied magnetic field. Ferromagnetic materials often have their atoms arranged in a lattice with their magnetic moments aligned parallel to each other. Examples of ferromagnetic material include cobalt, iron and nickel.

As used herein, "ferrite" refers to a material that exhibits ferromagnetism. Ferromagnetism is a property exhibited by certain metals, alloys, and compounds of the transition (iron group) rare earth and actinide elements, in which the internal magnetic moments spontaneously organize in a common direction; ferromagnetism gives rise to a permeability considerably greater than that of vacuum and to magnetic hysteresis. See, e.g., page 706 of Sybil B. Parker's "McGraw-Hill Dictionary of Scientific and Technical Terms," (4$^{th}$ ed., McGraw-Hill Book Company, New York, N.Y., 1989).

As used herein, "magnetic permeability" refers to a property of a substance of retaining magnetic field lines and has a dimension of Tesla meter/ampere or Newton/ampere$^2$. The terms "relative magnetic permeability" and "relative permeability" refer to a ratio of the "magnetic permeability" of a substance of interest to that of air and, therefore, are dimensionless properties.

As used herein, "magnetic susceptibility" refers to a difference between the "relative permeability" and 1. The "magnetic susceptibilities" of the ferromagnetic materials are far greater than 0, while those of the paramagnetic and diamagnetic materials may only be slightly greater and less than 0, respectively.

As used herein, "magnetically susceptible particles" refers to particles that interact with a magnetic field. In some instances, the magnetically susceptible particles are attracted to a magnetic field.

As used herein, "in the vicinity of" refers to any location adjacent to or within the proximity of the stated location.

As used herein, "cryogenic cooling coils" refers to tubing or piping suitable for use with cryogens configured in a coil about a central structure, whereby when a cryogen is flowed through the coils, thermal energy is extracted from the central structure and transferred to the cooling coils, reducing the thermal energy of the central structure.

B. MAGNETO-CRYOGENIC VALVES

Provided herein are magneto-cryogenic valves for reversibly modulating flow of a fluid through a conduit. The magneto-cryogenic valves include a heat transfer system that is in thermal communication with at least a portion of the conduit, one or more injectors for injecting a material into the fluid from the conduit, and a magnetic field generating device that emits magnetic fields that can interact with magnetically susceptible particles injected into the fluid through one or more of the injectors. In some applications, the magneto-cryogenic valves include at least one injector device for injecting into the fluid from the conduit an injection slurry containing magnetically susceptible particles, and at least one injector device for injecting an adhesion promoter composition into the fluid from the conduit.

The magneto-cryogenic valve can include a chamber into which the fluid from the conduit flows and into which the magnetic fields of the magnetic field generating device(s) can be directed, positioning the magnetically susceptible particles within the chamber. The number and configuration of the magnetic field generating devices can be varied in order to produce a magnetic field in the center of the chamber, or away from the center of the chamber, or to create a plurality of magnetic field zones within the chamber. The chamber can be located in close proximity to the heat exchange unit in order to enhance transfer of thermal energy out of the chamber.

The width of the chamber can be varied and be proportional in scale to the inlet pipe size, e.g., the inner diameter of the conduit to which the magneto-cryogenic valve is connected. In some instances, the width of the chamber will be at least 1×, at least 1.5×, at least 2×, at least 2.5×, at least 3×, at least 3.5×, at least 4×, at least 4.5×, at least 5×, at least 5.5×, at least 6×, at least 6.5×, at least 7×, at least 7.5×, at least 8×, at least 8.5×, at least 9×, at least 9.5× or at least 10× the inlet pipe inner diameter. For example, a chamber for use with an inlet pipe having a 2 inch inner diameter can be about 6 inches in diameter, which would be about 3× the inner diameter of the inlet pipe. The width of chamber generally will not be less than 1× the inner diameter of the inlet pipe, so that the chamber would not interfere with the ability of equipment such as pipeline cleaning pigs, monitors or other movable inline inspection devices to traverse the chamber unimpeded.

The length of the chamber can be varied and be proportional in scale to the inlet pipe size, e.g., the inner diameter of the conduit to which the magneto-cryogenic valve is connected. Generally, a pipe with a larger diameter would be expected to perform better with a chamber of a longer length. In some instances, the length of the chamber will be at least 1.5×, at least 2×, at least 2.5×, at least 3×, at least 3.5×, at least 4×, at least 4.5×, at least 5×, at least 5.5×, at least 6×, at least 6.5×, at least 7×, at least 7.5×, at least 8×, at least 8.5×, at least 9×, at least 9.5× or at least 10× the inlet pipe inner diameter. For example, a chamber for use with an inlet pipe having a 2 inch inner diameter can be about 8 inches in length, which would be about 4× the inner diameter of the inlet pipe.

Figure 18:
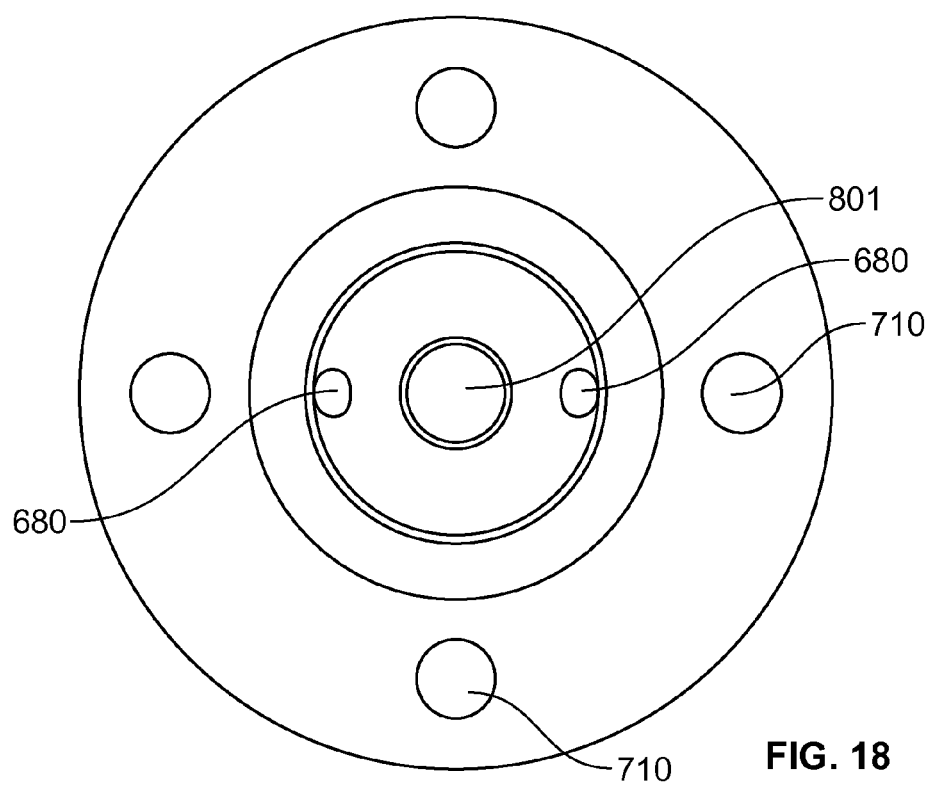
FIG. 18 is a top view of a cross section of a magneto-cryogenic valve 100 having no folds in the valve chamber wall, forming an essentially cylindrical valve chamber. Also shown are magnetic field generator ports 680, valve chamber bolt holes 710, and valve chamber exit 801.

The chamber can be configured to have any desired inner geometry. The chamber can be symmetric or asymmetric. In some instances, the chamber has a smooth, essentially circular chamber diameter resulting in a cylindrical sidewall geometry, as is shown in FIGS. 4, 5, 6A, 6B, and 18. As can be seen in FIG. 18, the zero-fold design of the chamber contains only a single symmetrical compartment. Ports 680 for the magnetic field generator are shown located opposite each other.

Figure 16:
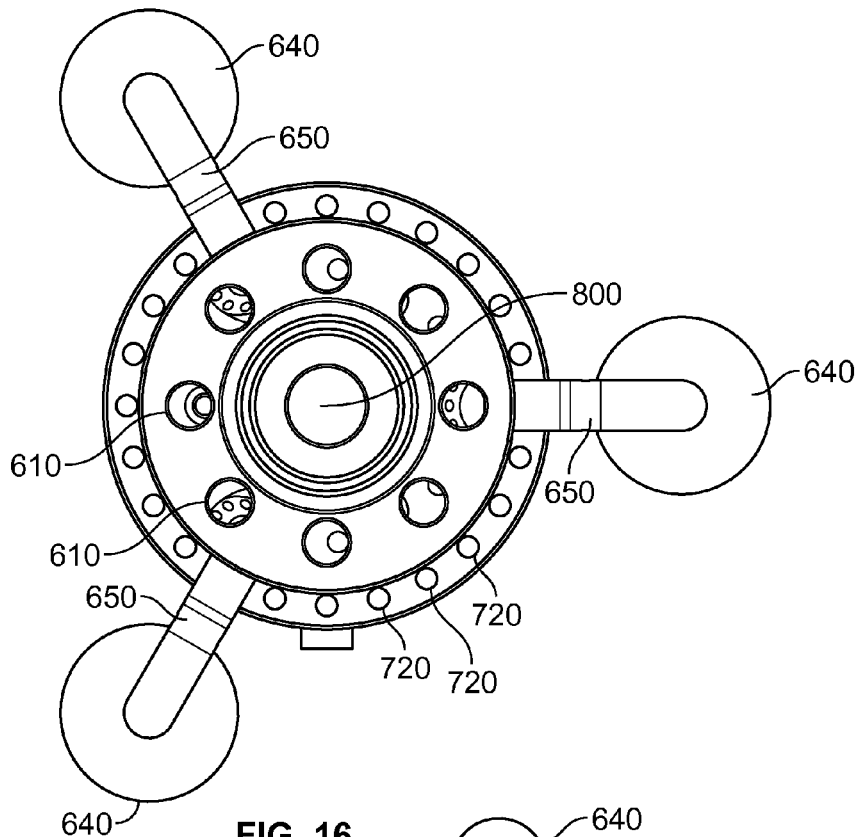
FIG. 16 is a top view of a magneto-cryogenic valve 100 showing flange bolt holes 720 in the first chamber segment flange 715, the flange bolt holes 610, the entry to chamber 800, the electromagnetic solenoid coils 640 and the electromagnetic cores 650.
Figure 17:
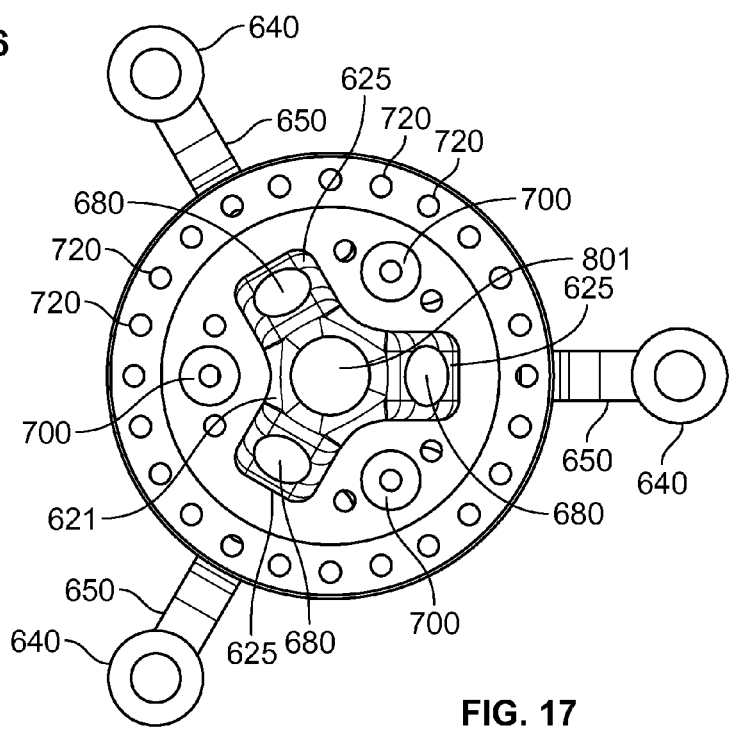
FIG. 17 is a top view of a cross section of a magneto-cryogenic valve 100 having three folds in the valve chamber wall to form a tri-lobed valve chamber configuration. The figure shows the first cooling chamber segments 700 in proximity to the folds 625 in the valve chamber wall, facilitating thermal transfer from the valve chamber to the cryogen flowing through the cooling chambers. Also shown are magnetic field generator ports 680, the electromagnetic solenoid coils 640, the electromagnetic cores 650, and valve chamber exit 801.
Figure 19A:
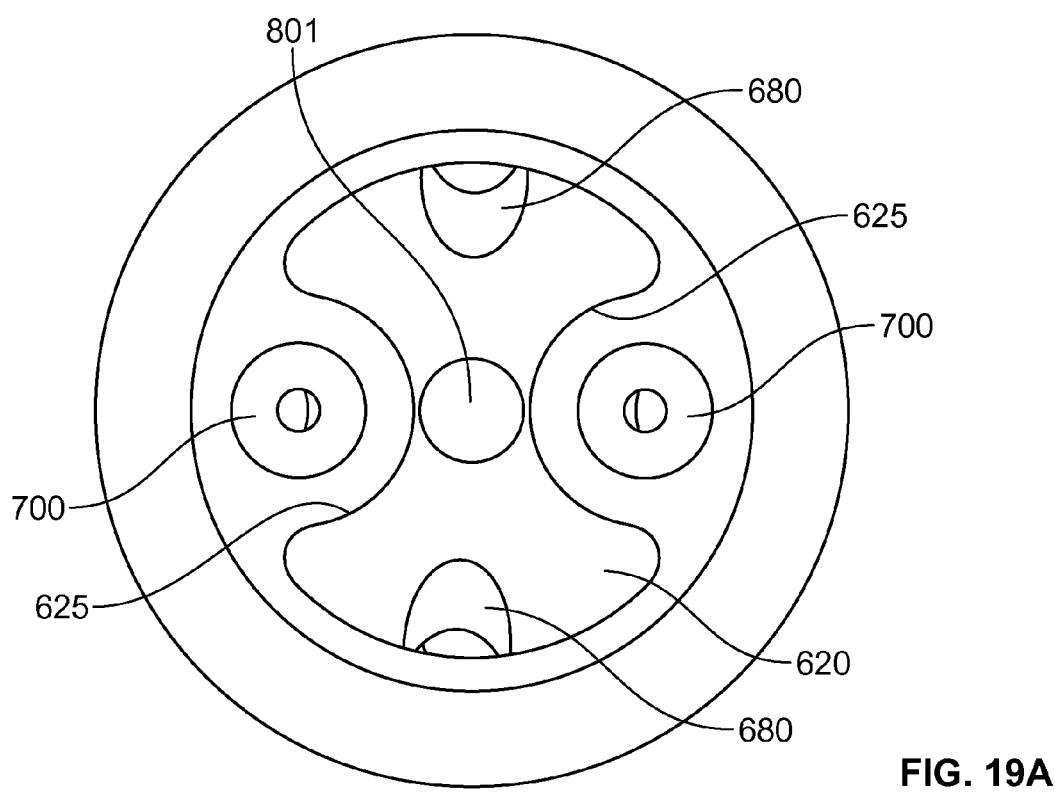
FIG. 19A is a top view of a cross section of a magneto-cryogenic valve 100 having two folds in the valve chamber wall to form a bi-lobed valve chamber configuration. The figure shows the cooling chamber segments 700 in proximity to the folds 625 in the valve chamber wall, facilitating thermal transfer from the valve chamber to the cryogen flowing through the cooling chambers. Also shown are magnetic field generator ports 680, and valve chamber exit 801.
Figure 19B:
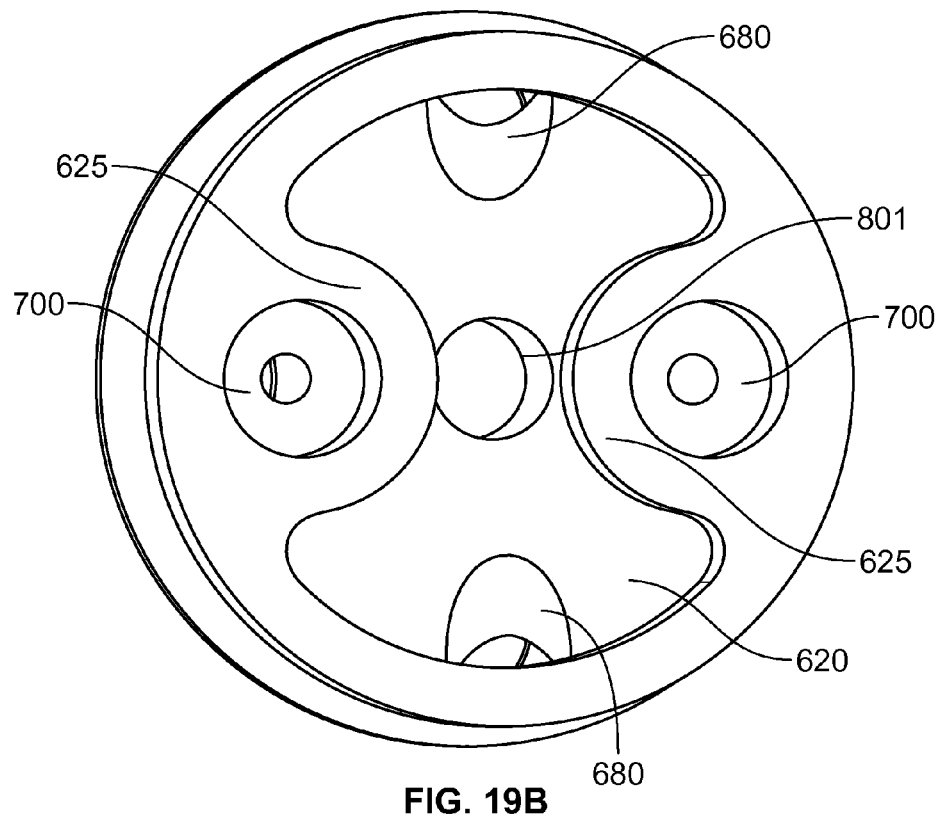
FIG. 19B is a skewed top view of a cross section of the magneto-cryogenic valve 100 of FIG. 19A.
Figure 23:
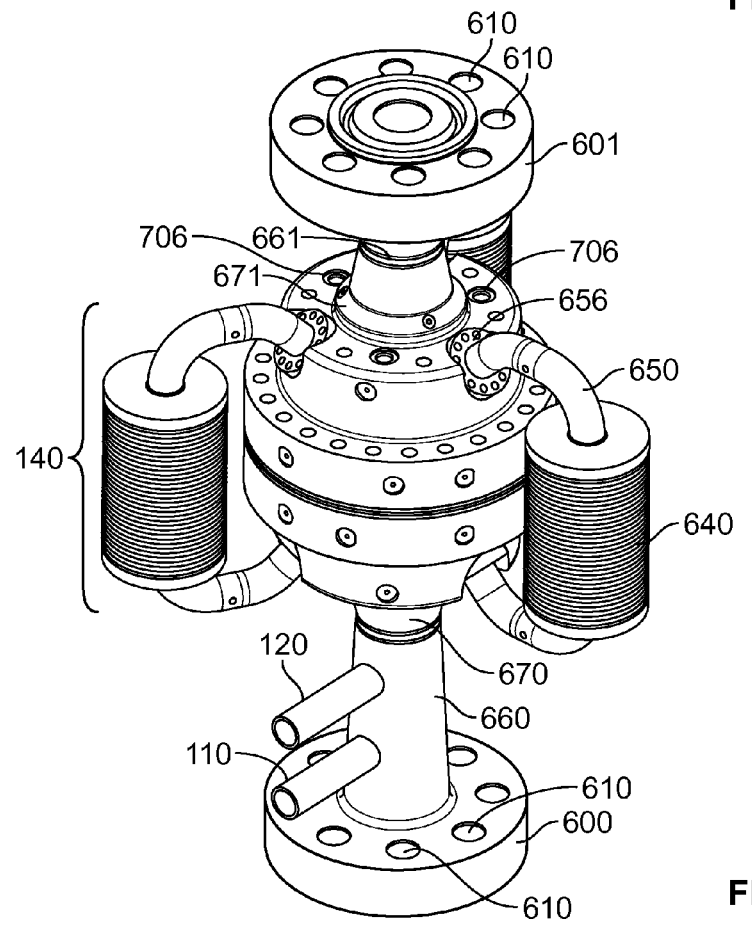
FIG. 23 is a side view of a magneto-cryogenic valve 100 that includes a plurality of protruding magnetic field generating devices 140 that include an electromagnetic solenoid coil 640 and an electromagnetic core 650, the devices 140 shown attached via an electromagnetic core flange 656. The magneto-cryogenic valve 100 includes a valve chamber formed by connecting a first valve chamber segment and a second valve chamber segment. The first valve chamber segment is shown connected to an incoming chamber-connecting conduit 670, which is attached to an incoming pipeline-connecting conduit 660, which contains a first injector device 110 and a second injector device 120. The incoming pipeline-connecting conduit 660 is connected to flange connector 600 containing flange bolts holes 610, which can be used to attach the valve 100 to a pipeline. The second valve chamber segment can be connected to an outgoing chamber-connecting conduit 671, which is attached to an outgoing pipeline-connecting conduit 661, which is attached to a flange connector 601 containing flange bolts holes 610, which can be used to attach the valve 100 to a pipeline.

The chamber also can include one or more folds to modify the surface area of the chamber. The folds can be inward (the chamber wall being pulled toward the center of the chamber) or outward (the chamber wall being away from the center of the chamber) or a combination thereof. For example, the chamber can include one inward fold, resulting in a chamber having a kidney shape. The chamber can include 2 or more folds. For example, a chamber containing two folds is shown in FIGS. 19A and 19B. A chamber containing three folds is shown in FIG. 17. When the first valve chamber segment, shown in FIG. 16, is attached to the second valve chamber segment, shown in FIG. 17, such as by bolts through bolt holes 720, a tri-lobed chamber is formed, with cooling chambers between two folds 625. A magneto-cryogenic valve containing a three-lobed chamber is shown in FIG. 23. As can be seen in the figure, the magneto-cryogenic valve includes three electromagnets as magnetic field generating devices 140, each having an electromagnetic solenoid coil 640 and an electromagnetic core 650. Ports 706 from each cooling chamber can be seen. Each cooling chamber is located within two lobes of the valve chamber, and each electromagnet is located at the apex of each lobe of the chamber.

Figure 21A:
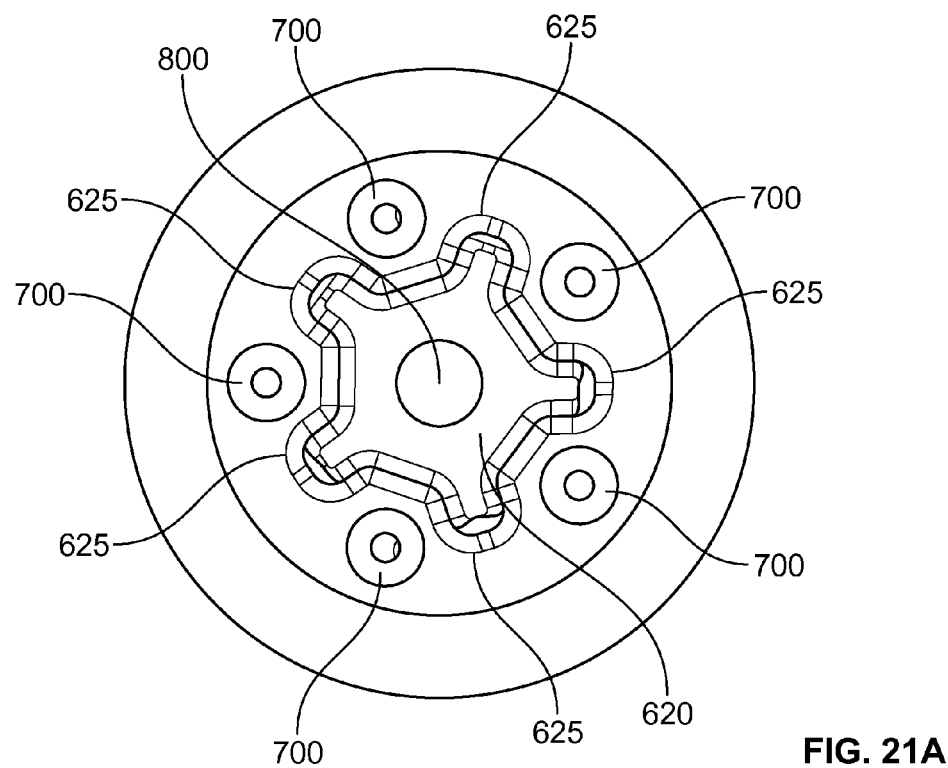
FIG. 21A is a top view of a cross section of a magneto-cryogenic valve 100 having five folds in the valve chamber wall to form a penta-lobed valve chamber configuration. The figure shows the cooling chamber segments 700 in proximity to the folds 625 in the valve chamber wall, facilitating thermal transfer from the valve chamber to the cryogen flowing through the cooling chambers.
Figure 21B:
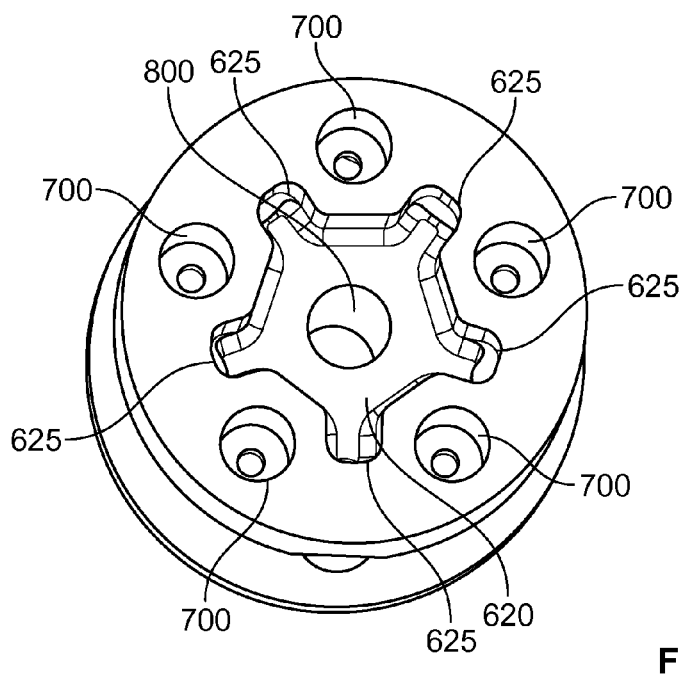
FIG. 21B is a skewed top view of a cross section of the magneto-cryogenic valve 100 of FIG. 21A.
Figure 22:
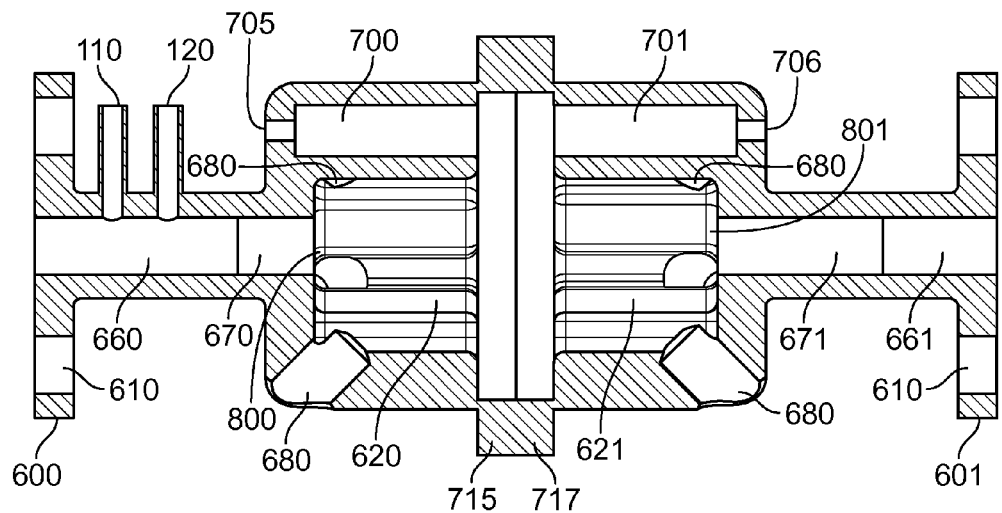
FIG. 22 is a cross section of a magneto-cryogenic valve 100 having five folds in the valve chamber wall to form a penta-lobed valve chamber configuration, containing five cooling chambers and ten magnetic field generating devices. For sake of clarity, only six of the magnetic field generating ports 680 are shown. For sake of clarity, only one of the cooling chambers is shown.

A chamber containing five folds is shown in FIGS. 21A, 21B and 22. The folds in the chamber enhance the transfer of thermal energy out of the material in the chamber to the heat exchange unit(s). The folds in the chamber also enhance the particle loading characteristics of the plug formed within the chamber. Any number of folds can be included in the chamber, e.g., at least 2, 3, 4, 5, 6, 7, 8, 9, 10, 11, 12, 13, 14, 15, 16, 17, 18, 19 or 20 folds. The side walls of the chamber can be of any geometry. In some instances, the walls are smooth. In some instances, the side walls can include etching, projections or indentations or combinations thereof. These can be configured to promote granular loading in the chamber during formation of the plug.

FIG. 22 is a cross section of a magneto-cryogenic valve 100 having five folds in the valve chamber wall to form a penta-lobed valve chamber configuration. The magneto-cryogenic valve contains five cooling chambers, each of which is located between the lobes of the chamber. The magneto-cryogenic valve as shown has ten magnetic field generating devices, which are located near the apex of each lobe of the chamber in the configuration shown. For sake of clarity, only six of the magnetic field generating ports 680 are shown. For sake of clarity, only one of the cooling chambers is shown.

Folded or lobed chambers can be configured so that one or more magnetic field generating devices are located at or near each fold of the chamber. The folded chambers also can be configured to include a heat exchange device between each fold of the chamber. For example, as shown in FIGS. 19A and 19B, for a two-fold or bi-lobed chamber, magnetic field generator ports 680 are located at the apex of each lobe, and cooling chambers 700 are located between each fold. As shown in FIG. 17, for a three-fold or tri-lobed chamber, magnetic field generator ports 680 are located at the apex of each lobe, and cooling chambers 700 are located between each fold. As shown in FIGS. 21A and 21B, for a five-fold or penta-lobed chamber, magnetic field generator ports 680 are located at the apex of each lobe, and cooling chambers 700 are located between each fold.

Figure 25:
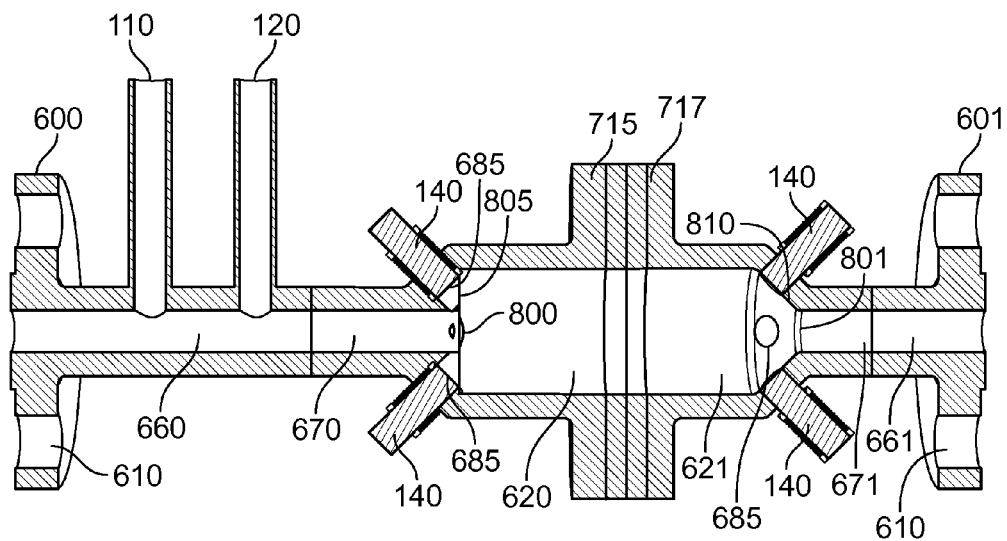
FIG. 25 is a cross section of a magneto-cryogenic valve 100 showing a valve chamber that does not have symmetrical end walls. The valve chamber shown has no folds and is essentially cylindrical. In the configuration shown, the first valve chamber segment 620 has a flat chamber wall 805 while the second valve chamber segment 621 has a sloped chamber wall 810. Four independent magnetic field generating devices 140 are shown, as is one magnetic field generator end 685.
Figure 28:
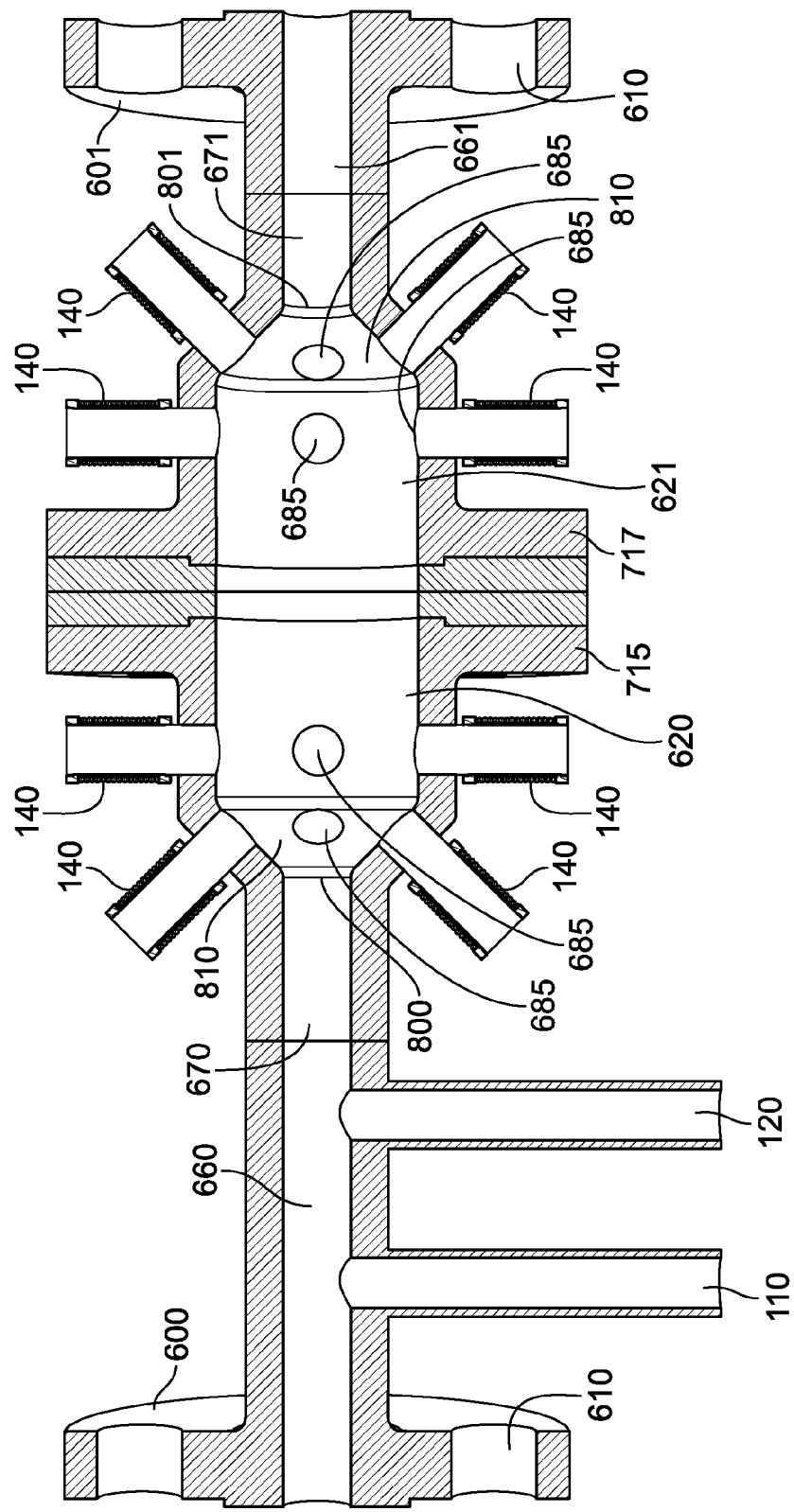
FIG. 28 is a cross section of a magneto-cryogenic valve 100 showing a valve chamber that has symmetrical end walls. The valve chamber shown has no folds and is essentially cylindrical. In the configuration shown, each of the first valve chamber segment 620 and the second valve chamber segment 621 has a sloped chamber wall 810. Eight independent magnetic field generating devices 140 are shown.
Figure 29:
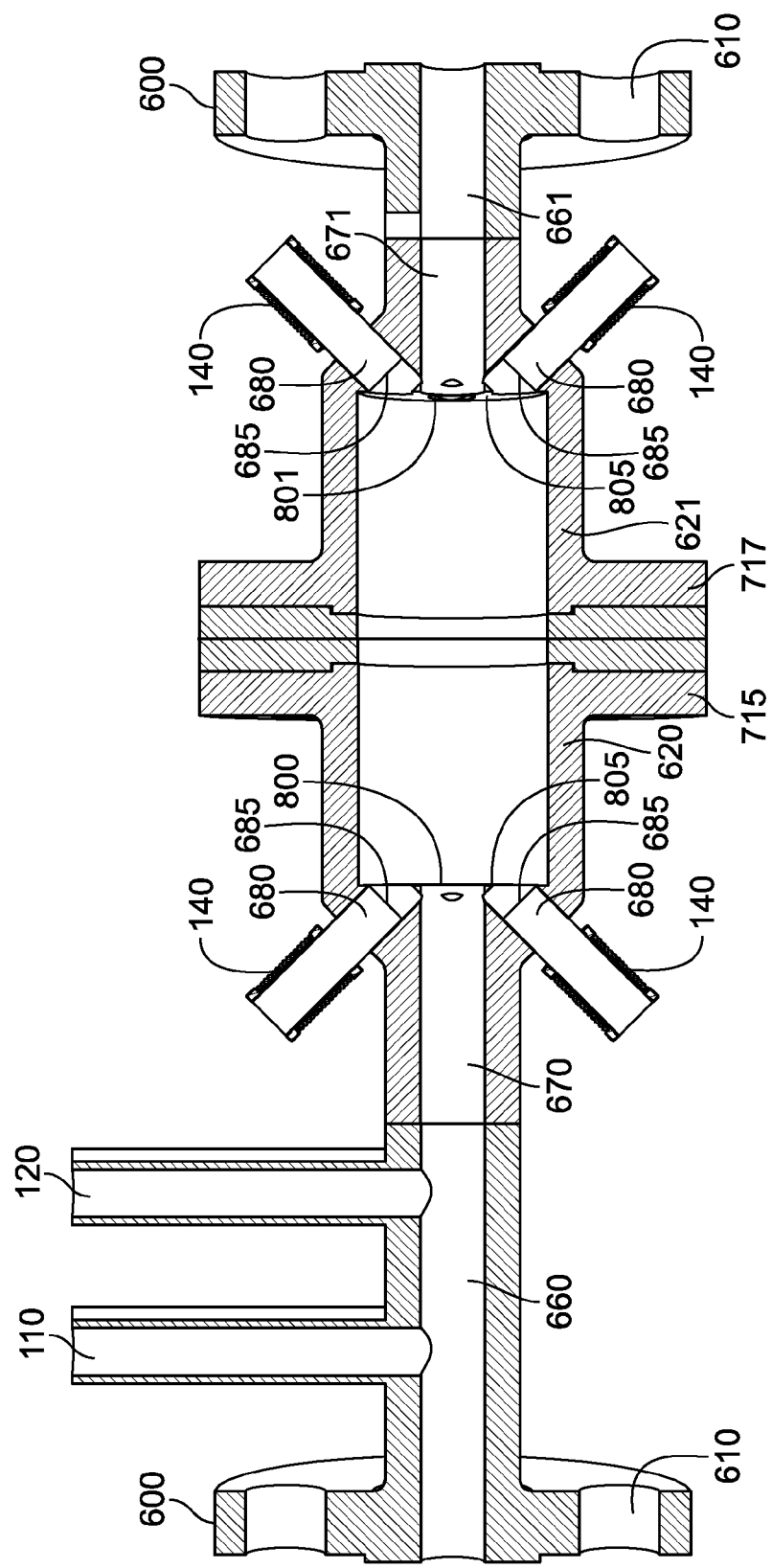
FIG. 29 is a cross section of a magneto-cryogenic valve 100 showing a valve chamber that has symmetrical end walls. The valve chamber shown has no folds and is essentially cylindrical. In the configuration shown, each of the first valve chamber segment 620 and the second valve chamber segment 621 has a flat chamber wall 805. Four independent magnetic field generating devices 140 are shown.

The end walls of the chamber (the entry and exit walls of the chamber) can be of any geometry and can be the same or different. A chamber having two 90° (flat) end walls is shown in FIG. 29. A chamber having two 45° (sloped) end walls is shown in FIG. 28. A chamber having one 90° (flat) end wall and one 45° (sloped) end wall is shown in FIG. 25. Although the figures illustrate sloped end walls having approximately a 45° angle, the size and the angle of the end walls can be adjusted and can be of any angle including negative angles. The end walls also can be of a compound geometry, such as sloping for a distance away from the inlet or outlet pipe, then having a drop-off to the inner wall of the chamber. In some applications, the end walls can have a stepped configuration from the inlet or outlet pipe to the inner wall of the chamber. The size, shape and configuration of the end walls can modulate the flow within the chamber, and can be adjusted to promote granular bed formation.

Figure 3:
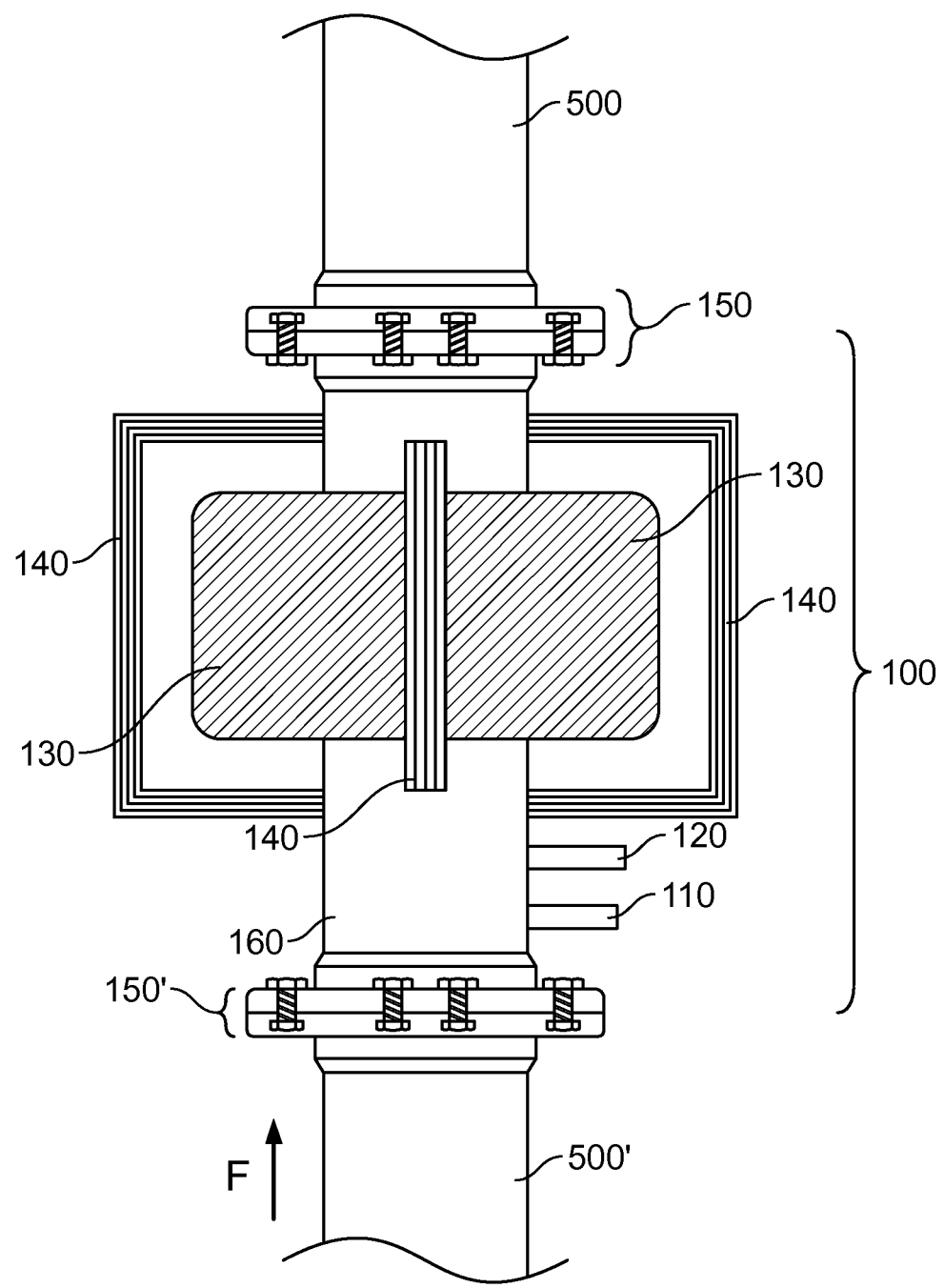
FIG. 3 is a top view of a magneto-cryogenic valve 100 connected to a conduit, where the support channel 160 of the magneto-cryogenic valve 100 is of the same diameter as the diameter of the conduit to which it is attached.
Figure 12:
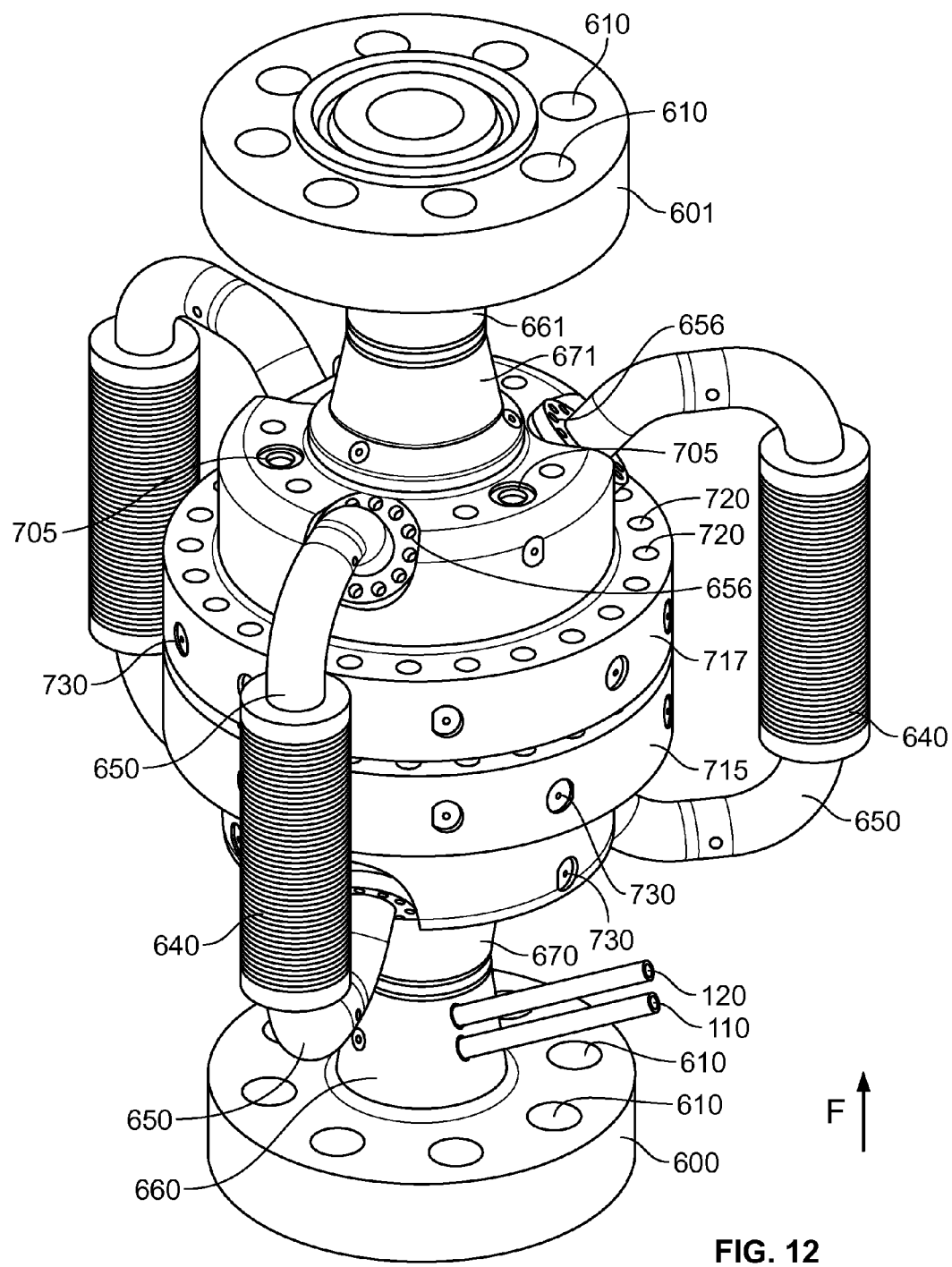
FIG. 12 is a skewed side view of the magneto-cryogenic valve 100 of FIG. 11. In this view the flange bolt holes 610 and the ports 705 to the cooling chambers are visible. The first chamber segment and second chamber segment of the valve chamber also are slightly separated to show the flange bolt holes 720 in the first chamber segment flange 715 and the second chamber segment flange 717 of the valve.

The chamber of the magneto-cryogenic valve can be one piece, such as a pipeline fitted to the inlet pipeline and outlet pipeline with the appropriate fittings for example, see FIG. 3. The chamber of the magneto-cryogenic valve can include several interconnecting pieces to form the chamber. For example, the chamber can include two segments connected together. For example, FIG. 12 shows a magneto-cryogenic valve that includes two chamber segments, where the first chamber segment has a flange 715 and the second chamber segment has a flange 717, and the two chamber segments can be joined together using bolts and nuts via flange bolts holes 720. The chamber segments can be joined together using any technique known in the art. For example, the chamber segments can be joined together using nuts and bolts, welding, screws, rivet bolts, a bayonet fitting, interlocking tabs or any combination thereof. When using nuts and bolts to join the chamber together, the number of bolts used to join the flanges can be determined based on the design of the chamber and the internal valve pressures expected to be experienced by the valve.

The valve chamber can have smooth walls. The valve chamber can include at least one wall that is ridged, fluted, grooved, furrowed, crinkled, puckered, creased or wrinkled or any combination thereof. The valve chamber walls can include etching, projections or indentations or combinations thereof.

The magneto-cryogenic valve modulates the flow of a fluid through a conduit by forming a reversible plug by removing thermal energy from the fluid within the conduit, resulting in the formation of a frozen plug of fluid that adheres to the inner wall of the conduit or valve chamber, thereby stopping flow of fluid through the conduit. The adhesion of the frozen plug to the inner conduit wall or valve chamber can be increased by introducing an adhesion promoter composition into the fluid via one or more of the injectors. The frozen plug adheres to the inner surface of the conduit with sufficient adherence to withstand the hydraulic pressure of the fluid, stopping the flow of the fluid within the conduit. In some applications, the magnetic field can be configured so that the magnetically susceptible particles are entrapped within the magnetic field in any desired region within the valve chamber, or in multiple regions within the valve chamber. In some applications, the magnetic fields can be positioned so that the magnetically susceptible particles are directed to the center of the valve chamber, or to one end of the valve chamber, or to the walls of the valve chamber, or any combination thereof. The frozen plug that forms adheres to the inner wall of the conduit or valve chamber. The plug containing a packed granular bed of magnetically susceptible particles transfer the upstream pressure load from the fluid in the conduit to the walls of the valve chamber in the magneto-cryogenic valve, which stops the flow of fluid through the magneto-cryogenic valve and helps to maintain plug integrity.

An exemplary magneto-cryogenic valve is depicted in FIG. 1. FIG. 1 is a top view of magneto-cryogenic valve 100 that includes a first injector device 110, a second injector device 120, a heat transfer system 130 and a plurality of magnetic field generating devices 140 integrated into a support channel 160 that can be connected to a conduit via connectors 150 and 150'. The direction of flow is indicated by F with an arrow indicating the flow direction. The configuration of the magnetic field generating devices is in a quadrupole configuration, but other configurations can be used. With the quadropole configuration of the magnetic field generating devices, the magnetic field in the center is very low and can be zero, and the magnetic field increases as one moves away from the center. This configuration can be used to direct the magnetically susceptible particles in the fluid toward the walls of the conduit, since the magnetic field would be much greater toward the inner surface of the conduit than in the center of the conduit. Other configurations can be used so that the magnetic fields direct the magnetically susceptible particles to the center of the valve chamber, or to one end of the valve chamber, or to the walls of the valve chamber, or any combination thereof. The first injector device 110 can be used to inject an adhesion promoter composition into the fluid of the conduit. As shown in FIG. 1, the first injector device 110 can be positioned some distance from the second injector device 120 to allow the adhesion promoter composition to be mixed with the fluid flowing through the conduit or valve chamber.

The heat transfer system of the magneto-cryogenic valve can be adapted to fit to the surface of at least a portion of a conduit with sufficient thermal intimacy that thermal energy can by transferred between the conduit and the heat transfer system. Any device that can transfer thermal energy between two surfaces can be used as a heat transfer system. In the magneto-cryogenic valves provided herein, a heat sink for transfer of thermal energy away from the conduit and the fluid therein can be used. Hence, the heat transfer system can include a refrigeration system to provide a differential in temperature so that thermal energy moves out of the fluid of the conduit and into the heat transfer system. Examples of refrigeration systems that can be used to reduce the temperature of, or impart negative thermal energy to, the heat transfer system include vapor compression refrigeration systems, especially with a single stage or rotary compressor, heat exchange units, electric thermal transfer devices and cryogenic cooling and absorption systems.

Figure 8:
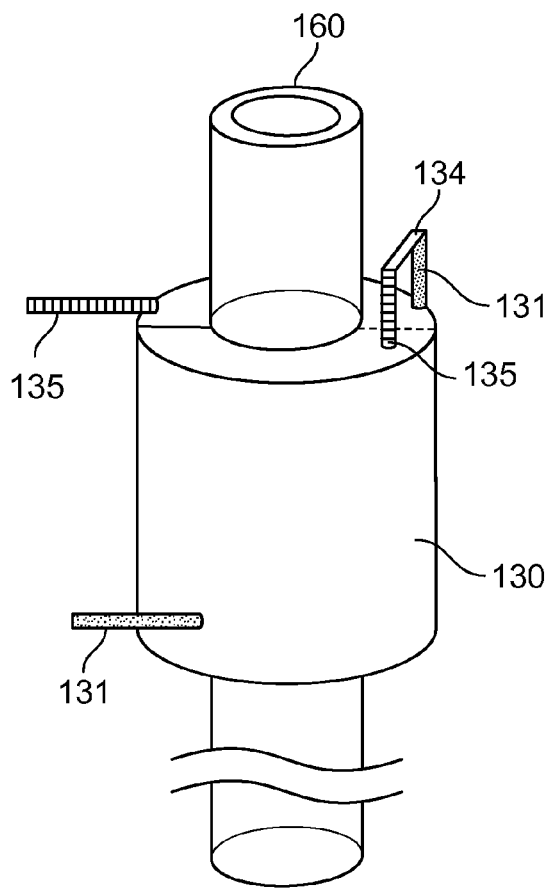
FIG. 8 is a side view of a heat exchange unit depicting the interconnection of two segments of a heat exchange unit using a connector.

The heat transfer system can be attached to the conduit in a permanent or a detachable configuration. The heat transfer system can include an annular chamber affixed around the conduit to form a cooling zone through which thermal energy is extracted from the conduit and the fluid therein. An exemplary heat transfer system is shown in FIG. 8. The heat transfer system is a cryogen cooled system. It can be a single continuous apparatus that encircles or envelops the conduit or can comprise 2, 3, 4 or more interconnecting segments, such as arcs, that when assembled and interconnected, substantially or completely encircle or envelop the outer diameter of the conduit (two interconnecting segments are shown FIG. 8). When the conduit is a pipe with a circular shape, the heat exchange unit can be a single complete circular apparatus, two interconnection semi-circular segments or include several arc segments that when connected or interconnected encircle the pipe. The heat transfer system can include an inlet port 131 for accepting cryogen into the heat transfer system and an outlet port 135 for discharging cryogen from the heat transfer system. In some applications, the heat transfer system can include a thermal conductor surface containing a thermally conducting material and positioned at the interface between the heat transfer system and the conduit.

As shown in FIG. 8, the outlet port 135 of one segment of the heat transfer system is configured to be directly connected to the inlet port 131 of another segment of the heat transfer system. As shown, outlet port 135 of one segment of the heat transfer system can be configured to be connected to the inlet port 131 of another segment of the heat transfer system via a connector 134, such as tubing or piping. In some embodiments, a quick-connect connection can be included on each of inlet port 131 and outlet port 135 to allow for quick set up or replacement of segments of the heat transfer system or one or more heat transfer systems. Quick connect mechanisms are well known in the art (e.g., see U.S. Pat. No. 4,597,699). In the devices, systems and methods provided herein, the length of the heat exchange unit can vary and can be designed by one skilled in the art to be of any length. Because of the injection of the magnetically susceptible particles and, e.g., their concentration near the inner wall of the conduit in the vicinity of the heat transfer device, the length of the heat exchange unit can be dramatically reduced, thereby reducing the amount of cryogen necessary to initiate and maintain a frozen plug of fluid within the conduit or valve chamber.

Figure 9:
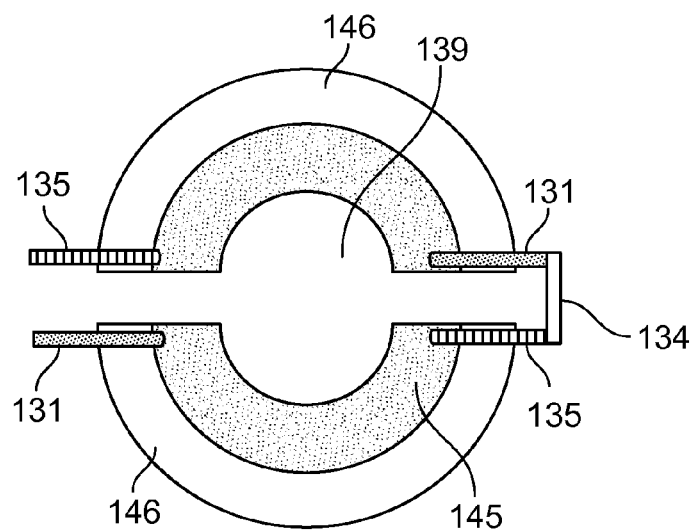
FIG. 9 shows a cross-section of a heat exchange unit of FIG. 8 depicting the interconnection of two segments of a heat exchange unit using a connector and containing thermally conducting particles.

FIG. 9 shows a cross-section of an exemplary cryogen cooled heat transfer system. The heat transfer system includes a space 139 to accommodate the conduit to which it is to be attached and to be in thermal communication therewith. Segments of pipe are assembled to form an outer casing and to envelop at least a portion of the conduit from which thermal energy is to be extracted. The outer wall of the conduit can serve as the inner wall of the heat transfer system, defining a cooling chamber within the heat transfer system when assembled around the conduit. Steel plates having an opening through which the conduit can pass are welded at each end of the outer casing and around conduit. With the steel plates welded in place, a sealed tube with a cavity between the conduit and the outer casing is formed, with the conduit protruding from each end. The cavity formed can be filled (partially or completely) with particles of a thermally conductive metal 145 and the heat transfer system can be coated with an insulator 146 to thermally isolate the heat transfer system from the environment. As shown, outlet port 135 of one segment of the heat transfer system can be configured to be connected to the inlet port 131 of another segment of the heat transfer system via a connector 134, such as tubing or piping.

Figure 10:
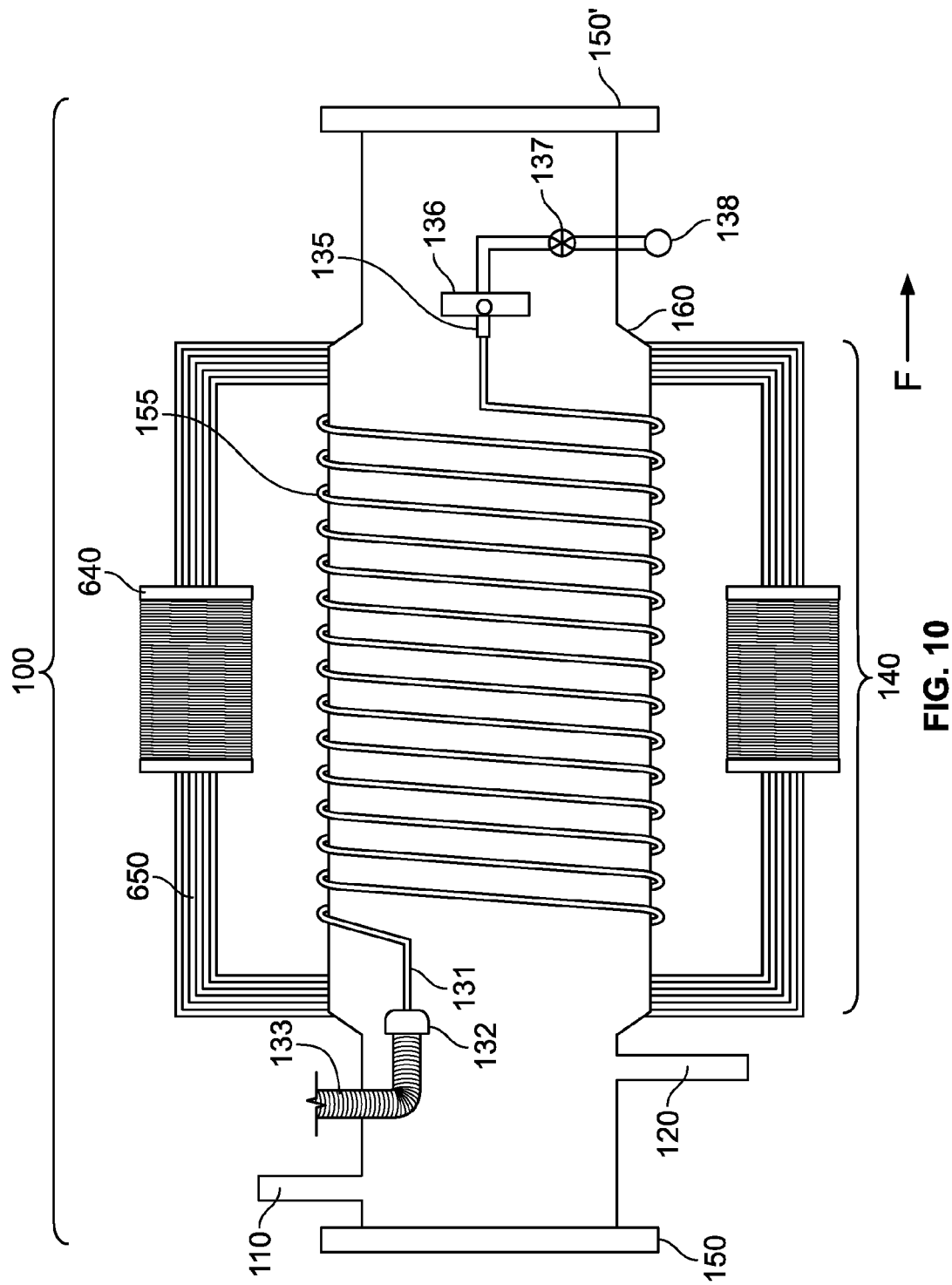
FIG. 10 is a side view of a magneto-cryogenic valve 100 that includes a first injector device 110, a second injector device 120, a heat transfer system that includes an inlet port 131, cryogenic cooling coils 155 and outlet port 135, and a plurality of magnetic field generating devices 140 that include an electromagnetic solenoid coil 640 and an electromagnetic core 650. The valve 100 can be connected to a conduit via connectors 150 and 150'. The inlet port 131 is shown connected to an inlet pressure regulator 132, which is connected to a cryogen supply module via pipe 133. The outlet port 135 is shown connected to an outlet pressure regulator 136, and a pressure relief valve 137 and a vent 138.

Alternative heat transfer systems can be used. For example, FIG. 10 shows a magneto-cryogenic valve 100 that includes, as a heat transfer system, cryogenic cooling coils 155. The cryogenic cooling coils 155 include an inlet port 131, that can be connected to an inlet pressure regulator 132, which is connected to a cryogen supply module via pipe 133. The cryogenic cooling coils 155 also include an outlet port 135 connected to an outlet pressure regulator 136, and a pressure relief valve 137 and a vent 138. The cryogenic cooling coils can be wrapped around the valve chamber of the magneto-cryogenic valve to extract thermal energy.

Figure 15:
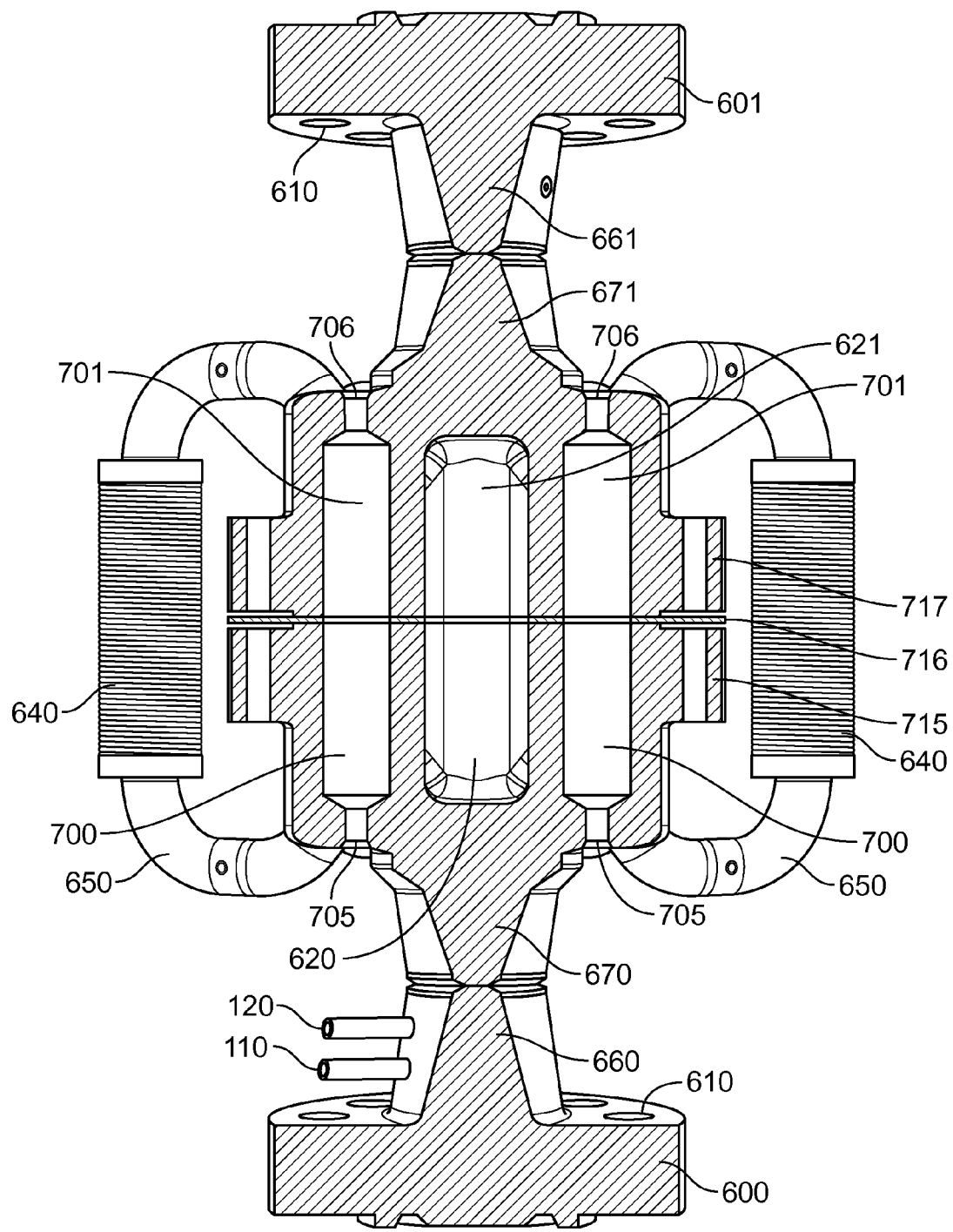
FIG. 15 is a cross section of a magneto-cryogenic valve 100 showing the first cooling chamber segments 700 adjacent to the first valve chamber segment 620, and the second cooling chamber segments 701 adjacent to the second valve chamber segment 621. When the first and second segments are joined, a plurality of cooling chambers in proximity to the valve chamber are formed. Cryogen enters each cooling chamber via a port 705 and exits via a port 706, (although this could be reversed so that the cryogen enters each cooling chamber via a port 706 and exits via a port 705).
Figure 20:
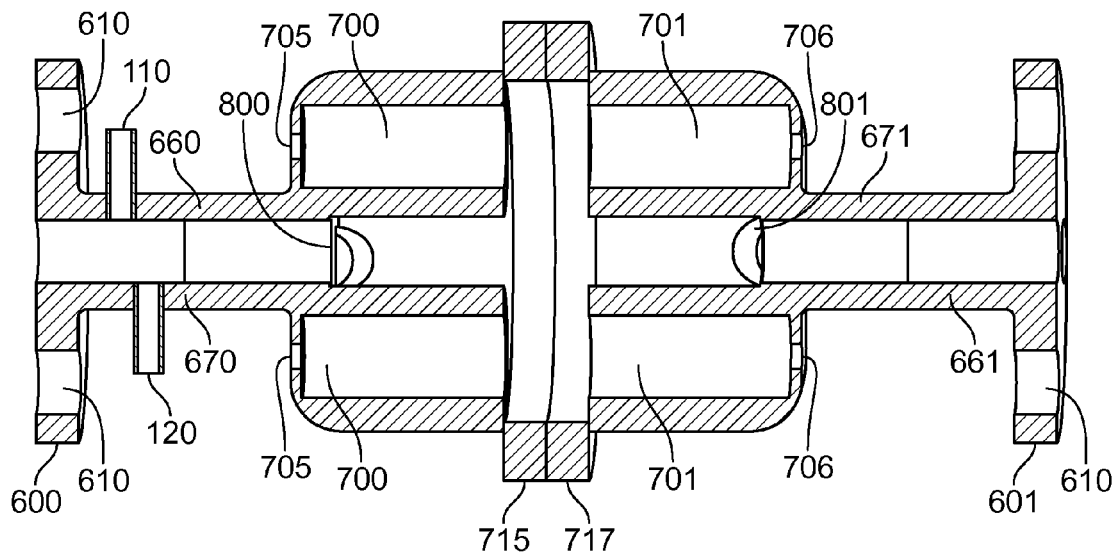
FIG. 20 is a cross section of a magneto-cryogenic valve 100 having two folds in the valve chamber wall to form a bi-lobed valve chamber configuration, containing two cooling chambers.

As another example, FIG. 15 shows a magneto-cryogenic valve 100 that includes, as a heat transfer system, a plurality of cooling chambers positioned near the wall(s) of the valve chamber. The cooling chambers can be engineered to be integrated into the valve. The cooling chambers can be formed by joining two or more cooling chamber segments. A cryogen can flow through the cooling chamber in order to remove thermal energy from the valve chamber. FIG. 20 shows a magneto-cryogenic valve 100 that includes two cooling chambers, made up of a first cooling chamber segment 700 and a second cooling chamber segment 701. A heat transfer system can include one or a plurality of cooling chambers, alone or in combination with additional heat transfer systems, such as cryogenic cooling coils.

Figure 27:
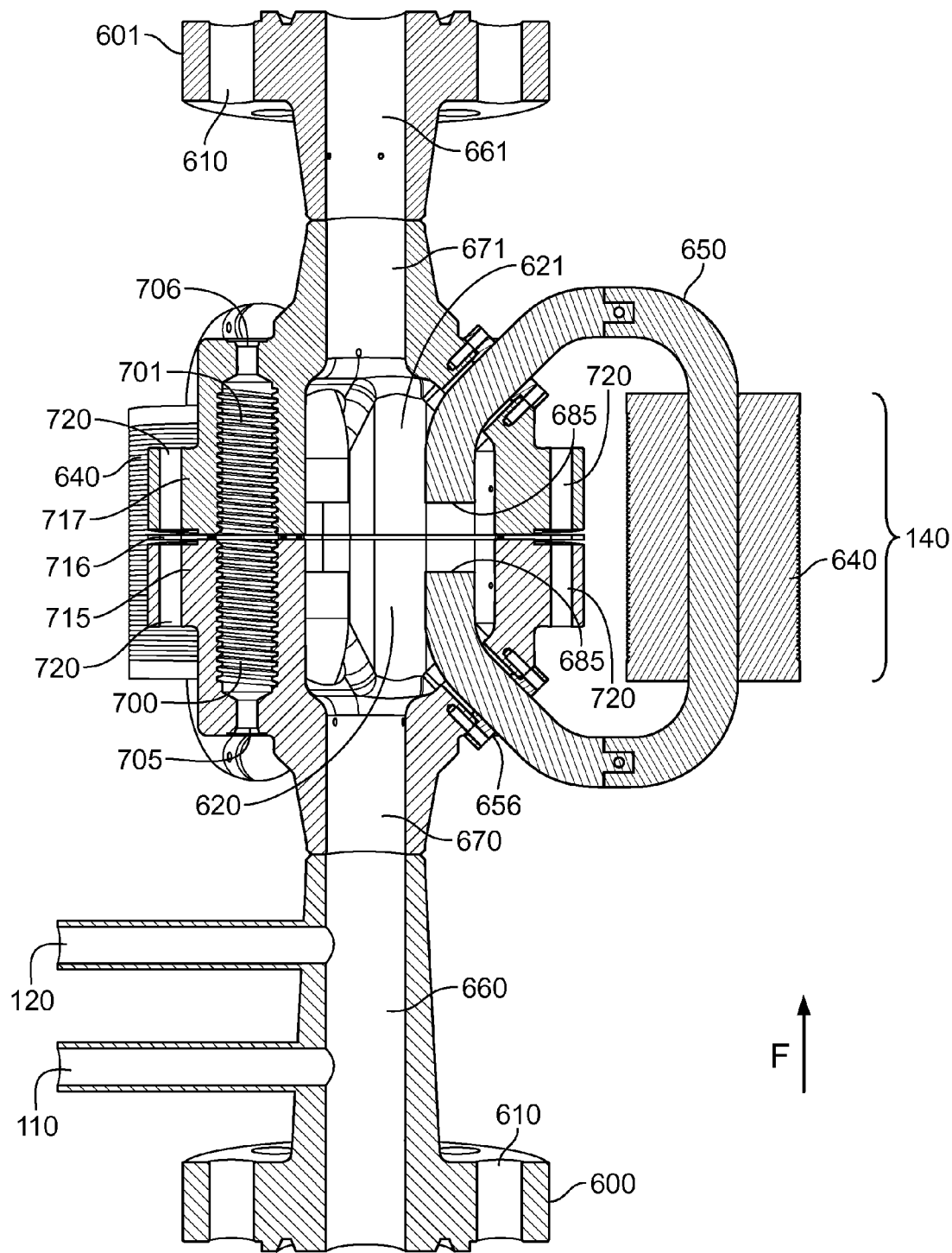
FIG. 27 is a cross section of a magneto-cryogenic valve 100 showing the first valve chamber segment 620 connected to a second valve chamber segment 621 to form a valve chamber. The figure shows a flange gasket 716 between the first valve chamber segment flange 715 and the second valve chamber segment flange 717. Also shown are the magnetic field generator ends 685. In the configuration shown, the magnetic field generator ends 685 are within the valve chamber. For sake of clarity, only one of the cooling chambers is shown, formed by the connection of the first cooling chamber segment 700 to the second cooling chamber segment 701.

The cooling chamber can have smooth walls. The cooling chamber can have at least one wall that can be ridged, fluted, grooved, furrowed, crinkled, puckered, creased or wrinkled, such as to increase the surface area of the cooling chamber, such as is shown in FIG. 27. The cooling chamber can contain or be filled with particles, filings, turnings, shavings, pellets, threads or beads of a thermally conductive material. The cooling chamber can contain baffles or fins.

When more than one cooling chamber is present, the cooling chambers can be interconnected, or each cooling chamber can be connected to its own source of cryogen. The cryogen can be a liquid that boils at a temperature colder than −40° C., or colder than −100° C., or colder than −110° C., or colder than −120° C., or colder than −130° C., or colder than −140° C., or colder than −150° C., or colder than −160° C. Exemplary cryogens include liquid nitrogen, liquid oxygen, liquid helium, liquid neon, liquid methane, liquid natural gas, liquid argon, liquid nitrous oxide, liquid carbon dioxide, liquid Freon® or combinations thereof.

The heat transfer system can be attached directly or indirectly to at least a portion of the conduit from which thermal energy is to be extracted, so long as it is in thermal communication with at least a portion of the conduit. In some embodiments, the heat exchange unit includes a thermal conducting surface at the interface between the heat transfer system and the conduit, and can enhance thermal energy transfer between the conduit and the heat transfer system. In some embodiments, the heat transfer system is integrated adjacent to or in proximity to the valve chamber.

The magneto-cryogenic valves provided herein increase the rate of transfer of thermal energy from the fluid of the conduit to the wall of the conduit or valve chamber to which a heat transfer system of the magneto-cryogenic valve is attached and thus to the heat transfer system. This is accomplished, at least in part, by use of magnetic fields generated by the magnetic field generating device of the valve to attract and hold magnetically susceptible particles in an injection slurry injected into the fluid within the conduit via an injector of the valve in close proximity to the inner wall of the conduit. The heat transfer system removes the thermal energy from at least a portion of the conduit or valve chamber and the fluid therein, particularly at the area of attachment of the heat transfer system.

The magnetically susceptible particles of the slurry can be selected to have a higher thermal conductivity than the thermal conductivity of the fluid. The magnetically susceptible particles of the slurry are cooled to a temperature below the freezing temperature of the fluid of the conduit. When the injection slurry containing the cooled magnetically susceptible particles is injected into the fluid of the conduit via an injector of the magneto-cryogenic valve, the slurry imparts negative thermal energy into the fluid, reducing the temperature of the fluid. The magnetic field generating device of the magneto-cryovalve can be activated, and the magnetic fields interact with the magnetically susceptible particles of the slurry. By modulating the magnetic flux of the magnetic field generating device, the magnetically susceptible particles of the slurry can be positioned within the conduit or valve chamber, such as to the inner surface of the conduit so that they are in thermal communication with at least a portion of the conduit or valve chamber. In some applications, the magnetic field generating device is positioned on one or both sides of the heat transfer system that is in thermal communication with at least a portion of the conduit, and the magnetically susceptible particles facilitate thermal energy transfer from the fluid within the conduit to the heat transfer system for removal.

By manipulating the magnetic field generating device, a uniform magnetic flux density can be created through the freeze zone to maintain the distributed magnetically susceptible particles at a location to promote local thermal energy extraction, resulting in formation of at least a layer of frozen fluid on a portion of one or more magnetically susceptible particles. In some instances, a non-uniform magnetic flux density can be created through the freeze zone to promote directional deposition of the magnetically susceptible particles of the slurry. By manipulating the deposition of the magnetically susceptible particles of the slurry, the magneto-cryogenic valve effectively increases thermal conductance at the inner wall of the conduit or valve chamber when the magnetic field generating device is activated and the injection slurry is introduced into the fluid of the conduit. The thermal conductance is increased because the insulating effect of frozen fluid, having a low thermal conductance, is overcome by the introduction of magnetically susceptible particles having a higher thermal conductance than the frozen fluid, resulting in concentric freezing in a much shorter amount of time than could be accomplished by use of only a heat transfer device.

One of the benefits achieved by effectively increasing the thermal conductance at the inner wall of the conduit or valve chamber is rapid thermal energy transfer out of the fluid of the conduit to the to the heat transfer system. A result that can be achieved is the reduction in the length of the heat transfer system required for thermal energy transfer. Thus, the overall length of the device can be reduced while still removing sufficient thermal energy from the fluid to produce a frozen plug of fluid attached to the inner wall of the conduit or valve chamber, the plug having sufficient strength to withstand the hydraulic pressure of the flowing fluid within the conduit to stop the flow of fluid. Thus, the magneto-cryogenic valves, systems and methods provided herein result in fast and efficient plug formation, overcoming problems described in the art. For example, U.S. Pat. No. 5,125,427 teaches that forming a plug in a pipeline by freezing requires an excessive amount of cooling to form the plug, stating that many hours or even days are required to form a plug of water in large diameter lines. These prior art techniques lacked an effective heat sink for efficient heat transfer from the flowing fluid to the heat sink. The magneto-cryogenic valves, systems and methods described herein include an efficient heat sink for effective heat transfer from a flowing fluid in a conduit, resulting in rapid formation of a frozen plug of fluid.

The magneto-cryogenic valves as described herein can be a permanent attachment on a conduit or can be an attachable device that can be affixed to a conduit, such as to serve as an emergency flow prevention device. The magneto-cryogenic valves provided herein can be integrated in a well line, such as an oil well or gas line, for reversible plugging of the line. The magneto-cryogenic valves can be attached directly or indirectly to any part of the casing or well head of the well. In normal fluid recovery processes from a well, the magneto-cryogenic valve is not active and is not removing thermal energy from the fluid or the conduit nor is it injecting material into a fluid within the conduit and the magneto-cryogenic valve serves as a conduit for the fluid flow. When it is desirable to stop the flow of the material through the conduit, the magneto-cryogenic valve can be activated to freeze at least a portion of the material flowing inside the conduit or valve chamber, forming a reversible frozen plug of material that can stop the flow of material through the conduit. Activation includes charging the heat transfer system to serve as a heat sink, activating the magnetic field generating device to produce a magnetic field, and injection of slurry containing magnetically susceptible particles, where the magnetic flux of the magnetic field generating device at least in part attracts the magnetically susceptible particles and directs the magnetically susceptible particles to a desired location within the conduit or valve chamber, e.g., to an inner wall of the conduit or valve chamber.

The magneto-cryogenic valves provided herein addresses limitations of cryogenic freeze pressure isolation technologies known in the art. For example, the magneto-cryogenic valves can be installed in a conduit, having no effect on flow until activated, and once activated, rapidly control the flow of fluid in the conduit. The magneto-cryogenic valves do not require precision machining or other high cost manufacturing techniques. The installed costs of magneto-cryogenic valves are expected to be slightly greater than the surrounding sections of tubular, but insignificant relative to the cost of additional large diameter ball valves or blow-out preventers conventionally used. The magneto-cryogenic valves require very low maintenance, exhibit lower cost than conventional valves, and are capable of being installed above or below-ground or sea applications including deep water applications. Importantly, the magneto-cryogenic valves provided herein are capable of undergoing multiple freeze-thaw cycles and thus can be utilized repeatedly, avoiding the need to replace the valve after activation. The devices and systems provided herein can include features that allow remote activation in under-water, below ground, or sealed-in concrete applications. The devices and systems can be incorporated into well casing and cemented in place at relatively low incremental cost.

The magneto-cryogenic valves provided herein generally are designed so that their injectors do not protrude into the flow channel. Such a design allows installation of the magneto-cryogenic valve without interfering with the equipment often used to transit the pipelines and conduits internally to monitor and perform maintenance of the interior surface of the pipeline. It is to be understood that the magneto-cryogenic valves can include element that can be positioned into the fluid flow when necessary for monitoring conditions, such as temperature or flow rate. Such elements can be designed so that they can be retracted out of the flow channel when not taking a measurement.

The magneto-cryogenic valves, systems and methods described herein can produce a plug in flowing fluid and do not require additional devices or mechanisms to divert or arrest the flow of fluid in the conduit prior to use of the magneto-cryogenic valves, systems and methods provided herein. Thus, the magneto-cryogenic valves, systems and methods provided herein obviate the need to isolate, divert or stop the flow of fluid within the conduit or flow tubular to form a plug, as required by prior art methods (e.g., see U.S. Pat. No. 4,370,862, which teaches that a plug of ice can be formed in a pipeline if water in the pipeline is maintained in a static condition).

Another advantage of the magneto-cryogenic valves provided herein is the provision of a heat sink and a mechanism for introducing a large amount of negative thermal energy rapidly into the fluid of a conduit. By injecting a slurry containing magnetically susceptible particles at a temperature below the freezing point of the fluid of the conduit and using magnetic fields to position the magnetically susceptible particles within the conduit or valve chamber, e.g., in proximity to the inner wall of the conduit or valve chamber so that they are in thermal communication with at least a portion of the conduit or valve chamber, thermal energy transfer from the fluid to the heat transfer system is improved, significantly reducing the amount of time required to form a frozen plug of fluid. This is significantly different from prior art cryogen methods. For example, U.S. Pat. No. 3,857,255 describes a device for freezing fluid within a pipe by surrounding the pipe with a cryogen. Spraying a cryogen on a warm pipe does not produce an efficient extraction of thermal energy from the pipe. In contrast, the magnetically susceptible particles of a thermally conductive material serve as a very efficient heat sink for the transfer of thermal energy out of the fluid, allowing for formation of a frozen plug of fluid without the need for diverting or arresting the flow of fluid through the conduit.

Because of the efficiency of the heat transfer from the fluid in the conduit using the magneto-cryogenic valves provided herein, the size of the heat transfer system can be reduced compared to heat transfer systems described in the art. In instances where a cryogenically cooled heat transfer system is used, this reduction in size can result in a lower amount of cryogen necessary to cool the heat transfer system. For example, cryogenic liquid could be maintained on-site utilizing pressurized tanks Cryogenic refrigeration systems also could be used to obviate the need to maintain inventories of liquefied gases.

The magneto-cryogenic valves, systems and methods described herein can be positioned to form a plug anywhere within a conduit and are not limited to the well head. For example, a magneto-cryogenic valve can be positioned so that upon activation, a frozen plug is formed within a production tubing string. The magneto-cryogenic valve can be positioned above or even below the oil producing zone, forming a frozen plug that prevents flow of fluid within the conduit.

All components of the magneto-cryogenic valves can be fabricated from material that is suitable for use with cryogens. In general, such is relatively unaffected by cold temperatures. Piping, valves, vessels and other components can be designed for the expected pressures and temperatures, such as to industry standards, e.g., specifications promulgated by the American Society of Mechanical Engineers (ASME). The components also can be designed to accommodate the expected pressures of the fluid within the conduit and the expected pressure of the environment at deployment, such as the high pressures present at deep sea locations. For example, the components can be designed to be of a thickness and/or configuration such that they are resistant to deformation, failure or crushing by the pressure of the fluid moving through the conduit or, e.g., the water pressure at sea depths of deep sea drilling. Exemplary materials include steel, high carbon steel, steel containing Cr, Ni or Si, stainless steel, aluminum, copper, or cryogenically compatible polymers, such as fiber-reinforced epoxy composites and ultra-high molecular weight polyethylene, fiberglass, graphite, plastics, carbon fibers and combinations thereof. Additional materials include alloys having a ductile fracture mode higher than steel and a brittle fracture mode lower than steel are known in the art. Exemplary of such alloys include those described in U.S. Pat. Nos. 5,352,304; 6,183,573; 6,212,891; 7,235,212; 7,648,597 and 7,727,463.

When the magneto-cryogenic valves provided herein are attached to a conduit, the heat transfer system is in thermal communication with the conduit that is to be plugged when the system is valve is activated, and the injector device can be positioned so that it can be in communication with the fluid within the conduit when activated. The heat transfer system can be in close proximity to the injector device. The heat transfer system can be separated from the injector device by some distance. One or more magnetic field generating device(s) can be positioned anywhere with respect to the conduit or chamber as long as the magnetic field generated produces field lines at least a portion of which penetrate through to the fluid flowing through the conduit or valve chamber and interact with the magnetically susceptible particles injected into the fluid. For example, the magnetic field generating device can be positioned so that a north pole of at least one of its magnets is positioned on one side of the heat transfer system and a south pole of at least one of its magnets is positioned on the other side of the heat transfer system. The magnetic field generating device can be positioned so that it is on the side of the heat transfer system that fluid enters the heat transfer system. A plurality of magnetic field generating devices can be used. For example, one magnetic field generating device can be positioned on each side of the heat transfer system.

In some applications, the magneto-cryogenic valve is provided as an attachable device that can be affixed to a conduit. For example, is such a configuration the magneto-cryogenic valve can be positioned and act as an emergency flow prevention device. The magneto-cryogenic valve can be provided in number of interlocking pieces that when assembled envelop the conduit and attach to the conduit. The interlocking pieces can be interconnected and connected to the conduit using any appropriate connecting means known in the art. In some instances, flanges can be used to connect the interlocking pieces to each other, and flanges on the conduit can be used to connect the magneto-cryogenic valve to the conduit. The flange can include any of a protruding rim, edge, rib, or collar, or combination thereof, and means for attachment for attaching the flange on one component to a flange on another component. In some instances, the interlocking pieces can be joined by welding the flange of one piece to the flange of another unit to join the pieces together. In some embodiments, the flange of one piece is joined to a flange of another piece or to the conduit using a connecting means, such as a screw connection, a bolt and nut connection, rivet bolts, a bayonet fitting, interlocking tabs or any combination thereof.

In some applications, an integrated or assembled magneto-cryogenic valve can include an external thread portion that screws into a corresponding inside thread portion of a conduit, such that the valve can be joined to the conduit by screwing the two together. Thread portions can be included on both sides of the magneto-cryogenic valve to that it can be positioned at any point along the conduit, serving as a portion of the conduit through which fluid flows when not activated. In some instances, seals, such as O-rings, can be included to provide a watertight and/or airtight seal. The seals can be made of any material known in the art that is compatible with the expected temperatures and pressures of operation of the magneto-cryogenic valve.

In instances where the magneto-cryogenic valve is to be an integrated component with the conduit, it can be of any diameter or length. The selection of the diameter and length can be predicated on the dimensions of the conduit to which the valve is to be integrated and the rate of flow of fluid through the conduit. In some instances, the inner diameter of the magneto-cryogenic valve is the same as the inner diameter of the conduit to which it is to be integrated. In such a configuration, fluid should flow through the valve exhibiting no change in fluid dynamics.

In some instances, the inner diameter of at least a portion of the magneto-cryogenic valve is larger than the inner diameter of the conduit to which it is to be integrated. In some instances, a beveled or sloped configuration is used to provide a uniform transition from the smaller inner diameter of the conduit to larger inner diameter of the magneto-cryogenic valve. The heat transfer system is in thermal communication with the portion of the magneto-cryogenic valve that is larger than the inner diameter of the conduit to which it is to be integrated. An exemplary resulting configuration is shown in FIG. 2.

Figure 2:
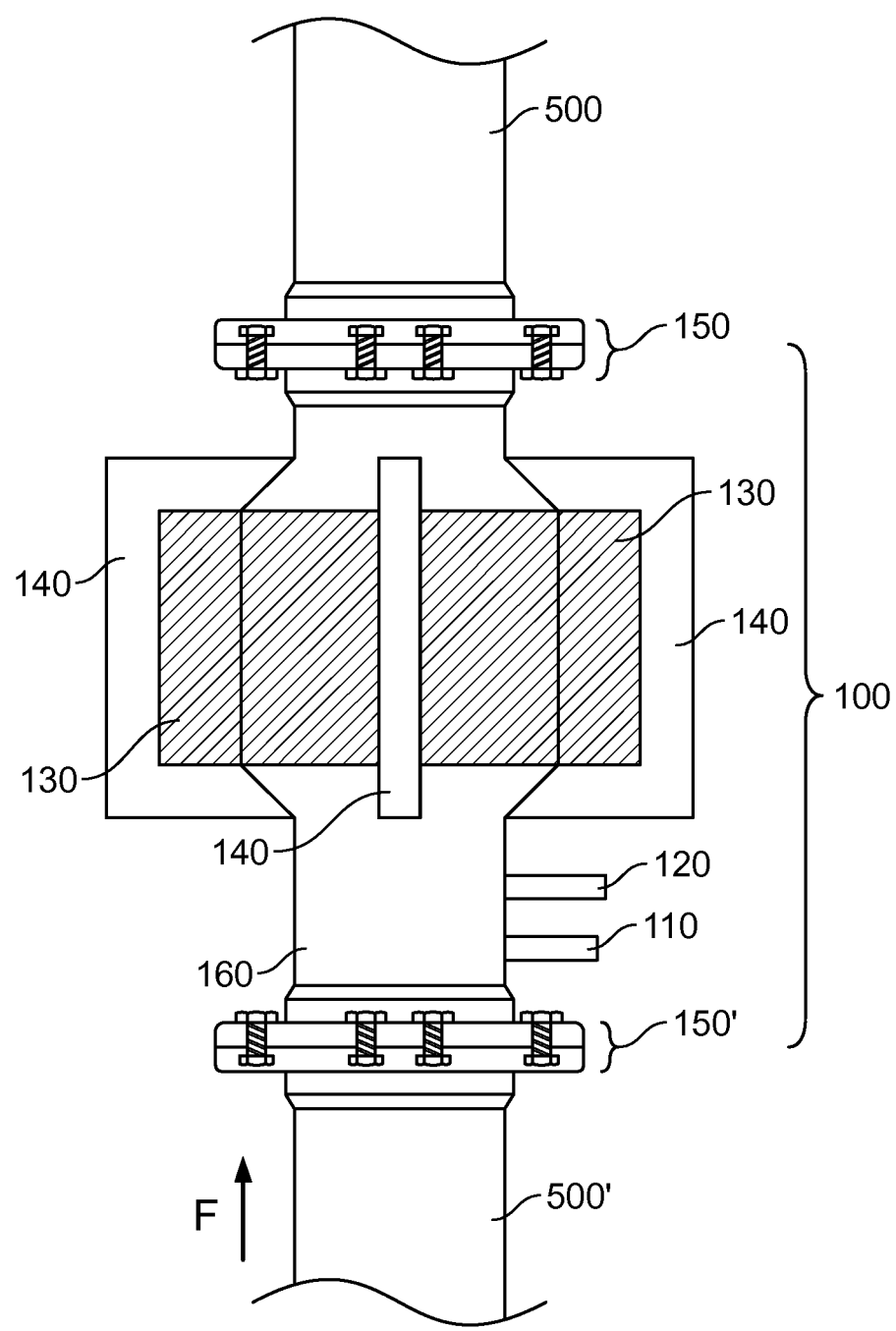
FIG. 2 is a top view of a magneto-cryogenic valve 100 connected to a conduit, where the support channel 160 of the magneto-cryogenic valve 100 contains a portion that is of a larger diameter than the diameter of the conduit to which it is attached. A beveled or sloped configuration is depicted, which provides a uniform transition from the smaller inner diameter of the conduit to larger inner diameter of the magneto-cryogenic valve chamber. Non-laminar flow will occur at the edges of the valve with some turbulent flow through the valve chamber.

FIG. 2 illustrates a top view of a magneto-cryogenic valve attached to a conduit. As shown, the support channel 160 of the magneto-cryogenic valve 100 contains a portion that is of a larger diameter than the diameter of the conduit to which it is attached. In such a configuration, fluid dynamics within the magneto-cryogenic valve is not the same as within the rest of the conduit. A beveled or sloped configuration is depicted, which means that an angled connection connects the smaller diameter of support channel 160 to the larger diameter portion of support channel 160. Such a connection provides a uniform transition from the smaller inner diameter of the conduit to larger inner diameter of the magneto-cryogenic valve. Non-laminar flow will occur at the edges of the valve with some turbulent flow through the valve. Alternatively, an abrupt change in diameter can be constructed using a connection perpendicular to the pipes that make up the support channel 160. This arrangement would exhibit a much different flow profile than the beveled configuration depicted in FIG. 2. Turbulent flow and eddy formation would be expected due to the change in pipe diameters.

Non-laminar flow will occur at the edges of the valve and increased turbulent flow through the valve would be expected. Because of the larger diameter of the valve, the rate of flow of fluid will decrease, at least in some portions of the valve. The extra volume produced by the larger inner diameter of the magneto-cryogenic valve initially can accommodate the magnetically susceptible particles injected into the fluid stream by the injector device, and the magnetic field generating device can be positioned so that at least a portion of its magnetic flux interacts with the magnetically susceptible particles and attracts them or directs them within valve chamber, e.g., to the inner wall of the magneto-cryogenic valve near the heat transfer system. Individual magnetically susceptible particles each is in thermal communication with at least a portion of the conduit or valve chamber or with another magnetically susceptible particle that is in thermal communication with at least a portion of the conduit or valve chamber, increasing the heat sink area within the magneto-cryogenic valve in thermal communication with the heat transfer system. The higher thermal conductivity of the particles in thermal communication with the heat transfer system allows for increased transfer of thermal energy out of the fluid to the heat transfer system, away from the conduit.

FIG. 2 shows the magneto-cryogenic valve integrated into the conduit and attached to the conduit via connector 150, using flanges in combination with interlocking nuts and bolts. The magneto-cryogenic valve can be connected to the conduit using any appropriate connecting means known in the art, just as a screw connection, a bolt and nut connection, rivet bolts, a bayonet fitting, interlocking tabs or any combination thereof. In some instances, flanges can be used to connect the magneto-cryogenic valve to the conduit. The flange can include any of a protruding rim, edge, rib, or collar, or combination thereof, and means for attachment for attaching the flange on one component to a flange on another component. In some instances, a flange of one component can be welded to a flange of another unit to join the pieces together, or attached to each other using a screw connection, a bolt and nut connection, rivet bolts, a bayonet fitting, interlocking tabs or any combination thereof.

An alternate configuration of the magneto-cryogenic valve is shown in FIG. 3. FIG. 3 illustrates a top view of a magneto-cryogenic valve attached to a conduit, where the support channel 160 of the magneto-cryogenic valve is the same diameter as the diameter of the conduit to which it is attached. In such a configuration, fluid dynamics within the magneto-cryogenic valve is the same as within the rest of the conduit. Laminar flow is expected and the rate of flow through the system would be expected to be uniform until the magneto-cryogenic valve is activated. Once activated and the injector slurry composition containing magnetically susceptible particles is injected via the second injector device 120, the magnetic fields produced by the magnetic field generating devices 140 would direct the magnetically susceptible particles to a desired location or area within the conduit or valve chamber, e.g., the inner walls of the conduit or valve chamber, particularly in the vicinity of the heat transfer system. Individual magnetically susceptible particles each is in thermal communication with at least a portion of the conduit or valve chamber or with another magnetically susceptible particle that is in thermal communication with at least a portion of the conduit or valve chamber, increasing the heat sink area within the magneto-cryogenic valve in thermal communication with the heat transfer system. The higher thermal conductivity of the particles in thermal communication with the heat transfer system allows for increased transfer of thermal energy out of the fluid to the heat transfer system, away from the conduit.

Figure 4:
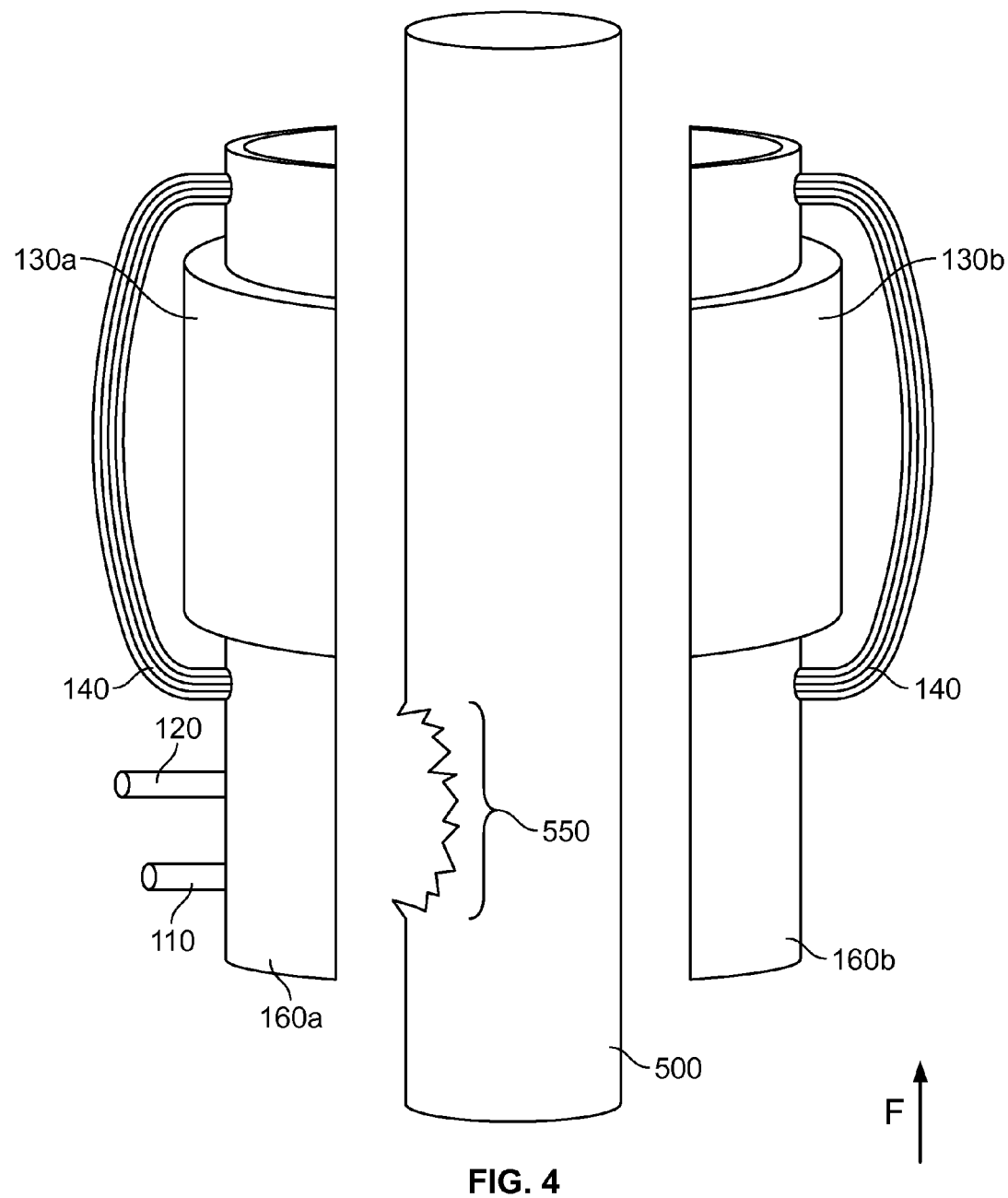
FIG. 4 is an exploded view of a magneto-cryogenic valve segmented into two parts so that it can be attached to a conduit 500 containing a breach 550. The segments of the support channel 160a and 160b of the support channel interconnectedly join to form a contiguous channel that surrounds the breached channel, with end plates that seal the support channel to the breached channel so that no fluid from within the breached channel can escape the assembled portions of the support channel. The segments of the heat transfer unit 130a and 130b interconnectedly join to form a contiguous unit surrounding the conduit and in thermal communication with at least a portion thereof.

In some applications, the magneto-cryogenic valve is designed to be used as an emergency shut-off valve for ruptured conduits. In some instances, an existing conduit has ruptured, and the magneto-cryogenic valve is of a design that can encase the ruptured conduit. An example is depicted in FIG. 4. The magneto-cryogenic valve is separated into two segments that can be interconnected together on site to encircle the ruptured conduit 500. The segments of the support channel 160a and 160b can be joined together using any method known in the art for joining two segments of pipe to form a continuous conduit. For example, the segments can be joined via welding, bolts, screws, seals, epoxy or any combination thereof. In some instances, a flange of one segment can be welded to a flange of another segment to join the segments together, or attached to each other using a screw connection, a bolt and nut connection, rivet bolts, a bayonet fitting, interlocking tabs or any combination thereof. The segments are aligned so that the injector devices 110 and 120 are positioned at the site of the rupture so that the injector devices are in fluid communication with the fluid within the ruptured conduit. If this is not possible, then the support channel can be installed on the ruptured conduit and appropriate equipment, such as high pressure drilling equipment appropriate for use with the pressure of the fluid within the conduit, can be used to drill openings into the ruptured conduit so that the injector devices 110 and 120 are in fluid communication with the contents of the ruptured conduit. Individual heat transfer devices can be present on each segment of the support channel of the magneto-cryogenic valve, or interconnecting segments of a single heat transfer system can be present that when connected form a contiguous heat transfer system in thermal communication with the ruptured conduit.

1. Heat Transfer System

The magneto-cryogenic valves for reversibly modulating flow of a fluid through a conduit include one or a combination of more than one heat transfer system. The heat transfer system is in thermal communication with at least a portion of the conduit from which thermal energy is to be extracted. The heat transfer system can be attached directly or indirectly to at least a portion of the conduit from which thermal energy is to be extracted, so long as it is in thermal communication with at least a portion of the conduit. The heat transfer system can be attached to the conduit in a permanent or a detachable configuration. The heat transfer system can include an annular chamber affixed around the conduit to form a cooling zone through which thermal energy is extracted from the conduit and the fluid therein.

Any refrigeration system known in the art can be used to generate negative thermal energy for the heat transfer system (e.g., to cool the heat transfer system so that thermal energy flows from the fluid to the heat transfer system). Examples of refrigeration systems that can be used to reduce the temperature of, or impart negative thermal energy to, the heat transfer system include vapor compression refrigeration systems, especially with a single stage or rotary compressor, heat exchange units, cryogenic cooling and absorption systems. Heat exchange units are well known in the art (e.g., see U.S. Pat. Nos. 7,441,412; 7,407,600; 7,378,065; 7,272,951; 7,263,852; 7,069,981; 7,028,768; 7,013,668; 6,185,953; 5,787,722 and 5,582,239). Electric thermal transfer devices, such as a Peltier device (e.g., see U.S. Pat. No. 7,218,523) also can be used as a heat transfer system. Cryogenic cooling systems also are known in the art and can be used as a heat transfer system (e.g., see U.S. Pat. Nos. 7,921,657; 7,415,830; 7,273,479; 7,185,501 and 6,658,864).

Any heat transfer system can be adapted for use with the magneto-cryogenic valve provided herein. For example, any of the heat transfer system described in U.S. Pat. No. 3,498,071; 3,623,337; 3,695,301; 3,742,723; 4,112,706; 4,220,012; 4,267,699; 4,370,862; 4,441,328; 5,836,167; 6,658,864; 7,185,501; 7,273,479; 7,415,830; or 7,921,657 or combinations thereof could be configured to be in thermal communication with at least a portion of the conduit from which thermal energy is to be extracted to serve as a heat transfer system of the magneto-cryogenic valves provided herein.

A particular heat transfer system that can serve as a heat transfer system of the magneto-cryogenic valves provided herein is described in commonly owned U.S. patent application Ser. No. 13/161,411, published as U.S. Pat. Appln. Pub. No. 20110308259 (the entire disclosure of which is incorporated by reference herein).

A heat transfer system can include a detachable housing having side portions for enclosing a section of the conduit and end portions for engaging in sealing relation with opposite ends of the conduit section, the side and end portions defining a cooling chamber when assembled around the conduit, the cooling chamber being operable when filled by discharging cryogen from a cryogen supply module into the chamber, which confines a volume of the cryogen at least a portion of which is in its liquid phase in intimate contact with the exterior surface of the section of conduit enclosed by the housing, the detachable housing including an inlet port for admitting the cryogen from the cryogen supply module into the cooling chamber and an outlet port for discharging the spent cryogen out of the cooling chamber. The side portions of the detachable housing can include a first cylindrical half shell and a second cylindrical half shell, the first and second shells each including longitudinally extending flange portions which cooperate to permit mating engagement of the shells to each other to form a closed structure, the end portions of the housing comprising radially extending flange portions for mating engagement with opposite ends of the conduit section enclosed by the housing. In this configuration, the area of the conduit encircled by the heat transfer system is the valve chamber of the magneto-cryogenic valve.

Figure 5:
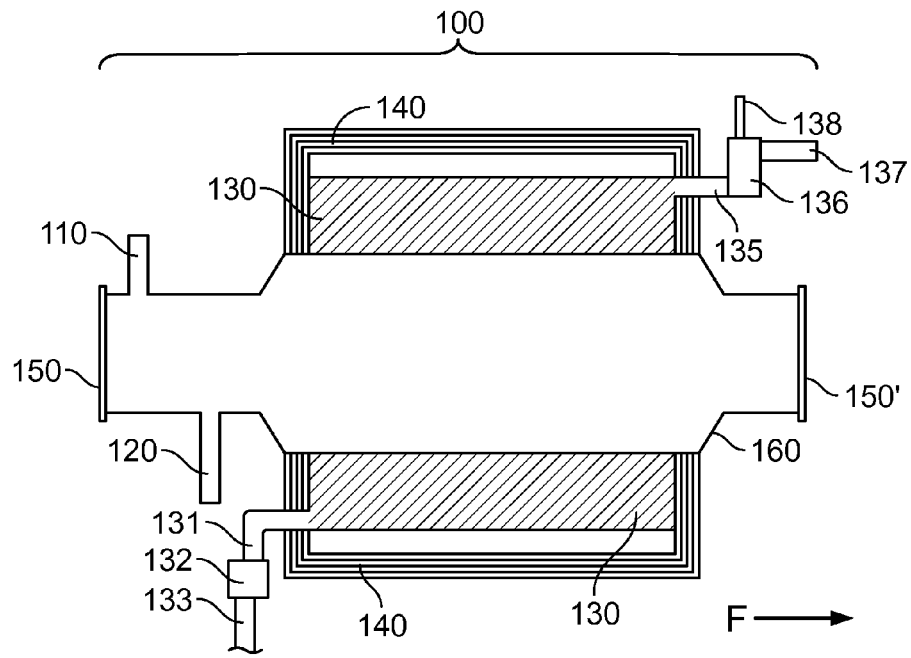
FIG. 5 is a cross-section view of a magneto-cryogenic valve 100 that includes a first injector device 110, a second injector device 120, a heat transfer system 130 and a plurality of magnetic field generating devices 140 integrated into a support channel 160 that can be connected to a conduit via connectors 150 and 150'. The heat transfer system 130 includes an inlet port 131 connected to an inlet pressure regulator 132, which is connected to a cryogen supply module via pipe 133. The heat transfer system 130 also includes an outlet port 135 connected to an outlet pressure regulator 136, which includes a pressure relief valve 137 and a vent 138.

An exemplary heat transfer system integrated into a magneto-cryogenic valve is depicted in FIG. 5. FIG. 5 shows a cross-sectional view of a magneto-cryogenic valve. The heat transfer system 130 is attached to and in thermal conduit with the wall of the support channel 160, which when engaged with the conduit containing fluid serves as a conduit through which the fluid flows. The support channel 160 includes connectors 150 and 150' for connecting the magneto-cryogenic valve to the conduit in which fluid flow is to be modulated. The magneto-cryogenic valve includes a first injector device 110 in fluid communication with the fluid within the conduit. The first injector device 110 as depicted is for injecting an adhesion promoter composition into the fluid prior to the fluid entering the heat transfer device. As shown, the adhesion promoter composition also would be injected into the fluid prior to the introduction of magnetically susceptible particle into the fluid via the second injector device 120. The interval between the first injector device 110 and second injector device 120 and the interval between the second injector device 120 and the heat transfer device allows the adhesion promoter composition and the magnetically susceptible particles to mix with the fluid within the conduit prior to reaching the heat transfer device. Mixing dynamics within the fluid can be modulated by adjusting the flow rate at which either the adhesion promoter composition or the injector slurry composition or both are injected into the fluid within the conduit.

The heat transfer system 130 shown in FIG. 5 is a cryogen cooled cavity in thermal communication with the conduit. The heat transfer system includes an inlet port 131 for introducing cryogen into the cavity of the heat transfer system. An inlet pressure regulator 132 regulates the pressure of the cryogen entering the cavity of the heat exchange device. The heat transfer system also includes an outlet port 135 for discharging warmed cryogen (gas or liquid or both). The heat transfer system includes an outlet pressure regulator for modulating the pressure of the cryogen within the cavity of the heat exchange device. By adjusting either of the pressure regulators or both regulators, the flow of cryogen through the heat transfer system can be modulated.

The pressure regulators also can be used to manipulate the temperature of the cavity within the heat transfer system. For example, the cryogen in the heat transfer system cools by an evaporative heat transfer system, in which a liquid cryogen is converted into a gas. The phase change from liquid cryogen into gas is effective for thermal energy transfer, but the resulting gas can serve as an insulating layer, thereby reducing the effectiveness of thermal energy transfer. By adjusting the pressure of the cryogen supply to the heat transfer system, the resulting gas from the warmed cryogen can be removed from the heat transfer system by the force of the incoming cryogen, removing the insulating layer of gas, thereby increasing the rate of thermal energy removal from the system.

The pressure regulator 136 at the outlet port 135 of the heat transfer system can be used to modulate the pressure of the cryogen within the cavity of the heat transfer system. To decrease the rate of cooling, the pressure control manifold can be adjusted to increase the pressure within the heat transfer system. As the pressure inside the heat transfer system increases, evaporative cooling that normally can be achieved by the conversion of liquid cryogen into a gas at atmospheric pressures is slowed or prevented, depending on the pressure within the heat transfer system. When the pressure is high, the liquid cryogen cannot be converted into a gas or converts at a slower rate than at ambient pressure, and thus thermal transfer from the fluid in the conduit to the liquid cryogen is not as high as can be achieved under lower pressure conditions. Modulating the pressure so that it is increased at a controlled rate can result in a controlled modulation of the temperature within the heat transfer system. A pressure relief valve 137 is included to relieve any excess pressure.

A heat transfer system can include segments of pipe, such as stainless steel pipe, particularly 304 stainless steel pipe, that when assembled form an outer casing and envelop at least a portion of the conduit from which thermal energy is to be extracted. The outer wall of the conduit can serve as the inner wall of the heat transfer system, defining a cooling chamber within the heat transfer system when assembled around the conduit. Alternatively, a finned pipe having a diameter slightly larger than the conduit can be fitted over the conduit prior to engagement of the segments of 304 stainless steel pipe to each other to form the enclosed cooling chamber. The finned pipe is fitted to be in thermal communication with the conduit. Steel plates having an opening through which the conduit can pass can be welded at each end of the outer casing and around conduit. With the steel plates welded in place, a sealed tube with a cavity between the conduit and the outer casing is formed, with the conduit protruding from each end.

The heat exchange system can include a conductor surface that is in thermal communication with the conduit and that includes a thermally conducting material. Any thermally conductive material known to those skilled in the art can be used as a conductor surface, when present. Examples of such materials include, but are not limited to, aluminum, beryllium, brass, cadmium, carbon steel, chrome, chrome nickel steel, cobalt, copper, gold, iridium, iron, lead, magnesium, molybdenum, nickel, platinum, silver, stainless steel, tin, zinc, and any combination or alloy thereof.

The heat transfer system can include a chamber through which a refrigerant flows. The refrigerant can include a cryogen. The cavity of the heat transfer system can contain or be filled, partially or completely, with particles, filings, turnings, shavings, pellets, threads or beads of a thermally conductive material. Including the filings, turnings, shavings, pellets, threads or beads of a thermally conductive material reduces or eliminates the Leidenfrost effect. The filings, turnings, shavings, pellets or beads of a thermally conductive material within the heat exchange unit increase surface area and can channel fluid flow or induce turbulence, which can increase the efficiency of thermal energy transfer from the conduit to the heat transfer system. Screens can be used to keep the particles, filings, turnings, shavings, pellets, threads or beads of a thermally conductive material within the cavity and to prevent their expulsion by the cryogen when the heat transfer system is charged with cryogen.

The outer casing of the heat transfer system can be fitted with cryogen compatible plumbing fittings to form one or more than one inlet port into heat transfer system for delivery of cryogen from a cryogen supply unit into the heat transfer system. The outer casing also can be fitted with cryogen compatible plumbing fittings to form an outlet port for venting of cryogen from the heat transfer system. The outlet port can be vented to the environment or can be connected to a recapture system for recovery and reuse of the spent cryogen.

The heat exchange unit can include baffles or fins or a combination thereof that can be configured to direct or modulate the flow of cryogen or refrigerant within the heat transfer system. The baffles or fins can be perpendicular to the conduit or positioned at any angle relative to the conduit. The baffles or fins can be used to direct the flow of refrigerant or cryogen to minimize any dead zones (areas devoid of refrigerant or cryogen) within the heat transfer system. The baffles or fins can include thermally conducting material for transfer of thermal energy. The thermally conducting baffles or fins can be positioned at any location near to or in thermal contact with the conduit to increase the heat conducting area of the thermal transfer, thereby allowing the thermal energy of the conduit and its contents to more rapidly transfer to the heat exchange unit, including to the cryogen or refrigerant and/or the cooled filings, turnings, shavings, pellets or beads of a thermally conductive metal within the heat transfer system. The thermal conducting baffles and/or fins can be configured to be in thermal communication with the conduit and facilitate energy transfer from conduit to the cryogen or refrigerant and the cooled filings, turnings, shavings, pellets, threads or beads of a thermally conductive metal within the heat transfer system. The filings, turnings, shavings, pellets, threads or beads of a thermally conductive metal within the heat transfer system increase the surface area and can modulate fluid flow and/or induce turbulence, each of which can increase the efficiency of thermal transfer from the fluid within the chamber to the refrigerant or cryogen within the heat transfer system and thus out of and away from the conduit, reducing the temperature of the fluid with the conduit so that at least a portion of the fluid freezes to form a plug, which adheres to the inner wall of the conduit, preventing flow of the fluid in the conduit past the plug.

The heat transfer system also can include a heating device to melt at least a portion of the frozen plug within the conduit. The heating device can locally increase the temperature above the freezing point of the fluid, thereby melting at least a portion of the plug, thereby restoring fluid through the conduit. The heating device can locally increase the temperature using any method known in the art. For example, the heating device can introduce a fluid, such as a gas or liquid, of a temperature greater than the frozen plug, to impart thermal energy to the frozen plug and thereby melt at least a portion of the plug. The heating device can provide heat unilaterally or directionally to the plug of frozen flow formed within the conduit. This directed application of thermal energy to the conduit in proximity to the frozen plug therein allows for directed melting of the plug, such as to form a channel through the plug through which liquid fluid can flow. This can prevent launching the frozen plug through the conduit, and permits the controlled restoration of flow through the conduit.

The heating device can be selected from among any known in the art. Examples include Curie temperature heaters, conductor-in-conduit heat sources, heater strips, ceramic heaters, resistance wire and resistance ribbon heating devices (e.g., see U.S. Pat. Nos. 3,793,716; 3,814,574; 4,238,640; 7,066,730; 7,461,691; and U.S. Pat. Pub. Nos. 2004-0020642 and 2005-0092483). Commercial embodiments of resistance wire or resistance ribbon heating devices are available (Calrod™ heaters), which could be configured to conform to the size and shape of the heating channel. The heating unit can be contained within a channel and can be configured so that it is in thermal communication with the conduit but thermally isolated from the heat transfer system. For example, the portion of the heating channel directed toward the heat exchange unit can be separated therefrom by using a thermally non-conducting material. Any thermally non-conducting material known to those of skill in the art can be used.

Alternative heat transfer systems can be used. FIG. 10 shows a magneto-cryogenic valve 100 that includes, as a heat transfer system, cryogenic cooling coils 155. The cryogenic cooling coils 155 include an inlet port 131, that can be connected to an inlet pressure regulator 132, which is connected to a cryogen supply module via pipe 133. The cryogenic cooling coils 155 also include an outlet port 135 connected to an outlet pressure regulator 136, and a pressure relief valve 137 and a vent 138. A plurality of separate cryogenic cooling coils can be used, or a continuous tubing forming the cryogenic cooling coils can be used. The cryogenic cooling coils can be placed in or around the magneto-cryogenic valve, or the chamber of the magneto-cryogenic valve, in any configuration, such as a spiral wrap or parallel wrap.

Heat transfer systems also can include cooling chambers adjacent to the valve chamber of the magneto-cryogenic valve. The cooling chambers allow transfer of thermal energy from the valve chamber to the cryogen in the cooling chambers and ultimately out of the magneto-cryogenic valve. The cooling chambers can be integrated into the valve chamber segments of the valve. For example, see FIG. 15. This cross section of a magneto-cryogenic valve 100 shows the first cooling chamber segments 700 adjacent to the first valve chamber segment 620, and the second cooling chamber segments 701 adjacent to the second valve chamber segment 621. Joining the first and second segments results in a plurality of cooling chambers in proximity to the valve chamber. Cryogen enters each cooling chamber via a port 705 and exits via a port 706, (although this could be reversed so that the cryogen enters each cryogen circulation compartment via a port 706 and exits via a port 705).

The cooling chamber can have smooth walls, or the walls of the cooling chamber can be ridged, fluted, grooved, furrowed, crinkled, puckered, creased or wrinkled, such as to increase the surface area of the cooling chamber, such as shown in FIG. 27. The cooling chamber can contain or be filled with particles, filings, turnings, shavings, pellets, threads or beads of a thermally conductive material. The cooling chamber can contain baffles or fins.

Activation of the heat transfer system can include providing a refrigerant or a cryogen to the device, or providing power to or otherwise turning on a Peltier device or other electrical cooling device. The temperature of the heat transfer system and the temperature along and/or within the conduit can be monitored with thermal monitoring devices or other temperature sensors such as thermocouples. The thermal monitoring devices can be coupled to and provide input(s) to a computer module. For example, the heat transfer system can include thermal monitoring devices that can be attached to one or more points of the conduit or valve chamber to monitor a thermal gradient and can be included at the interface between the heat transfer system and the conduit to monitor the temperature at the interface. A computer that controls or is in communication with the heat transfer system and the thermal monitoring devices can monitor the thermal gradient and/or rate of thermal exchange and control either or both in order to minimize or eliminate thermal stress on the conduit. Remote control of the heat transfer system could include, e.g., start up and shut down of the refrigeration unit, and valve actuation to regulate or modulate the flow of refrigerant or cryogen to the heat transfer system. The heat transfer system also can include pressure monitoring devices, which can be monitored or accessed remotely via a computer, to assess the pressure, e.g. of a vapor, in the heat transfer system. The heat transfer system also can include pressure relief valves, which can be monitored or accessed remotely via a computer, to modulate the pressure, e.g. of a vapor, in the heat transfer system.

The source of negative thermal energy, or cooling power, such as a refrigeration unit or refrigerant or cryogen supply module, for the heat transfer system of the magneto-cryogenic valve can be positioned so that it is in any location with reference to the magneto-cryogenic valve. In some instances, the source of negative thermal energy is positioned in a vicinity close to the conduit from which thermal energy is to be extracted. By positioning, e.g., a refrigeration unit or refrigerant or cryogen supply module in close proximity to the conduit, the length of hoses or pipes from the source of negative thermal energy to the heat transfer system of the magneto-cryogenic valve can be minimized. For sub-surface ocean environments, a submersible housing can be used to enclose the source of negative thermal energy to protect it from its submerged environment.

In some instances, the source of negative thermal energy, or cooling power, can be located a remote distance from the conduit to which the magneto-cryogenic valve is to be attached. For example, the conduit from which thermal energy is to be extracted can be located on the seabed, and the source of negative thermal energy can be located on a ship or platform on the surface, connected to the cooling unit via hoses or pipes, which can be difficult to maintain during periods of rough seas. Instead, the source of negative thermal energy, or cooling power, such as a refrigeration unit or refrigerant supply module, can be positioned so that it is in close vicinity to the conduit from which thermal energy is to be extracted.

2. Injector Device

The magneto-cryogenic valve provided herein includes at least one injector device for introducing a material into the fluid within the conduit. One of the materials injected into the fluid is a slurry containing magnetically susceptible particles. In addition, an adhesion promoting composition also can be injected into the fluid within the conduit. In some applications, the magneto-cryogenic valve includes at least one injector device for introducing an injection slurry containing material that interacts with a magnetic field into the fluid within the conduit. In some applications, the magneto-cryogenic valve includes one or more injector devices for introducing an injection slurry containing material that interacts with a magnetic field into the fluid within the conduit and one or more than one injector devices for introducing an adhesion promoting composition into the fluid within the conduit.

The injector device can be configured to include a port or opening in the conduit through which a material can be introduced into the conduit so that the material comes into contact with the fluid within the conduit. The injector device can include an isolation mechanism for controlling the introduction of the material into the fluid in the conduit. Any isolation mechanism known in the art can be used. For example, a mechanical valve that can be opened and closed can be used as an isolation mechanism, preventing fluid from the conduit to flow into the injector device and material from the injector device to flow into the conduit. The mechanical valve can be controlled manually or remotely, such as by including a computer operated or electrically activatable valve. When activated, the mechanical valve opens to introduce the material into the fluid within the conduit. When deactivated, the mechanical valve closes to stop flow of material into the conduit.

In some embodiments, a check valve can be included in the injector device. The check valve can be used as an isolation mechanism and/or can be used to prevent the back flow of fluid in the conduit, such as oil in the flow tubular, into the injector device. Any check valve that is operative at reduced temperatures, particularly cryogenic temperatures, can be used. Not all applications require a check valve; according, a check valve may not be present in the injector device for some applications. For example, in applications where the injection slurry is delivered at a greater pressure than the expected internal pressure of the conduit or tubular, once the flow of injection slurry is stopped, a check valve would not be required. The injector device can be isolated from the conduit by a manually or remotely operated valve suitable to contain the type and pressure of fluid in the conduit.

The injector device can include one or more activatable flow modulating valves that can adjust the flow of material to and/or through the injector. The activatable flow modulating valves can be activated manually or remotely, e.g., by use of a computer. For example, the injector device can include remotely activatable solenoid flow modulating valves between the source of the material to be injected into the fluid and the injector valve. For example, a flow modulating valve can be used to regulate the flow of the injection slurry from a supply module to and through the injector device(s).

Passages in a well casing can be provided for the injector device to be positioned to direct the introduction of material into the fluid in a conduit, e.g., a producing tubular, when the injector device is activated. Tubes, pipes or conduits to the injector device that can be used to deliver material to be injected into the fluid can be fabricated into each layer of casing and the casings then can be aligned to produce the passageways to deliver the material to the injector device(s). The tubing or pipes to convey the material to be injected also can be incorporated into an annular space formed between two concentric pipes.

The injector device and its components can be made of any material appropriate for the conditions under which they are to be used. For example, the tubing or piping used for construction can be engineered to resist not only the expected pressures of the fluid within the conduit, but also the high water pressures that exist at depths of deep sea drilling, including depths of about 7,000 feet under water. Those skilled in the art can select the proper material and thickness or design of the piping or tubing for such applications. The piping or tubing can include radial or lateral reinforcements to withstand collapse under the pressure of the water pressures that exist at deep sea drilling depths. The piping or tubing can be manufactured to be of a thickness such that the piping or tubing is resistant to deformation or crushing by the water pressure at sea depths of deep sea drilling. Exemplary materials include stainless steel, aluminum, copper, or cryogenically compatible polymers, such as fiber-reinforced epoxy composites and ultra-high molecular weight polyethylene. The injectors, tubing or pipes also can be of an alloy having a ductile fracture mode higher than steel and a brittle fracture mode lower than steel. Exemplary alloys include those described in U.S. Pat. Nos. 5,352,304; 6,183,573; 6,212,891; 7,235,212; 7,648,597 and 7,727,463.

The tubing or piping of the injector device can be insulated to minimize thermal contamination from the surrounding environment. Any technique known to those of skill in the art for insulating piping can be used. The tubing or piping can be encircled or enveloped in a non-thermally conductive material or a material having a low thermal conductivity.

The injector device of the magneto-cryogenic valve can include a flow rate meter. The flow rate meters can be in communication with a computer module. Data from the flow rate meters can be used to determine the flow of material through the injector device(s), and can be used to modulate the rate of flow of material into the fluid within the conduit, either manually or automatically by computer control. Flow rate meters can be included throughout the path of fluid communication from the material supply module to the exit point of the material from the injector device into the fluid for determination of rate of flow of material through the system. Any flow meter known in the art can be used in the system. The flow meter can include a paddle wheel flow meter, a turbine flow meter, a magnetic flow meter, optical sensors, electromagnetic velocity sensors, coriolis force flow meters, thermal flow meters, ultrasonic flow meters or any other type of flow meter known in the art. Examples of flow meters known in the art include U.S. Pat. Nos. 7,730,777; 7,707,898; 4,934,196; 4,422,338 and RE 31,450, and U.S. Pat. Appl. Pubs. 2009-0281671, 2005-0288873 and 2004-0244498.

The injector device can include other components, such as an emergency shut-off valve, an over-pressure valve, a diverter valve, heating units, and thermal monitoring devices. A computer module can be used for automation of the injector device or any of its attached components. For example, the computer module can be in communication with and/or in control of heating units, valves, flow rate meters and thermal monitoring devices and can monitor and/or control the flow of material, e.g., the injection slurry, through the injector device into the fluid within the conduit.

3. Magnetic Field Generating Device

Figure 11:
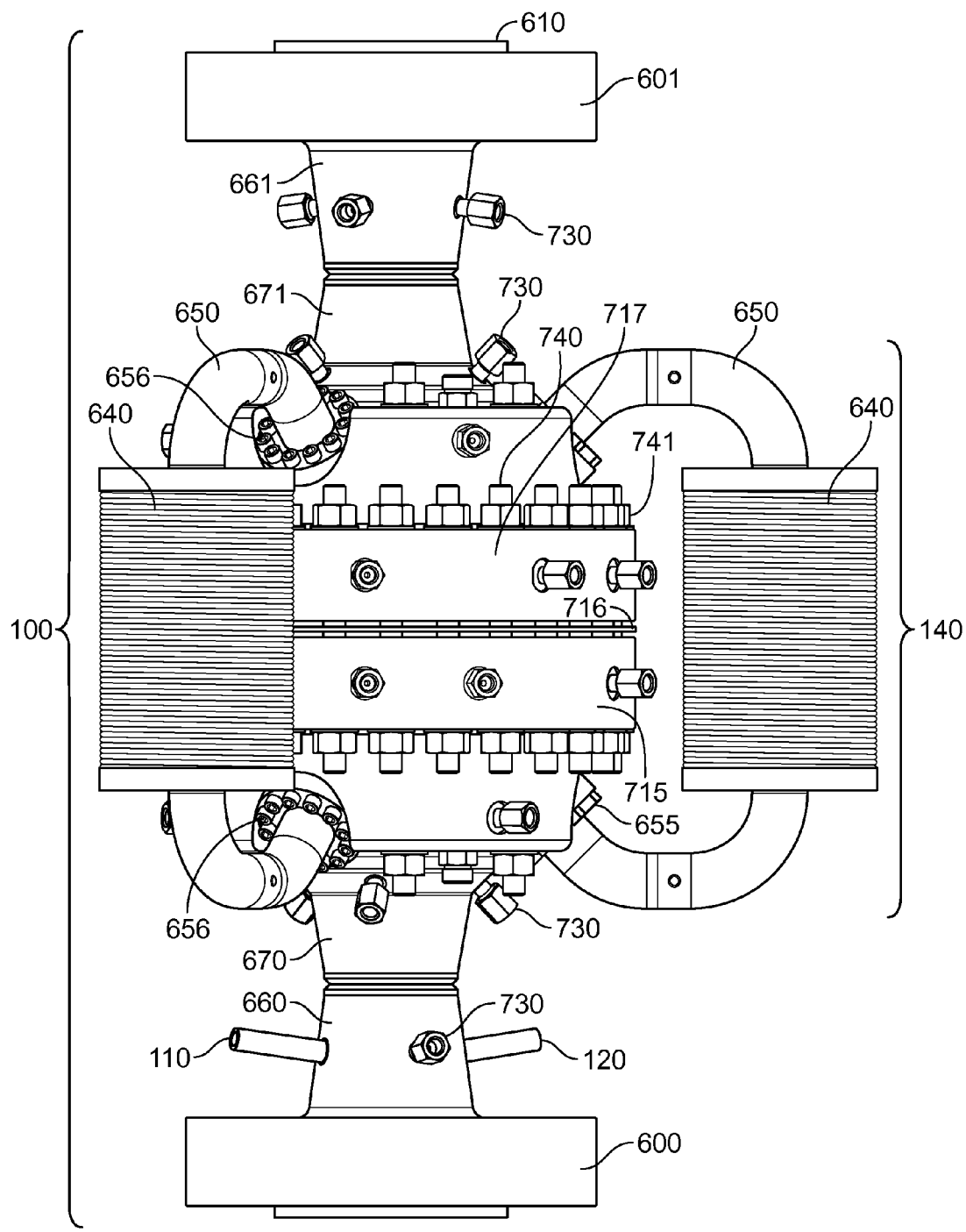
FIG. 11 is a side view of a magneto-cryogenic valve 100 that includes a plurality of protruding magnetic field generating devices 140 that include an electromagnetic solenoid coil 640 and an electromagnetic core 650, which is shown attached via an electromagnetic core flange 656. The valve 100 includes a valve chamber having optional instrument fittings 730, the first valve chamber segment 620 being connected to an incoming chamber-connecting conduit 670, which is attached to an incoming pipeline-connecting conduit 660, which contains a first injector device 110, a second injector device 120 and optionally instrument fitting 730. The incoming pipeline-connecting conduit 660 is connected to flange connector 600, which can be used to attach the valve 100 to a pipeline. The valve 100 includes a second valve chamber segment 621 having optional instrument fittings 730, the second valve chamber segment being connected to an outgoing chamber-connecting conduit 671, which is attached to an outgoing pipeline-connecting conduit 661, which is attached to a flange connector 601. The first valve chamber segment can be connected to the second valve chamber segment via a plurality of threaded rods 740 and nuts 741 to form a valve chamber.
Figure 13:
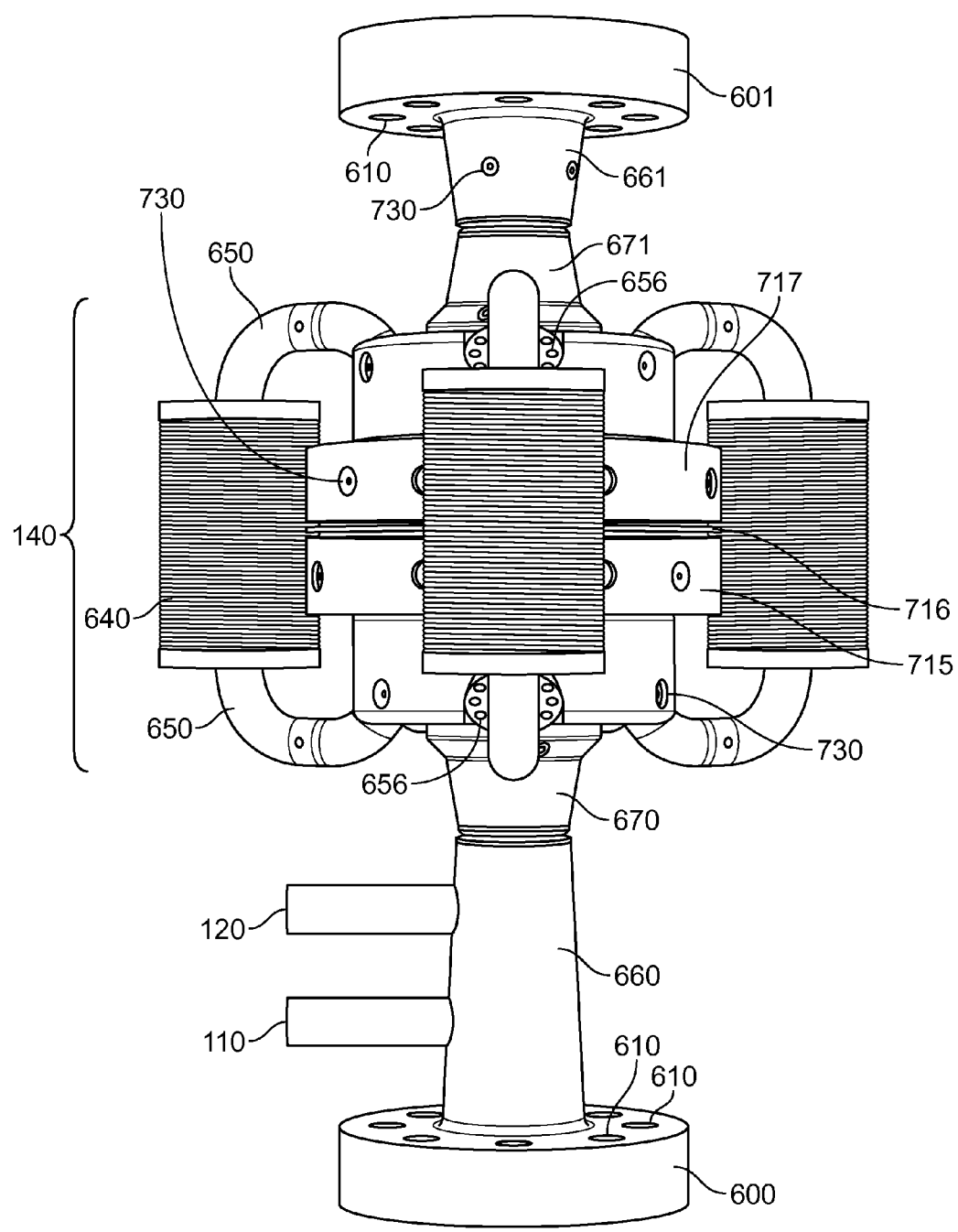
FIG. 13 is a side view of a magneto-cryogenic valve 100 showing the flange bolt holes 610 via which the flange connector 600 and flange connector 601 can be connected to a pipeline or adjacent systems.

The magneto-cryogenic valve provided herein includes a magnetic field generating device. The magnetic field generating device can include one or more magnets. The magnets can be electromagnets or permanent magnets or a combination thereof. In some applications, electromagnets are preferred. The magnetic field generating device can be positioned and oriented in any direction, e.g., the magnetic field generated by the device can be directed parallel or perpendicular to the conduit. FIG. 11 and FIG. 13 show an exemplary magneto-cryogenic valve that includes electromagnets as the magnetic field generating devices 140. The electromagnets include an electromagnetic core 650 and an electromagnetic solenoid coil 640. The cores 650 can be attached via an electromagnetic core end 655 using an electromagnetic core flange 656. FIGS. 19A and 19B show ports 680 where a magnetic field generating device, such as a permanent magnet or an electromagnet, can be inserted. The poles of the magnetic field generating device can be flush with the wall of the valve chamber or can penetrate into the valve chamber.

In some applications, the magnetic field generating device employs electromagnets. The electromagnets can include windings of an electrical wire (typically made of aluminum, copper or alloys thereof) around a core, which typically, but not necessarily, includes a ferrous material. Passing an electrical current from a power supply through the electrical wire creates a magnetic field. The strength of the magnetic field can vary with the amount of current passed through the electrical wire, the number of windings that the electrical wire is wrapped around the core, the type(s) of material(s) that makes up the core, and the size and shape of the core. There is a direct correlation between the number of times electrical wire is wound around a core and the strength of the magnetic field that is generated from an electromagnet. The flux density that is generated is directly related to the number of windings of the electrical wire in that the greater number of windings, the stronger the magnetic field.

A plurality of electromagnets can be used to generate the magnetic field within the chamber. Any configuration of electromagnets can be used. For example, two electromagnets can be positioned 180° from each other in a circular orientation around the chamber of the magneto-cryogenic valve. Three electromagnets can be positioned 120° from each other in a circular orientation around the chamber of the magneto-cryogenic valve (e.g., see FIG. 12). Four electromagnets can be positioned 90° from each other in a circular orientation around the chamber of the magneto-cryogenic valve (e.g., see FIG. 1). The electromagnets can be modular and attached or removed from the magneto-cryogenic valve, such as by use of flanges (e.g., see FIG. 12, electromagnetic core flange 656).

Although the solenoid coils 640 of the electromagnets shown in FIG. 12 encompass essentially the whole length of the valve chamber, in some applications the solenoid coils can extend the entire length of the core 650. The electromagnetic core 650 can be the entire length of the magneto-cryogenic valve 100. Although the electromagnets shown in FIG. 12 are shown encompassing essentially the whole length of the valve chamber, one set of electromagnets can be used for the first segment of the valve chamber and a separate set of electromagnets can be used for the second segment of the valve chamber. Also, although the electromagnets shown in FIG. 12 are oriented in line with the flow of fluid through the magneto-cryogenic valve, the configuration of the electromagnets can be changed so that their orientation is perpendicular to the direction of flow, and separate sets of electromagnets can be used for the first and second segments of the valve chamber.

Figure 14:
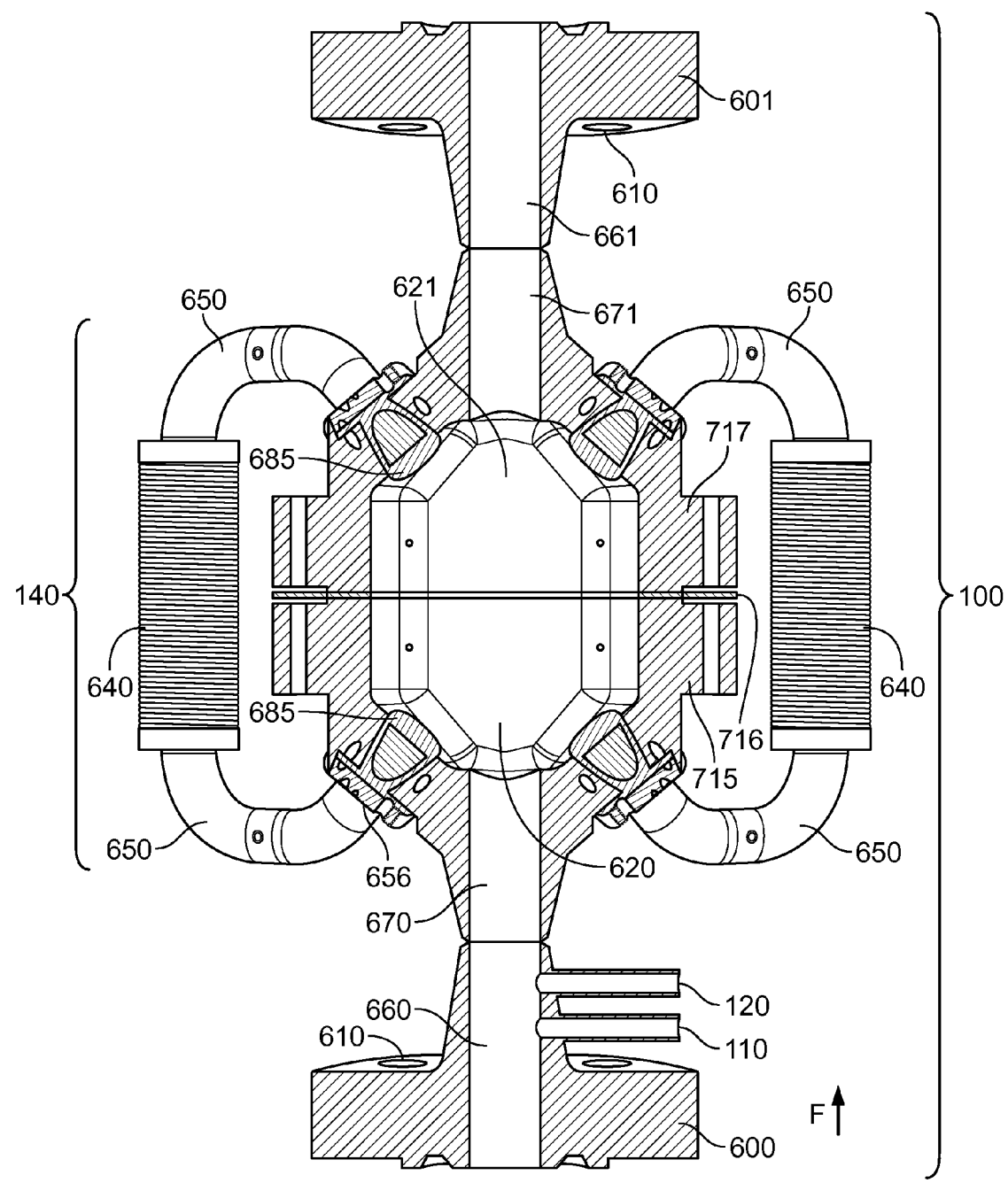
FIG. 14 is a cross section of a magneto-cryogenic valve 100 showing the first valve chamber segment 620 connected to a second valve chamber segment 621 to form a valve chamber. The figure shows a flange gasket 716 between the first chamber segment flange 715 and the second chamber segment flange 717. Also shown are the magnetic field generator ends 685. In the configuration shown, the magnetic field generator ends 685 do not intrude into the valve chamber. Flange bolt holes 610 allow the magneto-cryogenic valve 100 to be connected to adjacent systems.

In some configurations, when electromagnets are used as the magnetic field generating devices, the electromagnetic cores do not penetrate into the valve chamber. An exemplary configuration is shown in FIG. 14. In the figure, two of the electromagnets containing electromagnetic solenoid coils 640 and electromagnetic cores 650 are shown. The magnetic field generator ends 685 do not penetrate the valve chamber.

Figure 24:
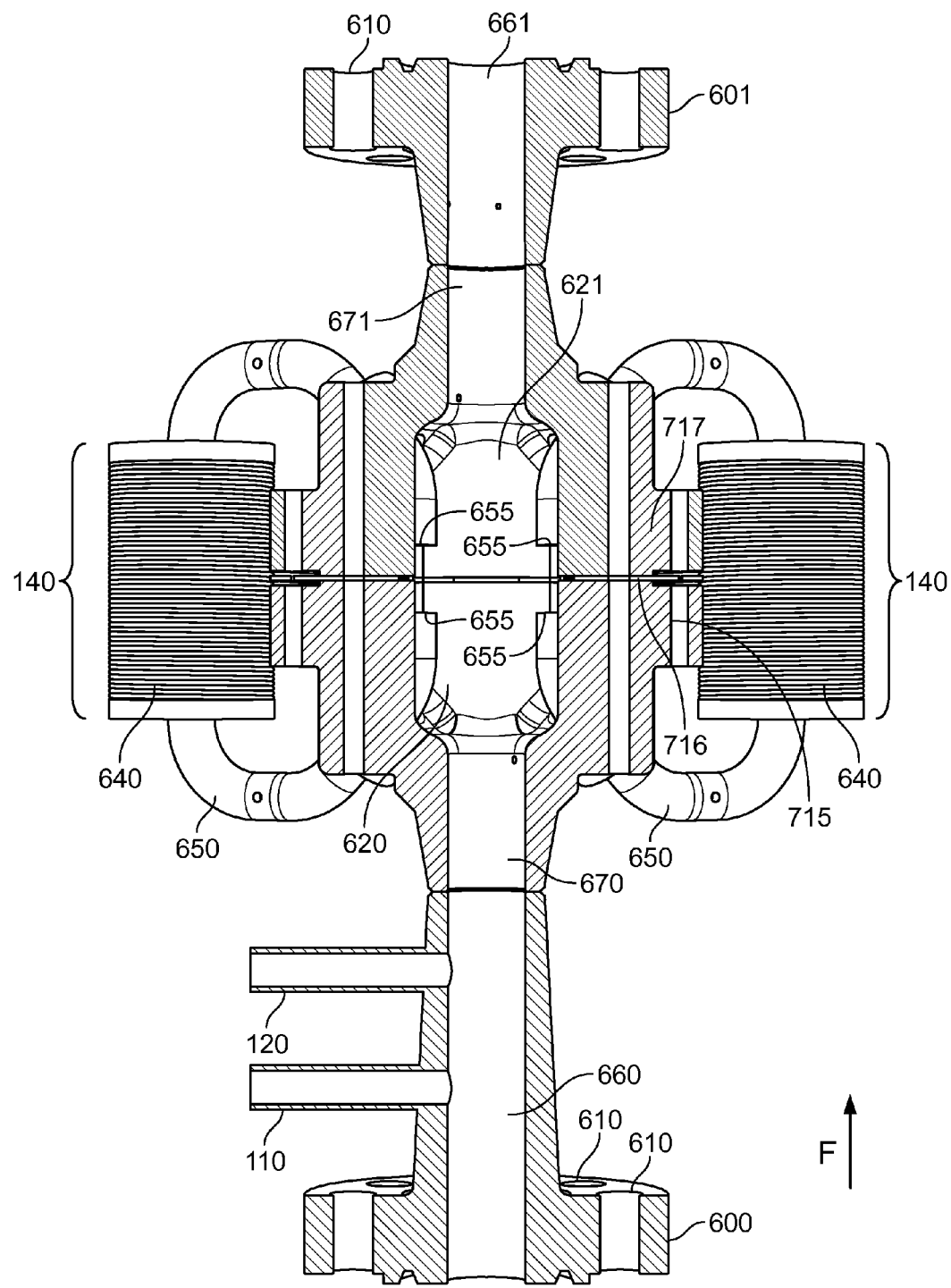
FIG. 24 is a cross section of a magneto-cryogenic valve 100 showing the first valve chamber segment 620 connected to a second valve chamber segment 621 to form a valve chamber. The figure shows a flange gasket 716 between the first valve chamber segment flange 715 and the second valve chamber segment flange 717. Also shown are the electromagnetic core ends 655. In the configuration shown, the electromagnetic core ends 655 are within the valve chamber.

In some configurations, when electromagnets are used as the magnetic field generating devices, the electromagnetic cores do penetrate into the valve chamber. An exemplary configuration is shown in FIG. 24. In the figure, two of the electromagnets containing electromagnetic solenoid coils 640 and electromagnetic cores 650 are shown. The electromagnetic core ends 655 penetrate the valve chamber and are within the valve chamber.

The electromagnets in any configuration can be activated and deactivated in any order and at any time in order to modulate particle collection or plug integrity or both. The electromagnets can be activated sequentially around the perimeter of the chamber, or can be activated in groups, such as in pairs or triples. The electromagnets can be activated and deactivated in a manner that results in an oscillating magnetic field within the chamber. An oscillating magnetic field can be used to optimize granular bed formation or to induce heating in the plug to melt the plug or to partially or completely dislodge the plug from the inner wall of the chamber. The electromagnets can be deactivated to induce or accelerate plug failure, such as when flow through the pipeline is to be restored.

The cores of the electromagnets can be connected to the magneto-cryogenic valve using any appropriate attachment techniques, such as using screws or nuts and bolts in combination with flanges or by welding. The core ends can be flush against the walls of the valve chamber or can penetrate into the valve chamber. When the core ends are configured to enter the valve chamber, the configuration is selected so that the core ends do not inhibit or in any way interfere with the ability of any movable inline inspection or cleaning devices to traverse the valve chamber. The bodies of the magnets or the cores of the electromagnets can directly touch the external wall of the magneto-cryogenic valve, or the device can be configured so that the magnets or electromagnets are connected so that they do not touch the external wall of the magneto-cryogenic valve.

When electromagnets are used to produce the magnetic field, the magnetic field can be modulated by controlling the amount of current flowing through the electrical wire. Moreover, the magnetic field can be eliminated by turning off the current. This avoids any damage that could be caused by a constant magnetic field applied to a conduit, such as any abrasive deterioration that could be caused to the inner wall of the conduit by attraction of magnetic materials in the fluid during normal operation of the conduit. Conversely, during an emergency or in expectation of a potential emergency, the magnetic field generating device of the magneto-cryovalve quickly can be activated by providing current to the electrical wire windings around the core to generate a powerful magnetic field.

Figure 6A:
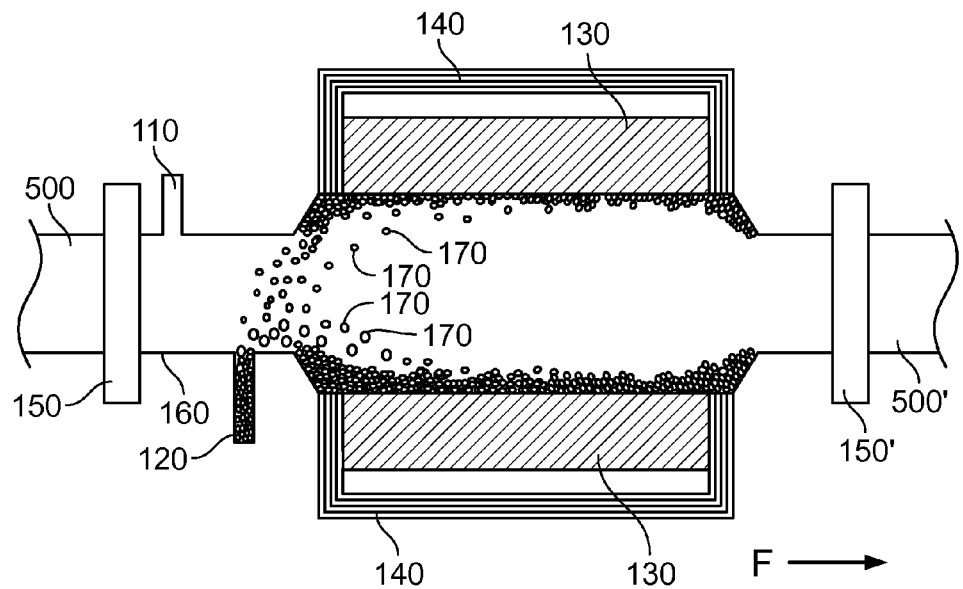
FIG. 6A is a cross-section view of a magneto-cryogenic valve illustrating the introduction of magnetically susceptible particles 170 into the valve chamber of the magneto-cryogenic valve 100.
Figure 6B:
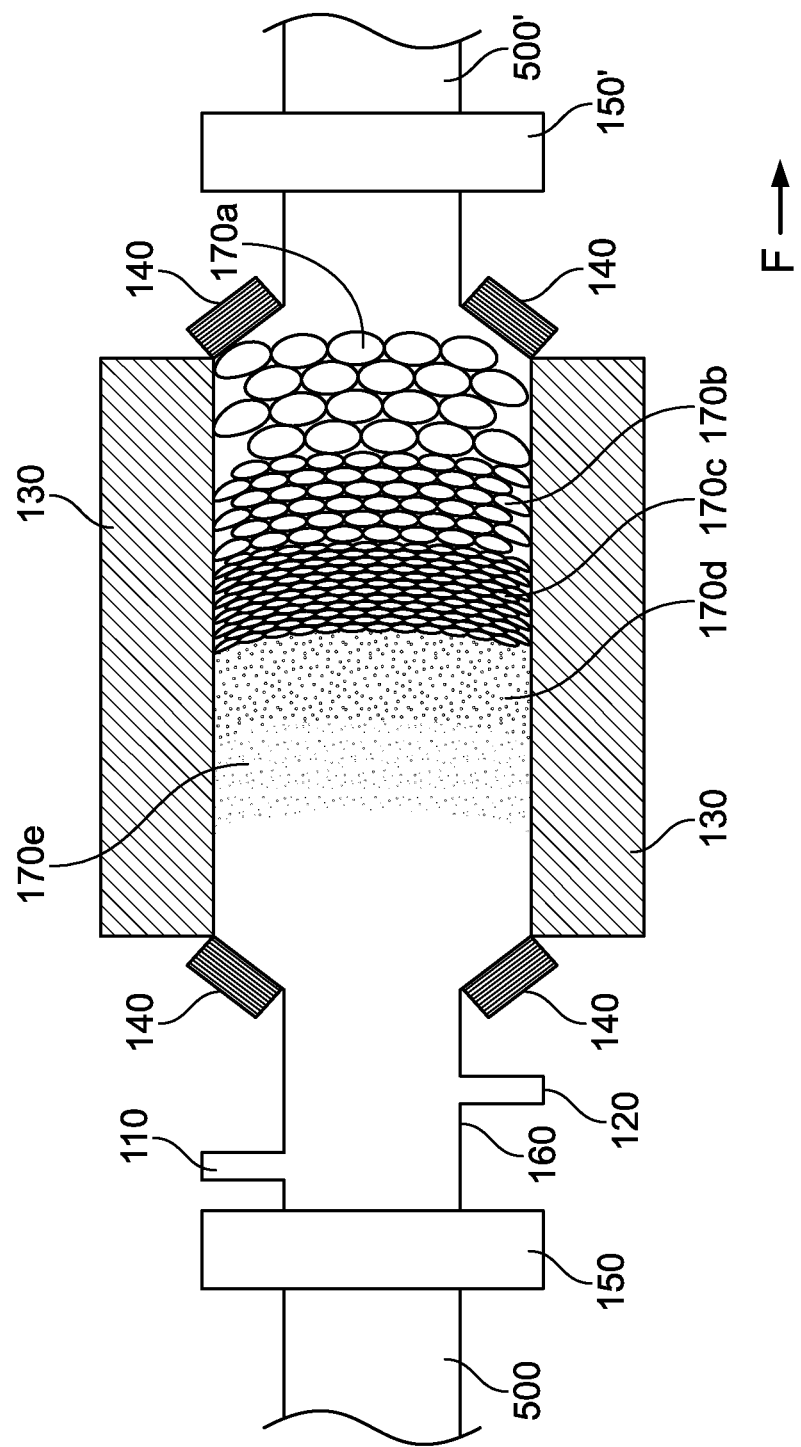
FIG. 6B is a cross-section view of a magneto-cryogenic valve illustrating the introduction of magnetically susceptible particles 170a, 170b, 170c, 170d, and 170e of different sizes into the valve chamber of the magneto-cryogenic valve 100.
Figure 26:
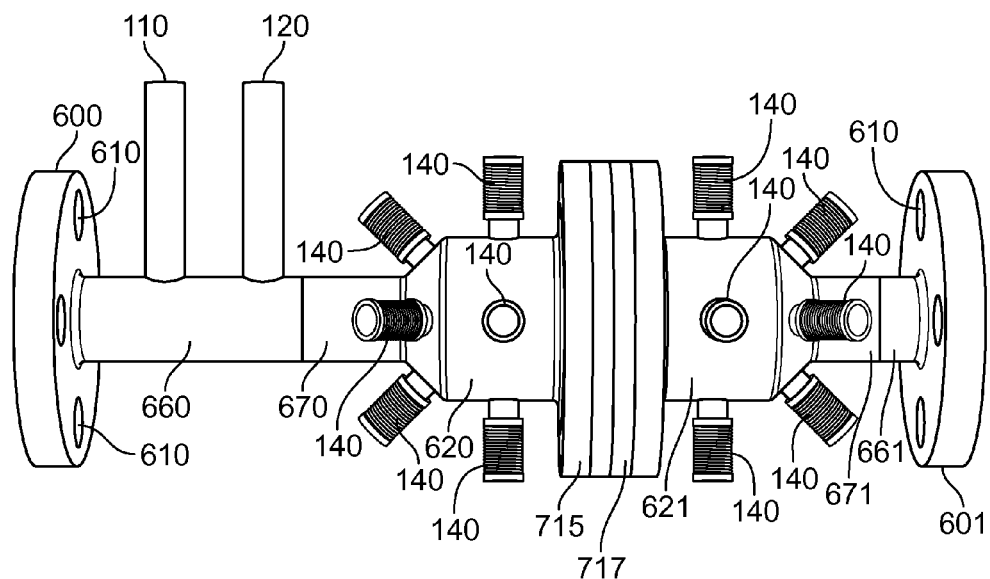
FIG. 26 is a side view of a magneto-cryogenic valve 100 containing a penta-lobed valve chamber and twenty separate magnetic field generator devices 140 (only twelve of which are shown in the figure).

In some applications, the magnetic field generating device employs permanent magnets. Permanent magnets are objects made from material that is magnetized to create a persistent magnetic field that cannot be turned off like the magnetic field of an electromagnet. The permanent magnets can be ceramic, ferrite, or include any other appropriate magnetic material. In some instances, the permanent magnets include rare earth elements. For example, the permanent magnets can be rare earth permanent magnets selected from among Nd—Fe—B type, Sm—Co type and Sm—N—Fe type rare earth permanent magnets. The permanent magnets can be mounted on movable tracks so that the proximity of the magnets to the conduit can be modulated. For example, the magnets can be positioned closer to the conduit or moved away from the conduit in order to adjust the strength of the magnetic field experienced by magnetically susceptible particles within the conduit or valve chamber. In some applications, the magnetic field generating device includes permanent magnet assemblies combined with electromagnets. The permanent magnets or electromagnets can be configured in pairs, or in cross-shaped configurations, or in a multi-pole configuration to generate magnetic fields of different shapes or magnetic fields oriented in a particular direction. FIG. 6A is illustrative of a magneto-cryogenic valve that includes two electromagnets positioned axially about the chamber of the magneto-cryogenic valve. FIG. 6B is illustrative of a magneto-cryogenic valve that includes four magnetic field generating devices, such as permanent magnets, positioned at the corners of the valve chamber of the magneto-cryogenic valve. FIG. 12 is illustrative of a magneto-cryogenic valve that includes three electromagnets positioned axially about the chamber of the magneto-cryogenic valve. FIG. 26 is illustrative of a magneto-cryogenic valve that includes twenty separate electromagnets (12 shown in the figure) positioned axially about the end walls and the side walls of the valve chamber of the magneto-cryogenic valve.

Individual magnetic field generating devices, whether electromagnets or permanent magnets, can be used alone or in combination at many different locations with respect to the valve chamber. The number and location of the magnetic field generating devices can be selected to optimize plug formation. Exemplary placement locations for the magnetic field generating devices include inside the valve chamber, outside the valve chamber and embedded in the valve chamber wall, and any combination of these locations. The polarization and strength of each magnetic field generating device can be varied individually. Each of the magnetic field generating devices can be individually oscillated.

Any type of magnetic field generating devices can be used. In some applications, a permanent magnet, an electromagnet or a combination thereof is used. Types of magnets that can be used include alnico, ceramic, alnico, and rare earth magnets, such as neodymium iron boron magnets. Magnets of the same or differing magnetic flux densities can be selected. In some applications, the magnetic field generating device is selected to produce a magnetic flux density of at least 0.25 Tesla. In some applications, a magnetic field generating device has a magnetic flux density of at least 0.5 Tesla, or at least 1 Tesla, or at least 1.5 Tesla, or at least 2 Tesla, or at least 2.5 Tesla, or at least 3 Tesla, or at least 3.5 Tesla, or at least 4 Tesla, or at least 4.5 Tesla, or at least 5 Tesla, or at least 5.5 Tesla, or at least 6 Tesla, or at least 6.5 Tesla, or at least 7 Tesla, or at least 7.5 Tesla, or at least 8 Tesla, or at least 8.5 Tesla, or at least 9 Tesla, or at least 9.5 Tesla, or at least 10 Tesla. In some applications, a magnetic field generating device has a magnetic flux density of about 0.1 Tesla to about 15 Tesla. In devices using a plurality of magnetic field generating devices, at least two of the magnetic field generating devices are positioned in a manner to cause the field lines of at least one magnet to penetrate through to the fluid flowing through the chamber of the magneto-cryogenic valve and make contact or interact with the like field of another magnetic field generating device. In some applications, the magnetic field generating devices are configured to provide a flux density of from about 0.5 Tesla to about 5 Tesla within the valve chamber, such as at the center of the valve chamber, or at any other desired location within the valve chamber. The strength, size, shape and position of the magnetic field generating device(s) can be selected so that the magnetic field generated produces field lines at least a portion of which penetrate through to the fluid flowing through the valve chamber and interact with the magnetically susceptible particles injected into the fluid flowing through the valve. The magnetic fields can be used to direct the deposition of the magnetically susceptible particles. In some applications, the magnetic field concentrates the magnetically susceptible particles near or at the center of the valve chamber. In some applications, the magnetic field concentrates the magnetically susceptible particles near or at an end of the valve chamber. In some applications, the magnetic field concentrates the magnetically susceptible particles near or at a wall of the valve chamber. In some applications, the magnetic fields of a plurality of magnets can be used to concentrate the magnetically susceptible particles near or at more than one location within the valve chamber. In some applications, the magnetic fields can be used to concentrate the magnetically susceptible particles near the center of the valve chamber and near a wall of the valve chamber.

In some applications, the magnetic field generating device of the magneto-cryovalve includes a plurality of electromagnets in which oscillation of the B-field can be induced. By inducing an alternating magnetic field, inductive heating can be produced. For example, some of the magnetically susceptible particles in the slurry can include a ferromagnetic coating. An alternating magnetic field can excite domains in the ferromagnetic coating. As the domains of the coatings realign with each oscillation, hysteresis losses in the coating can cause inductive heating. The inductive heating can be proportional to flux density within the magnetically permeable coating. This increased thermal energy produced by inductive heating can be used to melt the plug of frozen fluid in the conduit, restoring fluid flow.

Thus, an alternating magnetic field to produce inductive heating can obviate the need for providing separate thermal energy devices, such as heating devices, to restore flow of the fluid in the conduit. In some instances, heaters are included in the magneto-cryogenic valve and can be used alone or in conjunction with the magnetically produced inductive heating to provide thermal energy to melt the plug within the conduit or valve chamber.

The magnetic field generating device can be positioned so that its magnets are in any configuration about the conduit. In some applications, the magnets can be positioned circumferentially about the conduit. In some applications, the magnets can be positioned uniaxially or biaxially parallel to the flow direction. In some applications, one magnet can be positioned opposite of another magnet. Each of the magnets generates a magnetic field at least a portion of which permeates the wall of the conduit and interacts with the magnetically susceptible particles introduced into the fluid of the conduit. The positioning of the poles of the magnets of the magnetic field generating device also can be modulated to direct the magnetically susceptible particles within the fluid in the conduit or valve chamber. For example, a standard quadrupole magnet configuration can be used to create a magnetic field whose magnitude grows rapidly with the radial distance from its longitudinal axis. In a standard quadrupole configuration, with four magnets in a cross-shaped configuration, two are positioned to have opposing north poles and two are positioned to have opposing south poles. In such a configuration, the magnetic field in the center is very low and can be zero, and the magnetic field increases as one moves away from the center. This could be used to attract the magnetically susceptible particles in the fluid toward the walls of the conduit, as the magnetic field would be much greater toward the inner surface of the conduit than in the center of the conduit.

This is illustrated in FIGS. 6A and 6B. FIG. 6. FIGS. 6A and 6B show the accumulation of magnetically susceptible particles at the inner wall of the conduit in the vicinity of the heat transfer system. Magnetically susceptible particles 170 are injected into the fluid within the conduit via injector device 120. The Magnetically susceptible particles can contain any material that interacts with a magnetic field. The material can be attracted to or repulsed by the magnetic field. The particles can contain cobalt, Co—Zr alloys, Co—Nb alloys, dysprosium, Fe—Si alloys, gadolinium, iron, mu metal (nickel iron alloy), nickel, permalloys (iron-nickel alloys), rare earth-transition metal alloys (e.g., Gd—Co, Fe—Tb), spinel ferrites ($MFe_2O_4$ where M is $Mn^{2+}$, $Fe^{2+}$, $Co^{2+}$, $Ni^{2+}$, $Cu^{2+}$ and $Zn^{2+}$) and supermalloy. In particular, the magnetically susceptible particles can contain cobalt, iron, nickel, magnetite ($Fe_3O_4$) or maghemite ($Fe_2O_3$) or combinations thereof.

Once injected into the fluid within the conduit, the magnetically susceptible particles 170 interact with the magnetic fields produced by the magnetic field generating devices 140. The interaction results in the magnetically susceptible particles 170 moving toward and accumulating on the walls of the conduit, in the center of the valve chamber, at an end of the valve chamber, or any combination thereof. Some of the particles are in direct thermal communication with the conduit wall that is in thermal communication with the heat transfer system 130. Other magnetically susceptible particles are in thermal communication with the particles thermal communication with the conduit wall that is in thermal communication with the heat transfer system 130. Because the thermal conductivity of the magnetically susceptible particles 170 is greater than the thermal conductivity of the fluid within the conduit, thermal energy is transferred from the fluid to the magnetically susceptible particles 170 and subsequently to the conduit in thermal communication with the heat transfer system 130 and away from the conduit, thereby removing thermal energy from the fluid and ultimately resulting in formation of a frozen plug of fluid.

The magneto-cryogenic valves, systems and methods provided herein can be used in any environment, including with surface pipelines and sub-sea and deep sea applications. The magneto-cryogenic valves can be operated manually or can be configured to be remotely controlled, such as by a computer programmed with appropriate software. When the method is used underwater, such as on the ocean floor, a fully submersible refrigeration unit or cryogen supply module can be used. Control of the submerged refrigerator system or cryogen supply module can be provided from the surface, e.g. from a vessel or platform, such as by attached wires or cables that can provide power, communication and monitoring between the heat transfer system of the magneto-cryogenic valve and the surface. The refrigeration unit or cryogen supply module can be enclosed in a pressure vessel or housing to minimize exposure to water and to allow regulation of the pressure within the vessel or housing. The refrigeration unit and its compressor drive motor can be powered by a supply from a surface vessel or platform or via batteries or a submerged generating system.

C. SYSTEMS

The magneto-cryogenic valve provided herein can be part of a system that extracts thermal energy from a conduit in order to freeze at least a portion of the fluid contents therein. An exemplary system includes the magneto-cryogenic valve attached to at least a portion of the conduit and in thermal communication therewith, a slurry module for providing injection unit for injecting a slurry containing magnetically susceptible particles into the fluid within the conduit, optionally an injector for injecting an adhesion promoting composition into the fluid within the conduit, and optionally a control system for computer and/or remote control of the magneto-cryogenic valve and the injector(s). The system can include, and in exemplary embodiments does include, other components, such as valves, e.g., flow control valves, diverter valves and pressure relief valves, pumps, tubing or piping, one or more injection slurry supply modules, adhesion promoter composition supply modules, cryogen supply modules, pressure and/or temperature monitoring devices, flow measuring devices and a computer control module.

Figure 7:
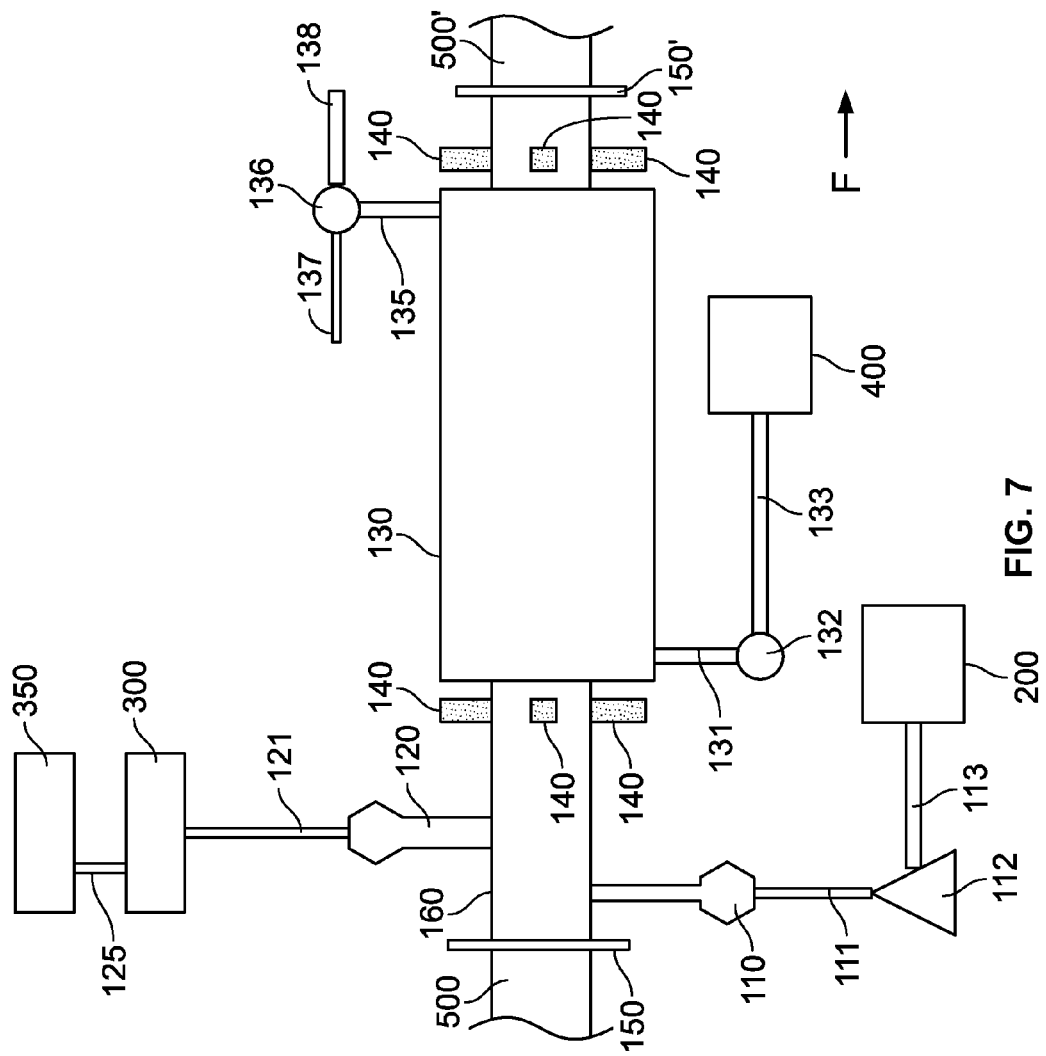
FIG. 7 is a schematic of a system that includes a magneto-cryogenic valve, a cryogen supply module 400 to provide cryogen to a heat transfer system 130, an adhesion promoter composition supply module 200 to provide an adhesion promoter composition to the first injector device 110, an injection slurry composition supply module 300 to provide an injection slurry composition containing magnetically susceptible particles to a second injector device 120, and a plurality of magnetic field generating devices 140 integrated into a support channel 160.

An exemplary system is shown in FIG. 7. FIG. 7 illustrates a horizontally oriented conduit system, although vertically oriented conduit systems also are envisioned. The system includes a magneto-cryogenic valve that includes a first injector device 110 and a second injector device 120 attached to a support channel 160, a heat transfer system device 130 surrounding at least a portion of the support channel 160, and magnetic field generating devices 140 shown in a quadropole arrangement (the fourth magnetic field generating device 140 is not visible in the illustration). The positioning of the magnetic field generating devices 140 can be modified to generate different magnetic fields due to the interaction of the magnetic field generating devices 140. The support channel 160 of the magneto-cryogenic valve can be connected at one end to a conduit 500 containing a fluid via connector 150 and at the other end to conduit 500' via connector 150'. As illustrated, the fluid fluids through the conduit from conduit 500 to conduit 500'.

The first injector device 110 is connected via piping 111 to a pump 112 that is connected via piping 113 to an adhesion promoter composition supply module 200. The second injector device 120 is connected via piping 121 to an injection slurry supply module 300 that is connected via piping 125 to a pressure regulating system 350.

The heat transfer system 130 is attached to and in thermal communication with support channel 160. The heat transfer system 130 includes an inlet port 131 that can include an inlet pressure regulator 132. The inlet port 131 can be attached directly to a pipe 133 or to the inlet pressure regulator 132 connected to the pipe 133 to a cryogen supply module 400. The heat transfer system 130 also includes an outlet port 135 that can include an outlet pressure regulator 136. The outlet port 135 includes a pressure relief valve 137 and a vent 138, connected directly to the outlet port 135 or to the outlet pressure regulator 136 that is connected to the outlet port 135.

The system can include thermal monitoring devices that can be attached to one or more points of the conduit to monitor a thermal gradient and can be included at the interface between the heat transfer system and the conduit to monitor the temperature at the interface. The system can include a computer that controls or is in communication with the magneto-cryogenic valve and the thermal monitoring devices.

1. Injection Slurry Supply Module

Systems including the magneto-cryogenic valve provided herein can include an injection slurry supply module. The injection slurry supply module provides the injection slurry to the injector. The injection slurry contains magnetically susceptible particles in a fluid, such as a cryogen or a solvent or a combination thereof. The slurry can be prepared using any method known in the art. For example, an injection slurry supply module can include a mixing system that includes a venturi pump, such as a fluid jet eductor. In such systems, flowing fluids can be passed through piping configurations that cause a pressure differential sufficient to draw in particles, such as the magnetically susceptible particles, to be mixed with the flowing fluid, such as a cryogen or a solvent or a combination thereof. Jet eductor systems are well known in the art (e.g., see U.S. Pat. Nos. 4,165,571; 5,522,419; 5,743,637; 5,993,167; and 6,450,775) and can be used with the injection slurry described herein. An exemplary eductor can be configured to include a nozzle, which can direct a fluid, such as cryogen, to form a jet; a venturi structure, and an air gap between the nozzle and the venturi structure. In use the fluid jet passes across the air gap and enters the venturi structure. The venturi structure includes an inlet, a side passage for delivering the magnetically susceptible particles into the fluid jet and a mixing chamber where the magnetically susceptible particles are entrained and mixed with the fluid by the flow of the fluid.

The magnetically susceptible particles alone or in combination with other particles, can be supplied to the venturi structure via a tube, pipe or chute having a discharge end located near the inlet of the venturi structure, where a vacuum (negative pressure) created by the high velocity fluid flow therein acts to draw the particles from the tube, pipe or chute into the venturi structure. One method of controlling the amount of magnetically susceptible particles or other particles added to fluid within the conduit is to include a metering device, such as auger barrel, to regulate the amount of magnetically susceptible particles or other particles flowing through the auger and into the venturi mixing chamber by means of a variable speed motor driving the auger. Any metering device or flow regulation devices known in the art can be used to meter the amount of particles that are added to the flowing fluid and thereby to regulate the amount of particles, e.g., magnetically susceptible particles, added to the cryogen or other fluid flowing through the eductor.

The flow of the injection slurry composition into the injector can be modulated by any method known in the art. For example, a pressure regulator system can be attached to the injection slurry module to force the slurry from the supply module into and out of the injector into the fluid within the conduit. Increasing or decreasing the pressure exerted on the injector slurry in the supply module by using the pressure regulating system can result in increased or decreased flow, respectively, out of the injector into the fluid.

a. Injection Slurry Composition i. Magnetically Susceptible Particles

The injection slurry composition contains magnetically susceptible particles. The magnetically susceptible particles can be of or contain a material that interacts with a magnetic field. The particles can be paramagnetic, diamagnetic, ferromagnetic or any combination thereof. Examples of paramagnetic materials include aluminum and titanium. Examples of diamagnetic materials include bismuth, copper and gold. Examples of ferromagnetic materials include cobalt, Co—Zr alloys, Co—Nb alloys, dysprosium, Fe—Si alloys, gadolinium, iron, mu metal (nickel iron alloy), nickel, permalloys (iron-nickel alloys), rare earth-transition metal alloys (e.g., Gd—Co, Fe—Tb), spinel ferrites ($MFe_2O_4$ where M is $Mn^{2+}$, $Fe^{2+}$, $Co^{2+}$, $Ni^{2+}$, $Cu^{2+}$ and $Zn^{2+}$) and supermalloy. The magnetically susceptible particles can contain cobalt, iron, nickel, magnetite ($Fe_3O_4$) or maghemite ($Fe_2O_3$) or combinations thereof.

The magnetically susceptible particles generally can be selected so that they have a thermal conductivity value much greater than the thermal conductivity of the fluid within the conduit. For example, the thermal conductivity of crude oil is in the range of from 0.120 to 0.130 W/(m·K). The thermal conductivity of exemplary materials, at 68° F., include 31 W/(m·K) for carbon steel, 40 W/(m·K) for cobalt, 223 W/(m·K) for copper, 42 W/(m·K) for pure iron, 52 W/(m·K) for nickel, 30 W/(m·K) for niobium, 235 W/(m·K) for silver, and 116 W/(m·K) for zinc. Thus, the magnetically susceptible particles can be selected to have a thermal conductivity greater than 0.2 W/(m·K), or greater than 0.5 W/(m·K), or greater than 0.75 W/(m·K), or greater than 1 W/(m·K), or greater than 5 W/(m·K), or greater than 10 W/(m·K), or greater than 20 W/(m·K), or greater than 30 W/(m·K), or greater than 40 W/(m·K), or greater than 50 W/(m·K) or greater than 100 W/(m·K).

Commonly owned U.S. patent application Ser. No. 13/161,411, published as U.S. Pat. Appln. Pub. No. 20110308259 (the entire disclosure of which is incorporated by reference herein) describes methods, devices and systems for extraction of thermal energy from a heat conducting metal conduit. In some embodiments described in U.S. patent application Ser. No. 13/161,411, a cryogen is injected into a fluid within a conduit to increase the rate of thermal energy dissipation from the fluid within the conduit. The injection slurry composition that is injected into the fluid within the conduit using the magneto-cryogenic valve includes magnetically susceptible particles in a fluid. The fluid can by a refrigerant or cryogen or a combination thereof.

Introducing the injection slurry into the fluid within the conduit can increase the rate of thermal energy transfer from the fluid within the conduit than that observed with injection of cryogen or refrigerant alone. An advantage over previous devices and methods is that, by modulating the magnetic flux of the magnetic field generating device, the magnetically susceptible particles of the slurry can be attracted to or directed to the inner surface of the conduit so that they are in thermal communication with at least a portion of the conduit, particularly in the vicinity of the heat transfer system to remove thermal energy from the conduit. For example, the magnetic field generating device can be positioned so that its magnetic fields direct the magnetically susceptible particles of the injection slurry composition to the inner wall of the conduit close to the heat transfer system that is in thermal communication with at least a portion of the conduit, and the magnetically susceptible particles facilitate thermal energy transfer from the fluid within the conduit to the heat transfer system for removal.

Deposition of the magnetically susceptible particles of the slurry on the inner wall of the conduit effectively increases thermal conductance at the inner wall of the conduit when the magnetic field generating device is activated and the injection slurry is introduced into the fluid within the conduit. The thermal conductance of the conduit is increased because the deposited magnetically susceptible particles of the slurry are in thermal communication with at least a portion of the conduit or valve chamber, or with one or more magnetically susceptible particles in thermal communication with the conduit or valve chamber, or form a chain of magnetically susceptible particles at least one of which is in thermal communication with the conduit or valve chamber. Because the thermal conductivity of the magnetically susceptible particles is greater than the thermal conductivity of the fluid within the conduit or valve chamber, thermal energy is transferred to the particles and subsequently to the conduit or valve chamber in thermal communication with the heat transfer system and away from the conduit, thereby removing thermal energy from the fluid and ultimately resulting in formation of a frozen plug of fluid.

The insulating effect of frozen fluid, having a low thermal conductance, is overcome by the introduction of magnetically susceptible particles having a higher thermal conductance than the frozen fluid, providing a thermal communication pathway through the frozen fluid to the heat transfer device. This results in rapid concentric freezing of the fluid within the conduit or valve chamber in a much shorter amount of time than could be accomplished by use of only a heat transfer device attached to the conduit or valve chamber.

The magnetically susceptible particles, which can be cooled to a temperature below the freezing point of the fluid within the conduit, accelerate the removal of thermal energy from the fluid and its solidification and freezing and/or formation of a frozen plug. The magnetically susceptible particles can serve as nucleation sites upon which or due to which the fluid within the conduit in contact with the particle loses thermal energy and can solidify. The increase in the number of nucleation sites in the fluid as the thermal energy of the fluid is decreased can accelerate the formation of multiple portions of at least partially solidified solid fluid within the conduit or valve chamber. The multiple portions of at least partially solidified solid fluid can interact with the magnetic field of the magnetic field generating device and be directed to any desired location within the conduit or valve chamber, such as to the center of the valve chamber, to one end of the valve chamber, or to a wall of the valve chamber in the vicinity of the heat transfer system, where they adhere due to a combination of the magnetic field as well as freezing to the pre-cooled conduit by action of the heat transfer system. The multiple portions of at least partially solidified fluid within the conduit also can collide with each other to form larger aggregates, which can be directed to the wall of the conduit in the vicinity of the heat transfer system by interacting with the magnetic field of the magnetic field generating device. The proliferation of collisions of aggregates and their directed deposition by virtue of the interaction with the magnetic field of the magnetic field generating device can be sufficient to cause formation of a frozen plug in the conduit in significantly less time than when a cryogen alone is injected into the fluid in a conduit.

The combination of the heat transfer system removing thermal energy from the conduit or valve chamber and its contents from the outside-in, and the introduction of negative thermal energy into the fluid within the conduit or valve chamber by injecting the injection slurry containing magnetically susceptible particles having a thermal conductivity value much greater than the thermal conductivity of the fluid results in the rapid removal of thermal energy from the fluid and formation and building of frozen fluid on the walls of the conduit or valve chamber, resulting in the formation of a frozen plug. The frozen plug contains a packed granular bed of magnetically susceptible particles. The plug transfers the upstream pressure load to the walls of the conduit or chamber in the magneto-cryogenic valve, which stops the flow of fluid through the magneto-cryogenic valve and helps to maintain plug integrity.

The magnetically susceptible particles of the injection slurry composition thus can promote the transfer of thermal energy from a flowing fluid of a conduit to the conduit or valve chamber, particularly to a cooled conduit or valve chamber, such as can be achieved by the activation of the heat transfer system of the magneto-cryogenic valve. The magnetically susceptible particles can be positioned by virtue of the magnetic field generating device, particularly to the vicinity of the conduit cooled by the heat transfer system, which promotes adhesion of the frozen fluid plug to the walls of the conduit or valve chamber as well as increasing the rate of deposition of frozen fluid within the conduit or valve chamber onto the wall of the conduit or valve chamber and subsequently onto layers of frozen fluid.

The magnetically susceptible particles of the injection slurry can be selected to have any desired size and/or shape. For example, the particles can be cubes, flakes, granules, cylinders, rings, rods, needles, prisms, disks, fibers, pyramids, spheres, spheroids, prolate spheroids, oblate spheroids, ellipsoids, ovoids, hexahedrons, hexagonal prisms, tetrahexahedrons, octahedrons, truncated octahedrons, dodecahedrons, triangular prisms or random non-geometric shapes or any combinations of these shapes. The particles also can be solid or hollow. Hollow rods and spheres are known in the art (e.g., see U.S. Pat. Nos. 5,693,269; 5,322,652; 4,775,598; and 4,565,571). Hollow balls made of a number of different alloys, including stainless steels, and of a wide range of sizes are available from United States Ball Corp. (La Mirada, Calif.).

The magnetically susceptible particles can be or include a partial or complete coating containing a thermally conductive material, such as beryllium, brass, cadmium, carbon steel, chrome nickel steel, cobalt, copper, gold, iridium, iron, lead, magnesium, molybdenum, nickel, platinum, silver, stainless steel, tin or zinc, or any combination or alloy thereof. The magnetically susceptible particles can include a partial or complete coating containing an oxide. The oxide can include an oxide of alumina, aluminum, barium, beryllium, bismuth, chromium, cobalt, copper, gadolinium, iridium, iron, magnesium, manganese, molybdenum, nickel, niobium, silica, silicon, silver, tantalum, thorium, tin, titanium, tungsten, vanadium, yttrium, zinc, zirconia or zirconium or combinations thereof.

The magnetically susceptible particles can include a partial or complete coating containing corrosion-resistant material. Any corrosion-resistant material known in the art can be used to at least partially coat the magnetically susceptible particles. For example, the magnetically susceptible particles can include a coating containing a corrosion-resistant material, such as zinc, magnesium or cadmium or an alloy of any two or more of these, e.g., a Zn/Mg alloy or a Mg/Cd alloy (e.g., see U.S. Pat. No. 6,399,146).

The size and/or shape of the particles can be selected to select a surface area of the particle, e.g., to minimize surface area or maximize surface areas, or otherwise facilitate nucleation or formation of frozen fluid within the conduit. Larger particles with lower surface area tend to have higher capacity for containing negative thermal energy. For example, one way to decrease the specific surface area is to select particles that have a more uniform surface geometry. The larger magnetically susceptible particles can be directed to or attracted to an area within the valve chamber, such as the center, to one end, or an inner wall of conduit by means of the magnetic field generating device and effectively increase the surface area of the inner wall of the conduit, promoting transfer of thermal energy out of the fluid within the conduit, to the particles and to the heat transfer unit attached to at least a portion of the conduit.

Another way to decrease the specific surface area is to increase the particle size. The size of the magnetically susceptible particles, as measured by its characteristic length (e.g., diameter) and is limited only by the size of the opening of the injector device. The size of the magnetically susceptible particles can be less than 10% the size of the opening of the injector. In some applications, the particle size can be as large as 90% the size of the opening of the injector. The magnetically susceptible particles can have a very broad particle size distribution (e.g., from nanometer sized particles to particles 20 cm in diameter). The magnetically susceptible particles can have a particle size from about 1 nm to about 100 μm. The magnetically susceptible particles can have a particle size greater than 100 μm and less than 5 cm, such as between 1000 μm and 1 cm. The magnetically susceptible particles can have a particle size between 500 μm and 2.5 cm, or between 1500 μm and 0.5 cm, or between 0.01 mm and 750 mm, or between 0.1 mm and 500 mm, or between 1 mm and 100 mm, or between 0.5 mm and 50 mm. In some applications, the particles can be microparticles having a diameter less than 100 μm, such as having a diameter between 1 nm and 99 μm. In some applications, the particles can be 1 μm to about 100 μm and can be a part of a magneto-rheological fluid (e.g., see U.S. Pat. No. 8,631,917 (Piech et al., 2014) and U.S. Pat. No. 7,306,083 (Ulicny et al., 2007). In some applications, the particles can be less than 1 μm, such as from about 1 nm to about 900 nm and can be a part of a ferrofluid (e.g., see U.S. Pat. No. 7,063,802 (Tsuda et al., 2006) and U.S. Pat. No. 4,356,098 (Chagnon, 1982).

The injection slurry can include an amount of magnetically susceptible particles in the range of 0.01% to 95% based on the weight of the injection slurry. In some applications, only magnetically susceptible particles are injected, or the amount of magnetically susceptible particles is greater than 95% in the slurry, or the amount of slurry carrier is 1% or less in the slurry. The amount of particles that can be included in the injection composition can depend on the geometry of the particles and their packing in the fluid. The uniformity of the size distribution of the particles also can influence particle packing and thus the amount of particles that can be incorporated, particularly at higher concentrations (e.g., above 75% by weight of the injection slurry).

Single, bimodal and polymodal particle size distributions are acceptable. For example, a combination of particles resulting in a non-uniform particle size distribution can be used. The magnetically susceptible particles can have a very broad particle size distribution (e.g., from nanometer sized particles to particles 20 cm in diameter). In some applications, magnetically susceptible particles having different particle sizes can be selected and injected sequentially into the magneto-cryogenic valve. Particles of different sizes can be injected at different times. Larger particles could be injected first, followed by progressively smaller particles until the flow through the magneto-cryogenic valve is stopped. In addition to particle size, the shape of the particles also can be changed to create a plug containing a packed granular bed of particles. As an example, magnetically susceptible particles having the following diameters can be selected: a first particle having diameter of about 50% of the diameter of the inlet; a second particle having diameter of about 50% of the diameter of the first particle; a third particle having diameter of about 50% of the diameter of the second particle; a fourth particle having diameter in the range of from 1 to 100 µm; and a fifth particle having diameter smaller than 1 µm. In an exemplary method, the first particles are injected, followed by the second particles, third particles, fourth particles and fifth particles.

A representation is shown in FIG. 6B, where 170a, 170b, 170c, 170d, and 170e represent the magnetically susceptible particles of differing particle size. The larger particles 170a are ensnared in the magnetic fields produced by electromagnetic field generating devices 140 and begin to form a packed granular bed near an end of the valve chamber. The smaller particles 170b and 170c subsequently injected also get ensnared by the magnetic fields in the valve chamber and pile up behind the larger particles 170a. The even smaller particles 170d and 170e can percolate through any interstitial spaces between the earlier injected particles and be stopped by the larger particles, although the smaller particles also can be stopped by the magnetic fields. This results in a plug containing a packed granular bed of particles that transfer the upstream pressure load to the walls of the chamber in the magneto-cryogenic valve, which stops the flow of fluid through the magneto-cryogenic valve and helps to maintain plug integrity.

Although sequential injection of smaller and smaller particles is illustrated, particles having different diameters can be injected in any order, and some particles can be injected more than once. For example, referring again to FIG. 6B, the injection method could include injection of a mixture of particles 170a and 170b, followed by an injection of particles 170d, followed by an injection of particles 170b, followed by an injection of particles 170e. Any combination of particle size and sequence of injection of the particles can be used to form the plug of packed particles. The volume fraction of particles in the valve chamber may increase with time. In the case of nanoparticle injection, the volume fraction of magnetically susceptible particles can be 70% or greater, or 80% or greater, or 90% or greater.

The magnetically susceptible particles of the injector slurry can have a bimodal particle size distribution. In some applications, one mode of the distribution has an average particle size between about 1000 µm and about 17 cm and the other mode of the distribution has an average particle size between about 1 nm and 100 µm.

Injecting the magnetically susceptible particles can increase the thermal transfer rate of the plug by more than 50%, or more than 60%, or more than 70%. As described in Example 4, the rate of thermal transfer for a frozen plug of pure oil is less than that of a frozen plug of oil containing magnetically susceptible particles. The results obtained in Example 4 indicate that the magnetically susceptible particles used increased the thermal transfer rate by approximately 70%.

Selection of a combination of magnetically susceptible particles of differing particle size can allow formation of a plug containing a packed granular bed of particles without the use of any cooling, or without the use of any cryogen. Alternatively, cooling or a cryogen can be used. In some applications, the magnetically susceptible particles can be cooled to cryogenic temperatures prior to injecting the particles. In some applications, the magnetically susceptible particles are in a cryogenic injection composition that includes a cryogen as a carrier and the cryogenic injection composition is injected into the chamber of the magneto-cryogenic valve.

The cryogenic injection composition can include an amount of magnetically susceptible particles where the total weight of the particle is in the range of 0.05% to at or about 90%, or 0.1% to 85%, or 1% to 80%, or 5% to 75%, or 10% to 70%, or 15% to 65%, or 20% to 60%, or 25% to 50%, or 5% to 25% or 10% to 30%, or 25% to 75%, or 30% to 60%, based on the weight of the injection slurry. The injection slurry can include an amount of magnetically susceptible particles that is 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94% or 95% based on the weight of the inject slurry composition, or the amount of magnetically susceptible particles in the slurry can be in a range of at or about a to at or about b, where a is any one of the preceding percentages of magnetically susceptible particles and b is any one of the preceding percentages of magnetically susceptible particles>a, such as from 85% to 95%, or 71% to 91%, or 43% to 93%, etc.

ii. Slurry Carrier

The injection slurry includes a carrier. The carrier can be any fluid compatible with the magnetically susceptible particles. In some instances, the carrier is a cryogen. The cryogen can be a liquid that boils at a temperature colder than −40° C., or colder than −100° C., or colder than −110° C., or colder than −120° C., or colder than −130° C., or colder than −140° C., or colder than −150° C., or colder than −160° C. For example, liquid argon has a boiling point of about −186° C. The cryogen can be liquid nitrogen, liquid oxygen, liquid helium, liquid neon, liquid methane, liquid natural gas, liquid argon, liquid nitrous oxide, liquid carbon dioxide, liquid Freon® or combinations thereof. In particular, the cryogen can be liquid argon or liquid nitrogen or a combination thereof.

The injection slurry can include an amount of cryogen in the range of 1% to 99%, or 2% to 95%, or 3% to 90%, of 4% to 85%, or 5% to 75%, or 10% to 70%, or 15% to 65%, or 20% to 60%, or 25% to 50%, or 5% to 25%, or 1% to 10%, or 10% to 40%, based on the weight of the injector slurry composition. The injection slurry can include an amount of cryogen that is 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, 35%, 35.5%, 36%, 36.5%, 37%, 37.5%, 38%, 38.5%, 39%, 39.5%, 40%, 40.5%, 41%, 41.5%, 42%, 42.5%, 43%, 43.5%, 44%, 44.5%, 45%, 45.5%, 46%, 46.5%, 47%, 47.5%, 48%, 48.5%, 49%, 49.5%, 50%, 50.5%, 51%, 51.5%, 52%, 52.5%, 53%, 53.5%, 54%, 54.5%, 55%, 55.5%, 56%, 56.5%, 57%, 57.5%, 58%, 58.5%, 59%, 59.5%, 60%, 60.5%, 61%, 61.5%, 62%, 62.5%, 63%, 63.5%, 64%, 64.5%, 65%, 65.5%, 66%, 66.5%, 67%, 67.5%, 68%, 68.5%, 69%, 69.5%, 70%, 70.5%, 71%, 71.5%, 72%, 72.5%, 73%, 73.5%, 74%, 74.5%, 75%, 75.5%, 76%, 76.5%, 77%, 77.5%, 78%, 78.5%, 79%, 79.5%, 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99% or 99.5% based on the weight of the injection slurry composition, or the amount of cryogen in the slurry can be in a range of at or about c to at or about d, where c is any one of the preceding percentages of cryogen and d is any one of the preceding percentages of cryogens>c, e.g., from 5% to 95%, or 42.5% to 76.5%, or 11% to 41%, etc.

The amount of injection slurry composition injected into the fluid within the conduit can vary and can depend on the composition of the fluid or the rate of flow of the fluid or the size of the conduit or combinations thereof. Thus the exact amount of injection slurry composition added to the fluid depends somewhat on the circumstances. The amount of injection slurry composition added can be expressed in terms of amount of injection slurry composition added per gallon of or liter of fluid. It often is convenient to express the amount of fluid using barrels (or bbl, where bbl=42 US gallons or about 159 L). The amount of fluid in a defined area of the conduit, such as the cooling zone under the attached heat transfer system, can be calculated using standard calculations.

Once a flow rate through the conduit is determined, the amount of injection slurry to be added to the fluid can be calculated. The amount of injection slurry added to the fluid within the conduit can be in the range of 0.01 to 500 pounds/bbl, or in the range of 0.05 to 300 pounds/bbl, or in the range of 0.1 to 250 pounds/bbl, or in the range of 0.5 to 125 pounds/bbl, or in the range of 0.75 to 100 pounds/bbl, or in the range of 1 to 100 pounds/bbl.

iii. Solvent

The injection slurry can include a solvent. The solvent can be dispersed on the surface of the magnetically susceptible particles as a film. The solvent can be water or a nonaqueous organic liquid. When the solvent is water, it may freeze upon exposure to the cryogen. The nonaqueous organic liquid may or may not freeze upon exposure to the cryogen. Examples of nonaqueous organic liquids that can be included are benzene, ethyl acetate, propyl acetate, butyl acetate, cyclohexanol, ether, methylethyl ketone, petroleum ether, n-hexane, heptane, cyclohexane, naphtha, isopropyl biphenyl, terpene, toluene, xylene, hexamethyl disiloxane, octamethyl cyclotetrasiloxane, diphenyl tetramethyl disiloxane and trimethylsiloxy end-blocked polydimethylsiloxane fluids. The solvent also can be selected from among acet-aldehyde, acetone, acetonitrile, acrolein, benzene, benzonitrile, bromo-benzene, butanol, butyl acetate, n-butyl amine, t-butyl amine, butyl bromide, carbitol acetate, carbon disulfide, carbon tetrachloride, chlorobenzene, chloroform, cyclohexane, cyclohexanone, cyclopentane, m-dichlorobenzene, o-dichloro-benzene, diethyl carbitol, diethyl ether, dioxane, ethanol, ethyl acetate, ethyl bromide, ethylene glycol, ethyl methyl ketone, glycerin, heptane, heptanone, hexane, hexanol, 1,5-hexadiene, isoamyl acetate, isooctane, isopentane, isopropanol, methanol, methyl cyclohexane, nitroethane, nitromethane, n-octane, octanol, i-pentane, m-pentane, propanol, propylene glycol, pyridine, toluene, thiophene, trichloroethylene, m-xylene, p-xylene and combinations thereof. The amount of solvent in the cryogenic injection composition can be in the range of 0.05% to 75%, or 0.1% to 70%, or 0.5% to 60%, or 1% to 50%, or 5% to 25% based on the weight of the injection slurry. The cryogenic injection composition can include an amount of solvent that is 0.01%, 0.05%, 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74% or 75% based on the weight of the injection slurry composition, or the amount of solvent in the slurry can be in a range of at or about e to at or about f, where e is any one of the preceding percentages of solvent and f is any one of the preceding percentages of solvent>e, such as from 0.01% to 5%, or 0.1% to 74%, or 3% to 33%, etc.

b. Preparation of the Injection Slurry Compositions

The injection slurry composition can be prepared by any method of mixing a fluid with a particle known in the art (e.g., see U.S. Pat. Nos. 7,807,112; 7,785,998 and 7,683,098; and U.S. Pat. Appl. Pub. No. US2011/0085229; US2010/03118598; and US2009/0215255). For example, an injection slurry composition as provided herein can be made by introducing the magnetically susceptible particles to be included in the injection slurry composition into a pressurizable mixing tank. The tank can include cryogen-compatible mixers to stir the liquid cryogen with the magnetically susceptible particles to disperse the particles in the cryogen. The mixing tank can be adapted to include recirculating hoses that include in-line mixers (such as are commercially available from Silverson, Admix, Fluko and other suppliers) compatible with the cryogen and able to withstand cryogenic temperatures to insure thorough mixing of the cryogen with the particles and to assist in dispersion of the particles throughout the cryogen in the composition. Mixing devices, including in-line mixers, are well known in the art (e.g., U.S. Pat. Nos. 5,738,772; 5,076,930; 4,729,664 and 4,533,123).

The cryogenic injection composition also can be made in situ by providing an injector tube in which the magnetically susceptible particles are introduced into the liquid cryogen via a one-way ball valve as the liquid cryogen flows past the ball valve, metering in the magnetically susceptible particles into the cryogen liquid prior to its introduction into the fluid within the conduit.

2. Adhesion Promoter Supply Module

Systems including the magneto-cryogenic valve provided herein can include an adhesion promoter supply module. The adhesion prompter interacts with the fluid in the conduit making it more prone to adhere to the wall of the conduit or valve chamber. Any material that tends to make the fluid more prone to adhere to the walls of the conduit or valve chamber can be used. For example, any material that tends to increase the viscosity of the fluid can be used in the adhesion promoter composition. Any material that allows the fluid to coat the walls of the conduit or valve chamber also can be included. For example, a material that reduces the surface tension of the fluid so that the fluid more easily wets the surface of the conduit or valve chamber in the presence of the material than in its absence. Surface tension reducers are known in the art.

The adhesion promoter supply module includes pipes or tubing that directly can be connected to the injector of the magneto-cryogenic valve, or the pipes or tubing of the supply module can be connected to a pump that is connected to the injector of the magneto-cryogenic valve. Valves between the adhesion promoter module and the injector and/or between the pump and the injector can be used to modulate the flow of the adhesion prompter composition through the injector and into the fluid within the conduit. The adhesion promoter supply module can include an in-line mixer. Flow meters can be included in the pathway between the adhesion promoter supply module and the injector of the magneto-cryogenic valve to measure the flow rate of the adhesion promoter. In some applications, a control system operatively adjusts the flow rate of the adhesion promoter through the adhesion promoter supply module to the injector of the magneto-cryogenic valve.

The flow of the adhesion promoter composition into the injector of the magneto-cryogenic valve can be modulated by any method known in the art. For example, one or more valves can be opened to increase flow or closed to decrease flow through the system. In addition or alternatively, the speed of the pump, when present, can be modulated to module flow of the adhesion promoter through the system and to the injector and ultimately into the fluid within the conduit.

a. Adhesion Promoter Composition

The adhesion prompter composition can be injected into the fluid in the conduit in order to improve the adherence of the fluid to the wall of the conduit. The adhesion prompter composition also can improve the adherence of the frozen plug of fluid to the wall of the conduit. Any material that tends to make the fluid more prone to adhere to the walls of the conduit can be used. For example, any material that tends to increase the viscosity of the fluid or decrease the surface tension of the fluid within the conduit can be included in the adhesion promoter composition. Surface tension reducers are known in the art. Examples of surface tension reducers include surfactants, sulfonic acids and alkali metal salts of sulfonic acids, alcohols, amines, esters, siloxanes, such as polydimethylsiloxanes, and mono and dialkylated oxazolines where the alkyl chain length is between about 2 to about 30 carbons. Exemplary sulfonic acids and salts of sulfonic acids include dodecyl benzene sulfonic acid, sodium 1-octane sulfonate, alkyl naphthalene sulfonate. Exemplary alcohols include ethanol, propanol, isopropanol, butanol, hexanol, heptanol, octanol and ethoxylated nonylphenol. The surfactant can include anionic, cationic, non-ionic, zwitterionic and/or amphoteric agents and any combination thereof. The surfactant can be a fluorosurfactant. Exemplary esters that can be used as tension reducers include polyols or derivatives of polyols, e.g., glycerin, trimethylolpropane, polyethylene glycol and pentaerythritol. Exemplary amines that can be used as tension reducers include hexakis methoxy methylene melamine.

The amount of surface tension reducer that can be included in the adhesion promoter composition can depend on the composition of the fluid or the rate of flow of the fluid or the size of the conduit or combinations thereof. For example, the amount of surface tension reducer that can be included in the adhesion promoter composition can be between about 0.01% and about 50% based on the weight of the composition. In some applications, the amount of surface tension reducer in the composition can be between 0.1% and 25%, or between 0.5% and 20%, or between 1% and 10%, or between 0.005% and 5%. The adhesion promoter composition can include an amount of surface tension reducer that is 0.001%, 0.005%, 0.01%, 0.05%, 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% based on the weight of the adhesion promoter composition, or the amount of surface tension reducer can be in a range of at or about g to at or about h, where g is any one of the preceding percentages of surface tension reducer and h is any one of the preceding percentages of surface tension reducer>g, e.g., from 0.001% to 0.5%, or 1% to 47%, or 5% to 15%, etc.

It has been determined that introduction of surfactant into the fluid within the conduit tends to provide a more uniform frozen fluid and can serve as an adhesion promoter. Any surfactant known in the art can be used, including cationic, anionic, non-ionic and zwitterionic surfactants, including silicone surfactants. Exemplary surfactants are discussed in the art (e.g., see U.S. Pat. Nos. 3,760,598; 4,634,050; 6,464,148; and 7,562,831, and particularly U.S. Appl. Pub. No. 2011/0308259, paragraphs [0234]-[0238], the disclosure of each of which is incorporated by reference herein).

Exemplary amphoteric surfactants include betaines, sulphobetaines, imidazoline betaines and alkyl amido propyl betaines. Exemplary nonionic surfactants include ethoxylated nonionic surfactants selected from among condensation products of ethylene oxide with aliphatic alcohols having from 8 to 22 carbon atoms in either straight or branched chain configuration as well as condensation products of ethylene oxide with nonyl phenol, phenol, butyl phenol, di-nonyl phenol, octyl phenol or other phenols, sorbitan esters and amine oxides, ethoxylated $C_{10}$-$C_{20}$ alcohols, fatty acids, fatty amines or glyceryl esters, alkyl polyglycosides, methyl glucoside esters, as well as blends of such nonionic surfactants. Other exemplary non-ionic surfactants include Tergitol NP-9® (Dow Chemical Co., Midland, Mich.), a nonionic, nonylphenol ethoxylate surfactant, Tergitol NP-33 [9016-45-9] an alpha(nonylphenyl)-omega-hydroxypoly(oxy-1,2-ethanediyl); antarox; nonylphenoxy-poly(ethyleneoxy)ethanol; nonylphenyl polyethyleneglycol ether, nonionic; nonylphenyl polyethylene glycol ether; PEG-9 nonyl phenyl ether; POE (10) nonylphenol; POE (14) nonylphenol; POE (15) nonyl phenol; POE(15) Nonyl Phenyl Ether; POE(18) Nonyl Phenyl Ether; POE (20) nonylphenol; POE(20) Nonyl Phenyl Ether; POE (30) nonylphenol; POE (4) nonylphenol; POE (5) nonylphenol; POE (6) nonylphenol; POE (8) nonylphenol; polyethylene glycol 450 nonyl phenyl ether; polyethylene glycol 450 nonyl phenyl ether, nonionic surfactant; polyethylene glycols mono(nonylphenyl)ether; polyethylene mono(nonylphenyl)ether glycols; polyoxy-ethylene (10) nonylphenol; polyoxyethylene (14) nonylphenol; polyoxyethylene (1.5) nonyl phenol; polyoxyethylene (20) nonylphenol; polyoxyethylene (30) nonylphenol; polyoxyethylene (4) nonylphenol; polyoxyethylene (5) nonylphenol; polyoxyethylene (6) nonylphenol; polyoxyethylene (8) nonylphenol; Polyoxyethylene (9) Nonylphenyl Ether; polyoxyethylene(n)-nonylphenyl ether; Polyoxyethylene nonylphenol; POE nonylphenol; Protachem 630; Sterox; Surfionic N; T-DET-N; Tergitol NP; Tergitol NP-14; Tergitol NP-27; Tergitol NP-33; Tergitol NP-35; Tergitol NP-40; Tergitol NPX; Tergitol TP-9; Tergitol TP-9 (non-ionic); Triton N; Triton X; Dowfax 9N; ethoxylated nonylphenol; glycols, polyethylene, mono (nonyl-phenyl) ether; Igepal CO; Igepal CO-630; macrogol nonylphenyl ether; Makon; Neutronyx 600; Nonipol NO; nonoxinol; nonoxynol; Nonoxynol-15; Nonoxynol-18; Nonoxynol-20; nonyl phenol ethoxylate; nonylphenol polyethylene glycol ether; nonylphenol, polyoxyethylene ether; nonyl-phenoxypoly-ethoxyethanol; nonionic surfactants having a polyalkylene oxide polymer as a portion of the surfactant molecule, such as chlorine-, benzyl-, methyl-, ethyl-, propyl-, butyl- and other similar alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ethers; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers including an ethylene oxide/propylene oxide block copolymer such as those commercially available under the trademark PLURONIC® (BASF-Wyandotte).

Exemplary anionic surfactants include alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates and mixtures thereof.

Exemplary cationic surfactants include arginine methyl esters, alkanolamines and alkylenediamides, and mixtures thereof. Other exemplary cationic surface active agents include but are not limited to homopolymers and copolymers derived from free radically polymerizable acrylic or methacrylic ester or amide monomers. The copolymers can contain one or more units derived from acrylamides, methacrylamides, diacetone acrylamides, acrylic or methacrylic acids or their esters, vinyl lactams such as vinyl pyrrolidone or vinyl caprolactam, and vinyl esters. Exemplary polymers include copolymers of acrylamide and dimethyl amino ethyl methacrylate quaternized with dimethyl sulfate or with an alkyl halide; copolymers of acrylamide and methacryloyl oxyethyl trimethyl ammonium chloride; the copolymer of acrylamide and methacryloyl oxyethyl trimethyl ammonium methosulfate; copolymers of vinyl pyrrolidone/dialkylaminoalkyl acrylate or methacrylate, optionally quaternized, such as the products sold under the name GAFQUAT™ by International Specialty Products; the dimethyl amino ethyl methacrylate/vinyl caprolactam/vinyl pyrrolidone terpolymers, such as the product sold under the name GAFFIX™ VC 713 by International Specialty Products; the vinyl pyrrolidone/methacrylamidopropyl dimethylamine copolymer, marketed under the name STYLEZE™ CC 10 by International Specialty Products; and the vinyl pyrrolidone and quaternized dimethyl amino propyl methacrylamide copolymers such as the product sold under the name GAFQUAT™ HS 100 by International Specialty Products; quaternary polymers of vinyl pyrrolidone and vinyl imidazole such as the products sold under the trade name Luviquat® (product designation FC 905, FC 550, and FC 370) by BASF; acetamidopropyl trimonium chloride, behenamidopropyl dimethylamine, behenamido-propyl ethyldimonium ethosulfate, behentrimonium chloride, cetethyl morpholinium ethosulfate, cetrimonium chloride, cocoamidopropyl ethyl-dimonium ethosulfate, dicetyl-dimonium chloride, dimethicone hydroxypropyl trimonium chloride, hydroxyethyl behenamidopropyl diammonium chloride, quaternium-26, quaternium-27, quaternium-53, quaternium-63, quaternium-70, quaternium-72, quaternium-76 hydrolyzed collagen, PPG-9 diethylammonium chloride, PPG-25 diethylammonium chloride, PPG-40 diethylmonium chloride, stearalkonium chloride, stearamidopropyl ethyl dimonium ethosulfate, steardimonium hydroxypropyl hydrolyzed wheat protein, steardimonium hydroxypropyl hydrolyzed collagen, wheat germamido-propalkonium chloride, wheat germamidopropyl ethyldimonium ethosulfate, polymers and copolymers of dimethyl diallyl ammonium chloride, such as Polyquaternium-4, Polyquaternium-6, Polyquaternium-7, Polyquaternium-10, Polyquaternium-11, Polyquaternium-16, Polyquaternium-22, Polyquaternium-24, Polyquaternium-28, Polyquaternium-29, Polyquaternium-32, Polyquaternium-33, Polyquaternium-35, Polyquaternium-37, Polyquaternium-39, Polyquaternium-44, Polyquaternium-46, Polyquaternium-47, Polyquaternium-52, Polyquaternium-53, Polyquaternium-55, Polyquaternium-59, Polyquaternium-61, Polyquaternium-64, Polyquaternium-65, Polyquaternium-67, Polyquaternium-69, Polyquaternium-70, Polyquaternium-71, Polyquaternium-72, Polyquaternium-73, Polyquaternium-74, Polyquaternium-76, Polyquaternium-77, Polyquaternium-78, Polyquaternium-79, Polyquaternium-80, Polyquaternium-81, Polyquaternium-82, Polyquaternium-84, Polyquaternium-85, Polyquaternium-87, PEG-2-cocomonium chloride, and mixtures thereof; polyalkyleneimines such as polyethyleneimines, polymers containing vinyl pyridine or vinyl pyridinium units, condensates of polyamines and epichlorhydrins; quaternary polyurethanes; salts of a primary, secondary, or tertiary fatty amine, optionally polyoxyalkylenated; a quaternary ammonium salt derivative of imidazoline, or an amine oxide; mono-, di-, or tri-alkyl quaternary ammonium compounds with a counterion such as a chloride, methosulfate, tosylate, including, but not limited to, cetrimonium chloride, dicetyidimonium chloride and behentrimonium methosulfate.

Silicone surfactants also can be used. For example, in some embodiments, the silicone surfactant includes a surface active polydiorganosiloxane, such as described in U.S. Pat. No. 4,421,656. In some embodiments, the silicone surfactant can be selected from among dimethicone copolyols and alkyl dimethicone copolyols and blends thereof. Examples of such silicone surfactants include the blends of dimethicone copolyol and cyclomethicone, such as sold by Dow Corning (Midland, Mich.) under the name DC3225C or DC2-5225C, a polyalkyl polyether polysiloxane copolymer having an alkyl radical containing from 5 to 22 carbon atoms, such as cetyl dimethicone copolyol, such as that sold under the name Abil® EM-90 by EVONIK Goldschmidt GmbH (Essen, Germany), the mixture of dimethicone copolyol and cyclopentasiloxane (85/15), such as that sold under the name Abil® EM-97 by Goldschmidt, linear-type polyether-modified silicone emulsifiers, including methyl ether dimethicones, such as PEG-3 methyl ether dimethicones, PEG-9 methyl ether dimethicones, PEG-10 methyl ether dimethicones, PEG-11 methyl ether dimethicones, and butyl ether dimethicones (available from Shin-Etsu (Akron, Ohio); branched-type polyether-modified silicone emulsifiers, such as PEG-9 polydimethylsiloxyethyl dimethicone (Shin-Etsu), alkyl co-modified branched-type polyether silicones, such as lauryl PEG-9 polydimethylsiloxyethyl dimethicone (Shin-Etsu), silicones containing polyalkylene oxide groups, such as the commercially available emulsifier Silwet® 7001, manufactured by Momentive Performance Materials (Albany, N.Y.), Dow Corning FG-10, Silwet® L-77 (polyalkylene oxide modified heptamethyl trisiloxane containing a methyl end group and 1 pendant group and having an average molecular weight of 645) and Silwet® L-7608 (polyalkylene oxide modified heptamethyl trisiloxane containing a hydrogen end group and one pendant group and having an average molecular weight of 630) available from Momentive Performance Materials; Lambent™ MFF-199-SW (containing a hydrogen end group and one pendant polyethylene oxide group and having an average molecular weight between 600 to 1000) available from Lambent Technologies Inc. (Gurnee, Ill.); silicone copolyol based carboxylate esters, such as SW-CP-K (containing a phthalate end group and one polyethylene oxide pendant group and having an average molecular weight between 800 and 1100) and Lube CPI (containing a phthalic acid end group and 3 to 5 pendant groups and having an average molecular weight between 2900 and 5300) available from Lambent Technologies Inc.; alkyl-dimethicone copolyol type surfactants, such as described in U.S. Pat. No. 7,083,800, including such silicone emulsifiers commercially sold under the names "Abil® WE 09", "Abil® WS 08" and "Abil® EM 90" (EVONIK Goldschmidt GmbH, Essen, Germany) and cationic silicone emulsifiers, such as described in U.S. Pat. No. 5,124,466.

Anionic surfactants include, but are not limited to, one or more of a carboxylate such as, without limitation, alkylcarboxylates (e.g., carboxylic acid and/or its salts), polyalkoxycarboxylates (e.g., polycarboxylic acid and/or its salts), alcohol ethoxylate carboxylates, nonylphenol ethoxylate carboxylates, or combinations thereof; sulfonates such as, without limitation, alkylsulfonates, alkylbenzenesulfonates (e.g., dodecyl benzene sulfonic acid and/or its salts), alkylarylsulfonates, sulfonated fatty acid esters, or combinations thereof; sulfates such as, without limitation, sulfated alcohols, sulfated alcohol ethoxylates, sulfated alkylphenols, alkylsulfates, sulfosuccinates, alkylether sulfates, or combinations thereof; phosphate esters such as, without limitation, alkyl-phosphate esters; or combinations thereof. Exemplary anionic surfactants include sodium alkylarylsulfonate, alpha-olefinsulfonate, fatty alcohol sulfates and combinations thereof.

Exemplary amphoteric surfactants (or zwitterionic surfactants) include, but are not limited to, imidazoline derivatives, betaines, imidazolines, sultaines, propionates, amine oxides or combinations thereof, including imidazolinium betaine, dimethylalkyl lauryl betaine, alkylglycine, and alkyldi(aminoethyl)glycine.

The amount of surfactant can be included in the adhesion promoter composition can depend on the composition of the fluid or the rate of flow of the fluid or the size of the conduit or combinations thereof. For example, the amount of surfactant that can be included in the adhesion promoter composition can be between about 0.01% and about 50% based on the weight of the composition. In some applications, the amount of surfactant in the composition can be between 0.1% and 25%, or between 0.5% and 20%, or between 1% and 10%, or between 0.005% and 5%. The adhesion promoter composition can include an amount of surfactant that is 0.001%, 0.005%, 0.01%, 0.05%, 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% based on the weight of the adhesion promoter composition, or the amount of surfactant can be in a range of at or about i to at or about j, where i is any one of the preceding percentages of surfactant and j is any one of the preceding percentages of surfactant>j, such as from 0.001% to 0.5%, or 0.5% to 50%, or 0.05% to 15%, etc.

As discussed above, the amount of surfactant included in the adhesion promoter composition to be injected into the fluid within the conduit can vary and can depend on the composition of the fluid or the rate of flow of the fluid or the size of the conduit or combinations thereof and thus the exact amount of surfactant added depends somewhat on the circumstances. The amount of surfactant added can be expressed in terms of amount of surfactant added per gallon of or liter of fluid. The amount of fluid in a defined area of the conduit, such as the cooling zone under the attached heat transfer system, can be calculated using standard calculations. Because flow rates through conduits can vary, it often is convenient to express the amount of fluid in barrels or bbl. The amount of surfactant added to the fluid within the conduit, either by injecting a cryogenic injection composition containing frozen beads that include surfactant(s) or by injection of surfactant into the fluid within the conduit, can be in the range of 0.01 to 150 pounds/bbl or in the range of 0.1 to 100 pounds/bbl or in the range of 0.5 to 75 pounds/bbl or in the range of 1 to 65 pounds/bbl, or in the range of 1.5 to 50 pounds/bbl, or in the range of 1 to 10 pounds/bbl. Inorganic and organic particles, such as clay minerals and diatomaceous earth, also can be included in the adhesion promoter composition.

The adhesion promoter composition can include a solvent. The solvent can be selected from among any known solvent. Exemplary solvents include acetaldehyde, acetone, acetonitrile, acrolein, benzene, benzonitrile, bromo-benzene, butanol, butyl acetate, n-butyl amine, t-butyl amine, butyl bromide, carbitol acetate, carbon disulfide, carbon tetrachloride, chlorobenzene, chloroform, cyclohexane, cyclohexanone, cyclopentane, m-dichlorobenzene, o-dichloro-benzene, diethyl carbitol, diethyl ether, dioxane, ethanol, ethyl acetate, ethyl bromide, ethylene glycol, ethyl methyl ketone, glycerin, heptane, heptanone, hexane, hexanol, 1,5-hexadiene, isoamyl acetate, isooctane, isopentane, isopropanol, methanol, methyl cyclohexane, nitroethane, nitromethane, n-octane, octanol, i-pentane, m-pentane, propanol, propylene glycol, pyridine, toluene, thiophene, trichloroethylene, water, m-xylene, p-xylene and combinations thereof.

The amount of solvent in the adhesion promoter composition can be in the range of 0.05% to 85%, 0.1% to 80%, or 0.5% to 75%, or 1% to 50%, or 5% to 50%, or 5% to 25%, or 1% to 15%, or 0.5% to 10%, or 0.05% to 5%, based on the weight of the adhesion promoter composition. The adhesion promoter composition can include an amount of solvent that is 0.001%, 0.005%, 0.01%, 0.05%, 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84% or 85%, based on the weight of the adhesion promoter composition, or the amount of solvent can be in a range of at or about k to at or about l, where k is any one of the preceding percentages of solvent and l is any one of the preceding percentages of solvent>k, such as from 0.001% to 1%, or 0.1% to 84%, or 5% to 45%, etc.

3. Cryogen Supply Module

In some instances, the magneto-cryogenic valve includes a heat transfer system that includes a cryogen. In such instances, the system includes a cryogen supply module. A cryogen supply module provides a cryogen to the heat transfer system. The cryogen supply module can include a non-thermally conducting surface in contact with the environment to thermally isolate the cryogen supply module from the environment. The cryogen supply module can be constructed of a material appropriate for the environment in which it is to be deployed. For example, in embodiments where the system is to be used underwater, particularly in deep sea drilling applications, the cryogen supply module can be constructed of material sufficient to withstand the pressures at depth, including the pressures exerted by water at depths of 5,000 feet or more under water. Those skilled in the art of undersea construction are familiar with the required mechanics necessary for the construction of a cryogen supply module capable of containing a cryogen and withstanding the ambient water pressures at depth. For example, the cryogen supply module can be constructed of reinforced steel or composite materials and reinforced to withstand the ambient water pressures.

Piping, valves, vessels and other components of the cryogen supply module can be designed for the expected pressures and temperatures, such as to industry standards, e.g., specifications promulgated by the American Society of Mechanical Engineers (ASME). The cryogen supply module includes a cryogenic storage tank or other vessel constructed to contain liquid cryogen. In most instances, the storage tank contains an inner vessel for containing the liquid cryogen and an outer vessel exposed to the environment, where the inner vessel is designed to minimize any thermal transfer from the outer vessel to the inner vessel. The cryogen supply module also includes pipes or tubes for providing cryogen to the heat transfer system, and can include pipes or tubing for charging the storage tank with cryogen.

In some applications, a pressure control manifold is present in the cryogen supply module to control the pressure at which the cryogen is provided to the heat transfer system. The pressure control manifold can be used to maintain or adjust the thermal transfer in the heat transfer system. In an evaporative heat transfer system such as can be established using a liquid cryogen, e.g., liquid nitrogen or liquid argon, the evaporation of the liquid cryogen into a gas is effective for thermal energy transfer, but the resulting gas can serve as an insulating layer, thereby reducing the effectiveness of thermal energy transfer. By adjusting the pressure of the cryogen supply to the heat transfer system, the resulting gas from the warmed cryogen can be removed from the heat transfer system by the force of the incoming cryogen, removing the insulating layer of gas, thereby increasing the rate of thermal energy removal from the system.

The cryogen supply module can provide fluid cryogen to the heat transfer system directly through pipes or tubing or the cryogen supply module can be connected to a pump that is connected to the heat transfer system. The cryogen supply module can include thermal monitoring devices for monitoring the temperature of the cryogen or the pipes carrying the cryogen or a combination thereof. The cryogen supply module also can include flow rate meters for determining flow of cryogen from the module. The cryogen supply module also can include level meters for monitoring the amount of cryogen in the module.

The cryogen supply module contains cryogen and delivers the cryogen to the heat transfer system of the magneto-cryogenic valve. Any cryogen know in the art can be used. The cryogen can include any liquid that can transfer thermal energy under the conditions of use. Exemplary liquid cryogens can include liquid carbon dioxide, liquid ammonia, liquified chlorofluorohydrocarbons, liquified gases such as liquid nitrogen, liquid oxygen, liquid neon, liquid argon, liquid nitrous oxide, hydrofluoroethane, pentafluoropropane, trichloromonofluoromethane, dichlorodifluoromethane, or a mixture or any combination thereof. In some instances, a cryogen having a boiling temperature of −40° C. or less is selected. In some instances, a cryogen having a boiling temperature of −150° C. or less is selected. In some instances, the cryogen is selected to have a boiling temperature less than −40° C., or −50° C., or −60° C., or −70° C., or −80° C., or −90° C., or −100° C., or −110° C., or −120° C., or −130° C., or −140° C., or −150° C., or −160° C., or −170° C., or −180° C., or −190° C., or −200° C. In some applications, the cryogen is liquid nitrogen or liquid argon or a combination thereof.

In some applications, a pressure control manifold is present at the outlet port of the heat transfer system to control the pressure of the cryogen within the heat transfer system. The pressure control manifold can be used to adjust the thermal transfer in the heat transfer system. When rapid thermal energy extraction (cooling) is desired, the pressure control manifold is configured so that the pressure within the heat transfer system is close to ambient pressure, promoting the evaporation of the liquid cryogen into its gaseous state, thereby quickly removing thermal energy due to evaporative cooling. If it is desirable to decrease the rate of cooling, the pressure control manifold can be adjusted to increase the pressure within the heat transfer system. As the pressure inside the heat transfer system increases, evaporative cooling that normally can be achieved by the conversion of liquid cryogen into a gas at atmospheric pressures is slowed or prevented, depending on the pressure within the heat transfer system. When the pressure is high, it is possible for latent heat to be drawn from the fluid inside the conduit by a liquid cryogen in the heat transfer system, but the liquid cryogen cannot be converted into a gas, and thus thermal transfer from the fluid in the conduit to the liquid cryogen is not as high as can be achieved under lower pressure conditions. In some instances, modulating the pressure so that it is increased at a controlled rate can result in a controlled modulation of the temperature within the heat transfer system, allowing for the control of temperature within the heat transfer system by modulating the pressure of the cryogen within the heat transfer system. Thus, one can vary the temperature by varying the pressure within the heat transfer system. A controllable temperature rise in the heat transfer system can be used to donate thermal energy to the conduit in contact with the heat transfer system, providing for a controlled melting of the frozen plug within the conduit.

a. Tubing or Piping

The cryogen supply module, and pumps and valves when present, are in fluid communication and can be connected via tubing or piping. The tubing or piping can be constructed of a material and construction applicable for the environment in which the system is to be deployed. For example, for deep sea drilling applications, the tubing or piping can be engineered to resist the high water pressures that exist at depths of deep sea drilling. Those skilled in the art can select the proper material and thickness or design of the piping or tubing for such applications. The piping or tubing can include radial or lateral reinforcements to withstand collapse under the pressure of the water pressures that exist at deep sea drilling depths. The piping or tubing can be manufactured to be of a thickness such that the piping or tubing is resistant to deformation or crushing by the water pressure at sea depths of deep sea drilling. The tubing can be constructed for ambient pressures and can be insulated to minimize thermal contamination from the surrounding environment. The tubing can be thermally insulated from the environment using any technique known to those of skill in the art. In some embodiments, the tubing or piping can be encircled or enveloped in a non-thermally conductive material. In some embodiments, the piping or tubing can include coaxial tubing in which the inner pipe or tube is within an outer pipe or tube, and the space between the inner pipe or tube and the outer pipe or tube includes a thermally non-conductive material as insulation. Any thermally non-conductive material known in the art can be used.

b. Flow Rate Meters

In some embodiments, flow rate meters can be included in the systems provided herein, e.g., in the pipes or tubing that deliver cryogen to the heat transfer system. One or more flow rate meters can be positioned in the fluid path between the cryogen supply module and the heat transfer system to measure the total fluid flow through the system. The flow meter can be selected from among coriolis force flow meters, electromagnetic velocity sensors, magnetic flow meters, optical sensors, thermal flow meters, turbine flow meters, ultrasonic flow meters or any other type of flow meter known in the art (e.g., see U.S. Pat. Nos. 7,730,777; 7,707,898; 4,934,196; 4,422, 338 and RE 31,450, and U.S. Pat. Appl. Pubs. 2009-0281671, 2005-0288873 and 2004-0244498). The flow rate meters can be in communication with a computer module for automation of the system. Data from the flow rate meters can be used to determine the flow of cryogen through the system, particularly through the heat transfer system, and can be used to modulate the rate of flow of cryogen through the system, either manually or via computer control. Flow rate meters can be included throughout the path of fluid communication from the cryogen supply module to the point of discharge of spent cryogen from the heat transfer system for determination of rate of flow of cryogen.

c. Modulating Valves

The cryogen supply module also can include modulating valves that can be used to modulate the flow of cryogen from the cryogen supply module to the heat transfer system of the magneto-cryogenic valve. In some applications, one or more modulating valves can be positioned between the cryogen supply module and a pump, if present, or the heat transfer system, or a combination thereof. The modulating valves can be controlled manually. The modulating valves can include electrical solenoid valves. The modulating valves can be in communication with and/or controlled by a computer. The computer can modulate the flow of cryogen through the system by opening or closing the modulating valves or adjusting the degree to which one or more of the modulating valves are open and allowing refrigerant flow through the system.

4. Computer Module

In some applications, the system includes a computer module for automation of the system. The computer module can be in communication with and/or in control of any part of the magneto-cryogenic valve or element of the system containing the magneto-cryogenic valve. The computer module can be used to control the magnetic field generating device and its related elements, or the cryogen supply module and its related element, or the injector slurry module and its related elements, or the adhesion promoter composition supply module and its related elements, or any combination thereof. Communications between the computer module and the magneto-cryogenic valve or any element of the system containing the magneto-cryogenic valve can be performed using any suitable technique, including electromagnetic (EM) signaling, mud-pulse telemetry, switched packet networking, or connection-based electronic signaling. The communications medium can be a wire, a cable, a waveguide, a fiber, a fluid such as mud, or any other medium. The communications medium can include one or more communications paths. For example, one communications path can couple the computer module to a heat transfer system while another communications path can couple the computer module to a cryogen supply module. The communications medium also can be used to convey data, such as temperature or pressure sensor measurements. For example, measurements from temperature sensors attached to the conduit can be sent to the computer module for further processing or analysis or storage. The communications medium can permit communications at a speed sufficient to allow the computer module to perform real-time collection and analysis of data from sensors located downhole or elsewhere associated with the magneto-cryogenic valve or the system containing the magneto-cryogenic valve.

The methods provided herein can be embodied in a computer-readable storage medium having a computer-readable program embodied therein for directing operation of the described magneto-cryogenic valve or the system containing the magneto-cryogenic valve. The computer-readable program can include instructions for operating the magneto-cryogenic valve or the system containing the magneto-cryogenic valve.

For example, the computer processor of the computer module can control and/or modulate the flow of the cryogen through the heat transfer system by manipulating one or more valves in the path of fluid flow from the cryogen supply module to the heat transfer system. Remotely activatable or controllable modulating valves, such as electrical solenoid valves, can be under the control of the computer. For example, the computer can deactivate one or more electrical solenoid valve(s) to module cryogen flow through the heat transfer system. The computer module also can monitor and/or record temperatures throughout the system. The temperature inside the heat transfer system and the temperature along the conduit, particularly in the vicinity of the heat transfer system, can be monitored with thermal monitoring devices, such as thermocouples, in communication with the computer module.

D. METHODS

Provided herein are methods of reversibly modulate flow through a conduit. The magneto-cryogenic valve and systems including the magneto-cryogenic valve provided herein can be used to reversibly modulate the flow of a fluid through a conduit. When the magneto-cryogenic valve and systems containing the magneto-cryogenic valve described herein are used, e.g., when magneto-cryogenic valve integrated or attached to a fluid-filled conduit is activated, the magneto-cryogenic valve can input sufficient negative thermal energy and extract heat from the fluid and the conduit, to decrease the temperature of the fluid within the conduit, which will thicken and eventually solidify. The methods provided herein can result in reduction of the temperature of the at least a portion of the fluid of the conduit to a temperature of between −20° C. to −200° C. In some methods, the temperature of the fluid of the conduit can be decreased to a temperature of −150° C. or lower.

Activation of the magneto-cryogenic valve results in the addition of a large sink of negative thermal energy by virtue of the introduction of the injection slurry composition containing magnetically susceptible beads into the fluid within the conduit or valve chamber. Activation also results in thermal energy extraction from the conduit and fluid therein by the heat transfer system attached to at least a portion of the conduit or valve chamber. Activation also results in the production of magnetic fields that interact with the magnetically susceptible beads and direct them to a desired location within the conduit or valve chamber, e.g., an inner wall of the conduit or valve chamber, generally in the vicinity of the heat transfer system. This combination of negative energy input via the injection slurry composition and heat extraction via the heat transfer system results in concentric freezing of the fluid, such as a fluid containing crude oil or other petroleum product, within the reduced temperature zone of the conduit or valve chamber (usually in the vicinity of the heat transfer system), continually reducing the inside diameter of the conduit or valve chamber and ultimately forming a plug adhered to the conduit or valve chamber inner wall that seals the conduit with the frozen plug. The plug can be maintained attached to the conduit or valve chamber wall to prevent flow for as long as desired, e.g., until the conduit is repaired. The attachment of the plug can be prolonged by maintaining a reduced temperature in the vicinity of the attachment site of the plug to the conduit or valve chamber. In some methods, the heat transfer system includes a thermoelectric module or a Peltier device. In some methods, the heat transfer system includes a cryogen cooled heat exchange unit as described herein.

The methods provided herein include injecting into a fluid within the conduit an injection slurry composition, which contains magnetically susceptible particles. The injection slurry composition also can contain other components, such as a carrier, including a cryogen and solvent and combinations thereof. The introduction of the injection slurry composition reduces the time required for frozen plug formation because it results in a large influx of negative thermal energy into the fluid within the conduit. In addition, the discrete particles of negative thermal energy can absorb heat from the fluid and, by virtue of the interaction of the magnetically susceptible particles with the magnetic field produced by the magnetic field generating device, the thermal energy from the fluid absorbed by the magnetically susceptible particles can be transferred to the heat transfer system by virtue of the particles being directed, e.g., to the inner conduit or valve chamber wall in the vicinity of the heat transfer system by the attractive force of the magnetic fields. Hence, the removal of thermal energy from the fluid occurs at an increased rate of thermal energy dissipation from the fluid than that observed with injection of cryogen alone. The magnetically susceptible particles pre-cooled to a temperature below the freezing point of the fluid within the conduit accelerate the decrease in temperature of the fluid and its solidification and freezing. The direction of chilled fluid to the vicinity of the pre-cooled conduit near the heat transfer system due to the attractive forces of the magnetic fields on the magnetically susceptible particles also accelerates the rate of formation of a frozen plug of fluid in the conduit or valve chamber.

In addition, the pre-cooled magnetically susceptible particles also can result in formation of localized viscosity increases in the fluid and/or partially solidified fluid. Accumulation of partially solidified fluid on the magnetically susceptible particles can rapidly be directed to any desired location, e.g., the conduit or valve chamber walls by virtue of the magnetic fields of the magnetic field generating device, thereby accelerating the rate of formation of a frozen plug of fluid in the conduit or valve chamber. Accordingly, formation of a frozen plug occurs in significantly less time using the systems and methods described herein than when a cryogen alone is injected into the fluid in a conduit.

It has been determined that the introduction of an adhesion promoter composition into the fluid of the conduit tends to provide a more uniform frozen fluid or to promote adhesion of the frozen plug to the conduit or valve chamber inner wall or both. In the methods provided herein, the adhesion promoter composition can include any surface tension reducer known in the art. Examples of surface tension reducers include surfactants, sulfonic acids and alkali metal salts of sulfonic acids, alcohols, amines, esters, siloxanes, such as polydimethylsiloxanes, and mono and dialkylated oxazolines where the alkyl chain length is between about 2 to about 30 carbons. The adhesion promoter composition can be injected into the fluid at a point remote from the point of injection of the injector slurry into the fluid within the conduit. The adhesion promoter composition can be injected into the fluid at a location in the vicinity of the injection of the injector slurry into the fluid and simultaneously with the injector slurry.

Activation of the magneto-cryogenic valve attached to a conduit results in the heat transfer system removing thermal energy from the conduit and its contents from the outside-in, and the introduction of negative thermal energy into the fluid within the conduit by introducing the injector slurry containing the magnetically susceptible particles into the fluid, resulting in the formation of a frozen plug of fluid. The transfer of thermal energy out of the fluid, particularly to a cooled conduit in the vicinity of the heat transfer system using the magnetically susceptible particles, as can be achieved by the manipulation of the movement of the magnetically susceptible particles using the magnetic fields of the magnetic field generating device, can promote adhesion of the frozen fluid plug to the walls of the conduit or valve chamber as well as increasing the rate of deposition of frozen fluid onto the conduit or valve chamber wall and subsequently onto layers of frozen fluid.

A magneto-cryogenic valve provided herein or a system containing the magneto-cryogenic valve can be attached to an intact conduit. In a method to reversibly prevent fluid flow through the conduit, the magneto-cryogenic valve is activated when necessary as an emergency shut off mechanism of the conduit. For example, the magneto-cryogenic valve can be activated in case of failure or breach of the conduit. The magneto-cryogenic valve and systems described herein also can be used to provide a means of preventing fluid flow through a breached or broken conduit. In such instances, the method can include identifying a breach site in a conduit; deploying a magneto-cryogenic valve, attaching the magneto-cryogenic valve to a point below (relative to the direction of flow through the conduit) the fracture, breach or break in an intact area of the conduit; and activating the magneto-cryogenic valve for a sufficient time to form a frozen plug of fluid that prevents flow of the fluid through the conduit. In the methods provided herein, the magneto-cryogenic valve can be maintained in active thermal exchange to maintain the frozen fluid plug firmly adhered to the inner conduit wall until repairs can be made to the conduit. Then, when it is desirable to restore fluid flow through the conduit, the method includes as a step providing thermal energy to the conduit. At a certain temperature, the frozen fluid plug will begin to melt and detach from the inside surface of the conduit. Once the plug becomes detached from the inside surface of the conduit, fluid pressures within the conduit will dislodge the frozen plug, restoring flow of the fluid through the conduit.

The magnetic fields of the magnetic field generating device can be used to restore flow of fluid in the conduit. For example, in some methods, the magnetic field generating device of the magneto-cryovalve can include a plurality of electromagnets in which oscillation of the B-field can be induced. By inducing an alternating magnetic field, inductive heating can be produced. For example, some of the magnetically susceptible particles in the slurry can include a ferromagnetic coating. These ferromagnetic coated magnetically susceptible particles can be included in the injection slurry uniformly, so that they are distributed throughout the frozen plug of fluid. By alternating the magnetic field, domains in the ferromagnetic coating on the particles can be excited. As the domains of the coatings realign with each oscillation, hysteresis losses in the coating cause inductive heating. The inductive heating can be proportional to flux density within the magnetically permeable coating. When the coated particles are distributed evenly throughout the frozen fluid plug, inductive heating via the alternating magnetic field will result in mostly uniform increase in temperature in the frozen core. At a certain temperature, the frozen fluid plug will begin to melt and detach from the inside surface of the conduit.

The ferromagnetic coated magnetically susceptible particles can be included in the injection slurry after formation of the frozen plug has begun so that the ferromagnetic coated magnetically susceptible particles are concentrated near the center of the plug. By alternating the magnetic field, domains in the ferromagnetic coating on the particles can be excited and hysteresis losses in the coating cause inductive heating. Because the coated particles are concentrated near the center of the frozen fluid plug, inductive heating via the alternating magnetic field will result in increase in the temperature of the center of the frozen core, producing a channel through which fluid can flow, restoring fluid flow. A benefit to this method of restoring flow is that the frozen fluid core can remained attached to the conduit wall, minimizing the possibility that it will be launched as a projectile upon melting and restoration of fluid flow.

In some methods, heating devices are included in the magneto-cryogenic valve and these heating devices are activated to provide thermal energy to melt the plug within the conduit. In some methods, the heating devices are used in conjunction with the magnetically produced inductive heating to provide thermal energy to melt the plug within the conduit.

In some methods, the heating devices can be arranged to provide thermal energy unilaterally or directionally to the conduit in the area of the plug of frozen fluid within the conduit. This directed application of thermal energy to the conduit in proximity to the frozen plug therein allows for directed melting of the plug, such as to form a channel through the plug through which liquid fluid can flow while the frozen plug remains adhered to the inner wall of the conduit. This prevents launching the frozen plug through the conduit, and permits controlled restoration of fluid flow through the conduit.

In some methods, a bypass circuit can be included in the system to eliminate pressure differential on either side of the frozen plug before thawing, and thereby minimizing or eliminating the possibility of launching the partially frozen plug through the system. The bypass circuit would allow for the introduction of fluid to pressurize the low pressure side of the conduit prior to thawing the frozen fluid plug, thereby equalizing the pressure in the conduit on both sides of the frozen fluid plug prior to the plugs detachment from the inner wall of the conduit.

The methods provided herein produce a frozen plug of fluid, such as oil and/or gas, in a conduit, such as a well or pipeline, in order to stop the flow of fluid through the conduit. The plug serves to temporarily halt fluid flow, such as production in an oil well. In some instances, the oil well can be an above-ground pipeline or below-ground pipeline, while in other instances, the oil well can be off-shore, and can be a deep sea oil well. In the systems and methods provided herein, the plug can be formed in situ and can be easily removed by allowing the plug to melt, passively or by controlled modulation of the temperature in the vicinity of the plug, such as by application of thermal energy vie heating devices near the area of the conduit to which the heat transfer system is attached, or via magnetically produced inductive heating using the magnetic field generating device.

In some methods, the fluid flowing in the conduit contains hydrocarbons. It has been found that the plug formed in a hydrocarbon fluid by the extraction of thermal energy from the hydrocarbon-containing fluid can be amorphous due to the different precipitation/freezing rates of molecules of higher molecular weight compared to lower molecular weight materials. In such methods, injection of an adhesion promoter composition, particularly an adhesion promoter composition containing at least one surfactant, into the fluid within the conduit prior to heat extraction and freezing of the hydrocarbon fluid results in a more homogeneous freeze of the fluid and promotes better adhesion of the frozen plug to the inside surface of the conduit.

There are many times when the flow of a fluid through a conduit, such as oil through a well, needs to be stopped. For example, the flow of oil in offshore oil well during storm conditions, or while performing maintenance on wellheads, or as an emergency shut off in case of a catastrophic event in which the conduit is damaged or ruptured such as during a seismic event, requires the use of a plug of some sort to stop the flow of fluid. The magneto-cryogenic valves and systems provided herein can be used to form a thermally reversible fluid plug in wells on the surface or at any depth, such as at about 250 feet below the mud line (i.e., 250 feet below the ocean floor) or in deep water applications, in which floating drill ships or semi-submersible rigs can operate in water depths of 6,000 feet or more. Accordingly, provided are methods of producing a frozen plug in a fluid, where the method includes introduction of an injection slurry composition containing magnetically susceptible particles and optionally an adhesion promoter composition into the fluid within the conduit. A magnetic field generating device is activated thereby directing the particles at least in part to the inner wall of the conduit in the vicinity of the heat transfer device. The injection slurry composition and optionally adhesion promoter composition can be injected into the fluid until the fluid becomes viscous or until the fluid resists flow or the fluid begins to freeze or the fluid becomes solid.

The methods provided herein can be used to temporarily isolate an oil well. The methods include activating a magneto-cryogenic valve attached to a portion of a producing tubular in an oil well so that its heat transfer system is in thermal contact with at least one portion of the producing tubular, and activating a first injector to inject an injection slurry composition containing magnetically susceptible particle as provided herein into the fluid, such as oil in the producing tubular, and activating a second injector to inject an adhesion promoter composition as described herein.

E. EXAMPLES

The following examples are included for illustrative purposes only and are not intended to limit the scope of the embodiments provided herein.

Example 1

Motor Oil Only

The ability of a solidified oil plug to withstand pressure was tested. The strength of the plug was analyzed using a Test Resources 310 Series Universal Testing Machine (UTM, Test Resources, Inc., Shakopee, Minn.). The plug was formed using a stainless steel 0.5 inch prototype magneto-cryogenic valve provided herein. The geometry of the valve chamber of the prototype magneto-cryogenic valve was essentially cylindrical having sloped end walls, as shown in FIG. 28. The width of the valve chamber was 3× the diameter of the incoming pipe (1.5 inches) and the length of the valve chamber was 3.33× the width of the valve chamber (5 inches). Two 0.5 inch N50 NdFeB magnets with a maximum flux density of 13,200 Gs or 1.32 T were positioned opposite from each other in the sloped wall of the second valve chamber segment, with like poles directed toward the valve chamber. The ends of the magnets were flush with the outer wall of the valve chamber and did not penetrate into the valve chamber. The heat exchange unit included cryogenic cooling coils, a continuous cryogen compatible tubing forming the cryogenic cooling coils. The cryogenic cooling coils encircled the entire outer surface of the valve chamber (similar to that depicted in FIG. 10). The valve chamber was cooled by discharging liquid nitrogen from a supply vessel through the cryogenic cooling coils, which removed thermal energy from the magneto-cryogenic valve. Temperature was monitored using a National Instruments NI 9211 thermocouple module (National Instruments, Austin, Tex.).

SAE 10W-30 motor oil (Valvoline) was used to represent light crude oil. The exit of the valve chamber of the prototype magneto-cryogenic valve was plugged using a thin cellophane barrier. The cellophane barrier was easily ruptured. Testing with the UTM applying force to this barrier resulted in no detection of load prior to rupture of the cellophane barrier. With an intact cellophane barrier in place, 154.8 g of motor oil was added to the valve chamber. The cryogenic cooling coils of the heat exchange unit were charged with liquid nitrogen and liquid nitrogen flowed through the coils to cool the oil. The oil was taken from an initial temperature of 35° C. (95° F.) to −120° C. Solidification of the oil was confirmed at −120° C. After solidification of the oil, a 0.5 inch metal rod that snuggly fit within the 0.5 inch inlet pipe was positioned in the inlet pipe, connected to the UTM, pushed into the valve chamber by UTM, which accurately simulated application of a pressure load. The load was applied over 168.1 seconds, with load and position change data being digitally recorded by Test Resources Xyplot Software every 0.1 seconds. The maximum recorded load, which occurred at 168.1 seconds, was 9986.16 N. This corresponds to a maximum stress of 81,375 kPa (11,802 psi). At around 100 seconds, elastic deformation of the solid was observed, as the slope of the load vs. displacement curve began to increase. At around 155 seconds, an internal failure within the solid occurred. After this initial failure, the load increased to the maximum supported force of the UTM, 9986.16 N. The data obtained demonstrated that a solidified oil plug can hold at least 12,000 psi of pressure.

Example 2

Ball Bearings Only

The ability of a plug of ball bearings to withstand pressure was tested. The same push-through experiment, described in Example 1, was performed using only ball bearings. The exit of the valve chamber of the prototype magneto-cryogenic valve was plugged using the thin cellophane barrier. 660 g of 4.5 mm diameter stainless steel ball bearings (McMaster-Carr, Santa Fe Springs, Calif.) were added to the valve chamber of the prototype magneto-cryogenic valve. This experiment was performed at room temperature. The 0.5 inch metal rod connected to the UTM, was positioned in the inlet pipe and pushed into the valve chamber by UTM. The load applied by the metal rod onto the packed ball bearings as a function of time was measured. The maximum loading was quickly reached, after 35.3 seconds. At this loading, no failure was detected. The data showed that a packed bed of spheres at room temperature can hold at least 12,000 psi of pressure and exhibits a large increase in structural rigidity over the rigidity exhibited by the solidified oil plug.

Example 3

0.5 mm×5.0 mm Iron Rods with Motor Oil

The ability of a plug of frozen oil containing metal particles to withstand pressure was tested. The same push-through experiment, described in Example 1, was performed. The exit of the valve chamber of the prototype magneto-cryogenic valve was plugged using the thin cellophane barrier. 496.2 g of 0.5 mm×5.0 mm ferromagnetic 302/304 stainless steel rods (Pellets LLC, North Tonawanda, N.Y.) were added to the prototype magneto-cryogenic valve chamber, and then 89.3 g of SAE 10W-30 motor oil (Valvoline) was added. The resulting mixture was cooled using the same heat exchanger setup described in Example 1 and the valve chamber was cooled using liquid nitrogen until a minimum of temperature of −130° C. was reached, at which temperature the metal rod/oil composition was frozen solid. Following solidification of the rod/oil composite at this temperature, the same push-through experiment as described in Example 1 was performed. The load applied by the metal rod onto the rod-and-oil composite as a function of time was recorded. The maximum loading was quickly reached after 39.5 seconds. The data showed that the frozen rod/oil composite can hold at least 12,000 psi of pressure, and has greatly enhanced heat transfer properties when compared to pure oil.

Example 4

Heat Transfer Properties

Data for the rate of temperature change for the frozen plug of pure oil (Example 1) and the frozen plug of oil containing steel particles (Example 3) was collected. From the data, it was observed that the steel particles in the metal rod/oil composite plug increased the thermal transfer rate by approximately 70% when compared to a plug containing only frozen oil.

While various embodiments of the subject matter provided herein have been described, it should be understood that they have been presented by way of example only, and not limitation. Since modifications will be apparent to those of skill in this art, it is intended that this invention be limited only by the scope of the appended claims.

LIST OF FIGURE ELEMENTS

100—magneto-cryogenic valve
110—first injector device
111—pipe connector to pump 112
112—pump
113—pipe connector to adhesion promoter supply module 200
120—second injector device
121—pipe to injector slurry supply module 300
125—pipe to pressure regulator system 350
130—heat transfer system
130a—interlocking first portion of heat transfer system
130b—interlocking second portion of heat transfer system
131—inlet port
132—inlet pressure regulator
133—pipe to cryogen supply module
134—connector
135—outlet port
136—outlet pressure regulator
137—pressure relief valve
138—vent
139—space to accommodate support channel 160
140—magnetic field generating device
145—thermally conductive particles
146—insulator
150 and 150'—connector
155—cryogenic cooling coils
160—support channel
160a—interlocking first portion of support channel
160b—interlocking second portion of support channel
170—magnetically susceptible particles
170a, 170b, 170c, 170d, 170e—magnetically susceptible particles
200—adhesion promoter composition supply module
300—injector slurry supply module
350—pressure regulator system
400—cryogen supply module
500—conduit
500'—conduit
550—breach
600—flange connector to incoming pipeline
601—flange connector to outgoing pipeline
610—flange bolt holes
620—first valve chamber segment
621—second valve chamber segment
625—fold in valve chamber wall
640—electromagnetic solenoid coil
650—electromagnetic core
655—electromagnetic core end
656—electromagnetic core flange
660—incoming pipeline-connecting conduit
661—outgoing pipeline-connecting conduit
670—incoming chamber-connecting conduit
671—outgoing chamber-connecting conduit
680—magnetic field generator port
685—magnetic field generator end
700—first cooling chamber segment
701—second cooling chamber segment
705—port to cooling chamber
706—port to cooling chamber
710—valve chamber bolt hole
715—first valve chamber segment flange
716—valve flange gasket
717—second valve chamber segment flange
720—valve chamber segment flange bolt hole
730—instrument fitting
740—threaded rod
741—nut
750—bolt hole
800—entry to valve chamber
801—exit from valve chamber
805—flat valve chamber wall
810—sloped valve chamber wall
F↑ or F→—direction of flow of fluid

The invention claimed is:

1. A magneto-cryogenic valve, comprising:
a connector for connecting the magneto-cryogenic valve to a conduit through which a fluid flows;
a valve chamber, comprising:
end walls; and
at least one fold;
a heat transfer system comprising a cooling chamber suitable to contain a cryogen, wherein the cooling chamber is integrated into the magneto-cryogenic valve in proximity to the valve chamber;
a first injector device for injecting magnetically susceptible particles into the fluid; and
a magnetic field generating device,
wherein:
the valve chamber is connectable in fluid communication with the conduit so that the fluid of the conduit can flow through the valve chamber;
the magnetic field generating device produces a magnetic field comprising field lines and is positioned so that at least a portion of the field lines penetrate through the fluid in the valve chamber and interact with the injected magnetically susceptible particles; and
the heat transfer system removes thermal energy from the valve chamber and the fluid therein.

2. The magneto-cryogenic valve of claim 1, further comprising a second injector device for injecting an adhesion promoter composition into the fluid.

3. The magneto-cryogenic valve of claim 1, wherein valve chamber comprises a portion of the conduit.

4. The magneto-cryogenic valve of claim 1, wherein the cooling chamber comprises:
(a) particles, filings, turnings, shavings, pellets, threads or beads of a thermally conductive material; or
(b) baffles or fins; or
(c) a combination of (a) and (b).

5. The magneto-cryogenic valve of claim 1, wherein the cooling chamber comprises:
an inlet port for admitting a cryogen into the cooling chamber; and
an outlet port for discharging the spent cryogen out of the cooling chamber.

6. The magneto-cryogenic valve of claim 1, wherein the magnetic field generating device comprises an electromagnet, a permanent magnet, or a combination thereof.

7. The magneto-cryogenic valve of claim 6, wherein:
(a) the permanent magnet comprises a ferrite material or a rare earth element; or
(b) the permanent magnet is selected from among Nd—Fe—B type, Sm—Co type and Sm—N—Fe type rare earth permanent magnets.

8. The magneto-cryogenic valve of claim 1, wherein a magnet of the magnetic field generating device is mounted on a movable track.

9. The magneto-cryogenic valve of claim 1, wherein a pole of a magnetic field generating device penetrates into the valve chamber.

10. The magneto-cryogenic valve of claim 1, wherein no pole of a magnetic field generating device penetrates into the valve chamber.

11. The magneto-cryogenic valve of claim 1, wherein:
(a) the magnetic field of at least one magnetic field generating device directs the injected magnetically susceptible particles to the center of the valve chamber; or
(b) the magnetic field of at least one magnetic field generating device directs the injected magnetically susceptible particles to an end of the valve chamber; or
(c) the magnetic field of at least one magnetic field generating device directs the injected magnetically susceptible particles to a wall of the valve chamber; or
(d) a combination of any of (a), (b) and (c).

12. The magneto-cryogenic valve of claim 1, wherein the magnetic field generating device comprises an electromagnet or a permanent magnet having a magnetic flux density of about 0.1 Tesla to about 15 Tesla.

13. The magneto-cryogenic valve of claim 1, wherein the magnetic field generating device produces an oscillating magnetic field.

14. The magneto-cryogenic valve of claim 1, wherein the magnetic field generating devices are configured to provide a flux density of from about 0.5 Tesla to about 5 Tesla within the valve chamber.

15. The magneto-cryogenic valve of claim 1, wherein the valve chamber comprises:
one fold to create a kidney-shaped chamber; or
two folds to create a bi-lobed chamber; or
three folds to create a tri-lobed chamber; or
four folds to create a tetra-lobed chamber; or
five folds to create a penta-lobed chamber; or
six folds to create a hexa-lobed chamber; or
seven folds to create a hepta-lobed chamber; or
eight folds to create a octa-lobed chamber; or
nine folds to create a nona-lobed chamber; or
ten folds to create a deca-lobed chamber.

16. The magneto-cryogenic valve of claim 1, wherein:
(a) the valve chamber comprises two 90° end walls; or
(b) the valve chamber comprises two sloped end walls; or
(c) the valve chamber comprises one 90° end wall and one sloped end wall.

17. The magneto-cryogenic valve of claim 1, wherein the valve chamber has a width that is from about 1× to about 10× the inner diameter of the conduit to which the magneto-cryogenic valve is attached.

18. The magneto-cryogenic valve of claim 1, wherein the valve chamber has a length that is from about 1.5× to about 10× the inner diameter of the conduit to which the magneto-cryogenic valve is attached.

19. The magneto-cryogenic valve of claim 1, wherein the valve chamber comprises at least one wall that contains projections or indentations or a combination thereof.

20. The magneto-cryogenic valve of claim 2, wherein:
(a) the first and second injectors comprise an isolation mechanism for controlling the flow of material through the injectors; or
(b) the first and second injectors comprise an activatable flow modulating valve to adjust the flow of material through the injector; or
(c) both (a) and (b).

21. The magneto-cryogenic valve of claim 2, wherein the first injector or second injector or both comprise one or more or a combination of a flow rate meter, an emergency shut-off valve, an over-pressure valve, a diverter valve, a heating unit or a thermal monitoring device.

22. A system for extracting thermal energy from a conduit containing a fluid, comprising:
a magneto-cryogenic valve of claim 1; and
an injector slurry supply module.

23. The system of claim 22, further comprising:
(a) an adhesion promoter composition supply module; or
(b) a pressure regulator system connected to the injector slurry supply module; or
(c) a cryogen supply module; or
(d) a pump in fluid communication with the adhesion promoter composition supply module; or
(e) one or more or a combination of flow control valves, diverter valves, pressure relief valves, pressure monitoring devices, temperature monitoring devices, or flow rate measuring devices; or
(f) a computer control module; or
(g) a combination of any of (a), (b), (c), (d), (e), and (f).

24. The system of claim 22, wherein the injector slurry supply module is in fluid communication with the second injector of the magneto-cryogenic valve and provides an injector slurry composition comprising magnetically susceptible particles to the second injector.

25. The system of claim 24, wherein the injector slurry composition comprises:
(a) magnetically susceptible particles that are paramagnetic or diamagnetic or ferromagnetic or any combination thereof; or
(b) magnetically susceptible particles comprising cobalt, Co—Zr alloys, Co—Nb alloys, dysprosium, Fe—Si alloys, gadolinium, iron, mu metal (nickel iron alloy), nickel, permalloys (iron-nickel alloys), rare earth-transition metal alloys, spinel ferrites or supermalloy or any combination or alloy thereof; or
(c) magnetically susceptible particles comprising a Gd—Co or Fe—Tb alloy; or
(d) magnetically susceptible particles comprising cobalt, iron, nickel, magnetite ($Fe_3O_4$) or maghemite ($Fe_2O_3$) or combinations thereof; or
(e) any combination of (a), (b), (c) and (d).

26. The system of claim 24, wherein the injector slurry composition comprises magnetically susceptible having a thermal conductivity greater than 0.2 W/(m·K), or greater than 0.5 W/(m·K), or greater than 0.75 W/(m·K), or greater than 1 W/(m·K), or greater than 5 W/(m·K), or greater than 10 W/(m·K), or greater than 20 W/(m·K), or greater than 30 W/(m·K), or greater than 40 W/(m·K), or greater than 50 W/(m·K) or greater than 100 W/(m·K).

27. The system of claim 24, wherein the injector slurry composition comprises magnetically susceptible particles of a shape selected from among cubes, flakes, granules, cylinders, rings, rods, needles, prisms, disks, fibers, pyramids, spheres, spheroids, prolate spheroids, oblate spheroids, ellipsoids, ovoids, hexahedrons, hexagonal prisms, tetrahexahedrons, octahedrons, truncated octahedrons, dodecahedrons, triangular prisms or random non-geometric shapes or any combinations of these shapes.

28. The system of claim 24, wherein the injector slurry composition comprises:
  (a) magnetically susceptible particles that are solid; or
  (b) magnetically susceptible particles that are hollow; or
  (c) a combination of (a) and (b).

29. The system of claim 24, wherein the injector slurry composition comprises magnetically susceptible particles that comprise:
  (a) a partial or complete coating comprising a thermally conductive material or an oxide or a combination thereof; or
  (b) a partial or complete coating comprising a corrosion-resistant material; or
  (c) a partial or complete ferromagnetic coating; or
  (d) any combination of (a), (b) and (c).

30. The system of claim 24, wherein the injector slurry composition comprises magnetically susceptible particles of a particle size from about 1 nm to about 20 cm.

31. The system of claim 30, wherein the injector slurry composition comprises magnetically susceptible particles of a particle size:
  (a) from about 1 nm to about 100 µm; or
  (b) greater than 100 µm and less than 5 cm; or
  (c) from about 1000 µm and about 1 cm; or
  (d) any combination of (a), (b) and (c).

32. The system of claim 24, wherein the injector slurry composition comprises magnetically susceptible particles having a bimodal particle size distribution, wherein one mode of the distribution has an average particle size between about 1000 µm and about 10 cm and the other mode of the distribution has an average particle size between about 1 nm and 100 µm.

33. The system of claim 24, wherein the amount of magnetically susceptible particles in the injection slurry composition is:
  (a) from 0.01% to 95% based on the weight of the injection slurry composition; or
  (b) greater than 95% based on the weight of the injection slurry composition.

34. The system of claim 24, wherein the injector slurry composition comprises a carrier comprising a cryogen or a solvent or a combination thereof.

35. The system of claim 34 wherein the cryogen comprises liquid nitrogen, liquid oxygen, liquid helium, liquid neon, liquid methane, liquid natural gas, liquid argon, liquid nitrous oxide, or liquid carbon dioxide or combinations thereof.

36. The system of claim 34, wherein:
  (a) the amount of cryogen the injector slurry composition is from 1% to 99% based on the weight of the injector slurry composition; or
  (b) the amount of solvent in the injector slurry composition is from about 0.05% to 75% based on the weight of the injector slurry composition.

37. The system of claim 23, wherein the adhesion promoter supply module is in fluid communication with the first injector of the magneto-cryogenic valve and provides an adhesion promoter composition to the second injector.

38. The system of claim 37, wherein the adhesion promoter composition comprises:
  (a) a surface tension reducer in an amount of from about 0.01% to about 50% based on the weight of the adhesion promoter composition; or
  (b) a solvent in an amount of from about 0.05% to about 85% based on the weight of the adhesion promoter composition; or
  (c) a combination of (a) and (b).

39. The system of claim 23, wherein the cryogen supply module is in fluid communication with the heat transfer system of the magneto-cryogenic valve and provides a cryogen to the heat transfer system.

40. The system of claim 39, wherein the cryogen comprises liquid carbon dioxide, liquid ammonia, liquified chlorofluorohydrocarbons, liquid nitrogen, liquid oxygen, liquid neon, liquid argon, liquid nitrous oxide, hydrofluoroethane, pentafluoropropane, trichloro-monofluoromethane or dichlorodifluoromethane, or a mixture or any combination thereof.

41. The system of claim 23, wherein the cryogen supply module comprises one or more of a flow rate meter, a flow-control metering valve, an isolation valve, an emergency shut-off valve, an over-pressure valve, a diverter valve, a heating unit, or a thermal monitoring device or any combination thereof.

42. A method for temporarily preventing the flow of fluid in a conduit, comprising:
  activating a magneto-cryogenic valve of claim 2 attached to the conduit, wherein the heat transfer system of the magneto-cryogenic valve removes sufficient thermal energy from the fluid to cause at least a portion of the fluid in the valve chamber of the magneto-cryogenic valve to freeze to form a reversible plug that prevents the fluid from flowing through the conduit.

43. The method of claim 42, wherein the frozen plug transfers the upstream pressure load from the fluid to the walls of the valve chamber.

44. The method of claim 42, wherein activating the magneto-cryogenic valve comprises charging the heat transfer system so that it is able to extract thermal energy from at least a portion of the conduit to which the heat transfer system is attached or from a fluid contained therein.

45. The method of claim 44, wherein charging the heat transfer system comprises activating the cryogen supply module to provide cryogen to the heat transfer system.

46. The method of claim 42, wherein activating the magneto-cryogenic valve further comprises:
  (a) activating the pump attached to the adhesion promoter composition supply module to cause adhesion promoter to be injected into the fluid within the conduit via the first injector of the magneto-cryogenic valve; or
  (b) activating the pressure regulator system attached to the injector slurry supply module to cause an injector slurry composition comprising magnetically susceptible particles to be injected into the fluid within the conduit via the second injector of the magneto-cryogenic valve; or
  (c) activating the magnetic field generating device to produce magnetic fields, at least a portion of which enter the valve chamber; or
  (d) any combination of (a), (b) and (c).

47. The method of claim 46, wherein the magnetic fields of the magnetic field generating device interact with the magnetically susceptible particles of the injection slurry composition.

48. The method of claim 42, wherein the first injector of the magneto-cryogenic valve is positioned so that the injection of the adhesion promoter composition into the fluid within the conduit occurs before the second injector introduces the injection slurry composition into the fluid within the conduit.

49. The method of claim 42, wherein the heat transfer system or the second injector injecting the injection slurry composition or both is/are activated for a sufficient amount of time to form a frozen plug of fluid that prevents flow of the fluid through the conduit.

50. The method of claim 42, further comprising as a step increasing the temperature in the vicinity of the attachment of the heat transfer system to donate thermal energy to the conduit, thereby at least partially melting the frozen plug and restoring flow of the fluid through the conduit.

51. The method of claim 50, wherein the temperature is increased by:
   (a) oscillating a magnetic field of a magnetic field generating device; or
   (b) activating a heating device; or
   (c) both (a) and (b).

52. The method of claim 42, wherein the fluid within the conduit comprises a hydrocarbon gas or hydrocarbon fluid or combination thereof.

53. The method of claim 46, wherein the injector slurry composition comprises magnetically susceptible particles of a particle size:
   (a) from about 1 nm to about 20 cm; or
   (b) from about 1 nm to about 100 μm; or
   (c) greater than 100 μm and less than 5 cm; or
   (d) from about 1000 μm to about 1 cm; or
   (e) having a bimodal particle size distribution, wherein one mode of the distribution has an average particle size from about 1000 μm to about 17 cm and the other mode of the distribution has an average particle size between about 1 nm and 100 μm.

54. The method of claim 46, wherein the step of injecting an injector slurry comprises injecting a plurality of different injector slurries each containing magnetically susceptible particles having a different average particle size.

55. The method of claim 46, wherein the magnetically susceptible particles have a shape selected from among cubes, flakes, granules, cylinders, rings, rods, needles, prisms, disks, fibers, pyramids, spheres, spheroids, prolate spheroids, oblate spheroids, ellipsoids, ovoids, hexahedrons, hexagonal prisms, tetrahexahedrons, octahedrons, truncated octahedrons, dodecahedrons, triangular prisms or random non-geometric shapes or any combinations of these shapes.

56. The method of claim 46, wherein prior to injection, the magnetically susceptible particles are cooled to a temperature below the freezing temperature of the fluid within the conduit.

57. The magneto-cryogenic valve of claim 1 having a cooling chamber between each fold of the valve chamber.

58. The magneto-cryogenic valve of claim 1, wherein the end walls are the entry and exit walls of the valve chamber.

* * * * *